(12) United States Patent
Kanao et al.

(10) Patent No.: US 12,560,994 B2
(45) Date of Patent: Feb. 24, 2026

(54) INFORMATION PROCESSING DEVICE, INFORMATION PROCESSING METHOD, AND PROGRAM

(71) Applicant: Sony Group Corporation, Tokyo (JP)

(72) Inventors: Rinna Kanao, Tokyo (JP); Yuma Hirai, Tokyo (JP); Daisuke Inaishi, Tokyo (JP); Kazuki Ochiai, Tokyo (JP); Masanori Katsu, Tokyo (JP); Kazumasa Miyazaki, Tokyo (JP); Kaori Naito, Tokyo (JP); Masataka Shinoda, Tokyo (JP); Genki Okada, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/727,706

(22) PCT Filed: Nov. 22, 2022

(86) PCT No.: PCT/JP2022/043118
§ 371 (c)(1),
(2) Date: Dec. 5, 2024

(87) PCT Pub. No.: WO2023/135939
PCT Pub. Date: Jul. 20, 2023

(65) Prior Publication Data
US 2025/0328187 A1 Oct. 23, 2025

(30) Foreign Application Priority Data

Jan. 17, 2022 (JP) .................................. 2022-005191

(51) Int. Cl.
*G06F 3/01* (2006.01)
*G10L 25/63* (2013.01)

(52) U.S. Cl.
CPC .............. *G06F 3/011* (2013.01); *G10L 25/63* (2013.01)

(58) Field of Classification Search
CPC ............................ G06F 3/011; G10L 2510/63
(Continued)

(56) References Cited

U.S. PATENT DOCUMENTS

2016/0049094 A1    2/2016  Gupta
2017/0337921 A1*  11/2017  Aoyama ................. G06F 3/167
(Continued)

FOREIGN PATENT DOCUMENTS

JP          H09-081632 A      3/1997
JP          2005-237668 A     9/2005
(Continued)

OTHER PUBLICATIONS

International Search Report and Written Opinion mailed on Feb. 7, 2023, received for PCT Application PCT/JP2022/043118, filed on Nov. 22, 2022, 12 pages including English Translation.

*Primary Examiner* — Mark Edwards
(74) *Attorney, Agent, or Firm* — XSENSUS LLP

(57) ABSTRACT

A graph showing changes over time in score indicating a user state of a user participating in a meeting and a user state change reason are estimated and displayed on a terminal of another user participating the meeting. A user state score indicating a user state of any one of a degree of interest, a degree of understanding, or a degree of fatigue of a user participating in a meeting via a communication network is estimated on the basis of at least one of image data or voice data of the user, a user state output score to be output to a user terminal of the user participating in the meeting is calculated on the basis of the estimated user state score, and a graph indicating changes in calculated user state output (Continued)

score and user state change reason are displayed on user
terminal of another user participating in meeting.

18 Claims, 44 Drawing Sheets

(58) Field of Classification Search
USPC ......................................................... 345/156
See application file for complete search history.

(56) References Cited

U.S. PATENT DOCUMENTS

| | | | | |
|---|---|---|---|---|
| 2018/0025283 A1 * | 1/2018 | Kobayashi | ............ | G06N 5/041 |
| | | | | 706/53 |
| 2018/0114125 A1 * | 4/2018 | Ichiboshi | ............ | A61B 5/0077 |
| 2021/0185276 A1 | 6/2021 | Peters | | |
| 2021/0306173 A1 | 9/2021 | Krikunov | | |
| 2021/0401337 A1 * | 12/2021 | Flickinger | .......... | A61B 5/02055 |
| 2023/0074113 A1 * | 3/2023 | Maru | ...................... | G06F 3/016 |
| 2025/0054291 A1 | 2/2025 | Hirai | | |

FOREIGN PATENT DOCUMENTS

| | | | |
|---|---|---|---|
| JP | 2021-044001 A | 3/2021 | |
| JP | 2021-125734 A | 8/2021 | |
| WO | 2016/181670 A1 | 11/2016 | |
| WO | 2019/082687 A1 | 5/2019 | |

* cited by examiner

| | VOICE-BASED USER STATE ESTIMATION UNIT | IMAGE-BASED USER STATE ESTIMATION UNIT | VOCABULARY-BASED USER STATE ESTIMATION UNIT | USER STATE OUTPUT SCORE CALCULATION UNIT |
|---|---|---|---|---|
| (1) | INTEREST, ATTENTION, AND FAVORABLE IMPRESSION SCORE | 5 | 3 | 4 | INTEREST, ATTENTION, AND FAVORABLE IMPRESSION OUTPUT SCORE $= (w_1 \cdot 5) + (w_2 \cdot 3) + (w_3 \cdot 4) = 4$ |
| (2) | UNDERSTANDING, ACCEPTANCE, AND SATISFACTION SCORE | 3 | 4 | 3 | UNDERSTANDING, ACCEPTANCE, AND SATISFACTION OUTPUT SCORE $= (w_1 \cdot 3) + (w_2 \cdot 4) + (w_3 \cdot 3) = 3$ |
| (3) | FATIGUE AND STRESS SCORE | 1 | 2 | 1 | FATIGUE AND STRESS OUTPUT SCORE $= (w_1 \cdot 1) + (w_2 \cdot 2) + (w_3 \cdot 1) = 1$ |

FIG. 16

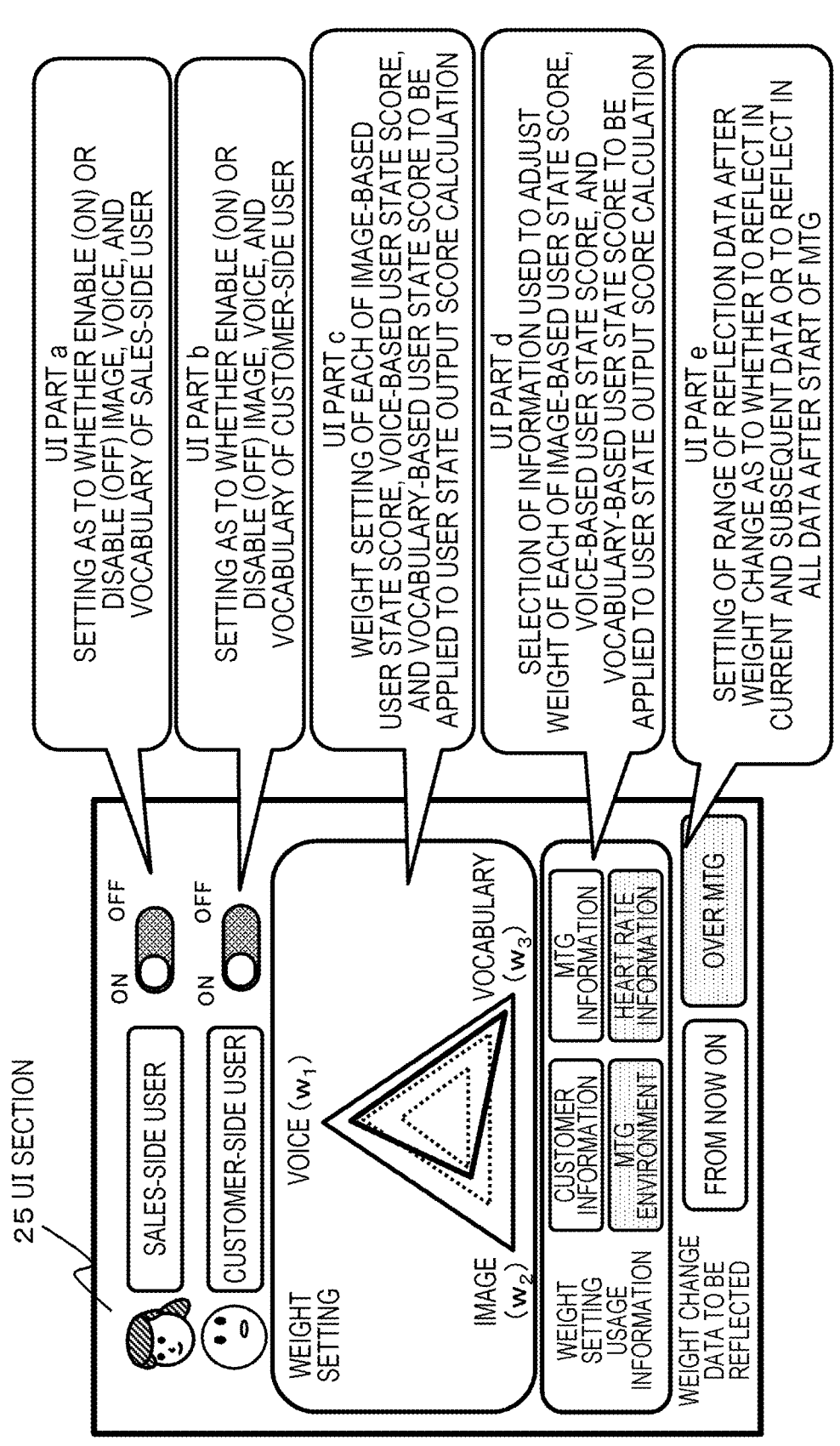

UI PART a
SETTING AS TO WHETHER ENABLE (ON) OR DISABLE (OFF) IMAGE, VOICE, AND VOCABULARY OF SALES-SIDE USER

UI PART b
SETTING AS TO WHETHER ENABLE (ON) OR DISABLE (OFF) IMAGE, VOICE, AND VOCABULARY OF CUSTOMER-SIDE USER

UI PART c
WEIGHT SETTING OF EACH OF IMAGE-BASED USER STATE SCORE, VOICE-BASED USER STATE SCORE, AND VOCABULARY-BASED USER STATE SCORE TO BE APPLIED TO USER STATE OUTPUT SCORE CALCULATION

UI PART d
SELECTION OF INFORMATION USED TO ADJUST WEIGHT OF EACH OF IMAGE-BASED USER STATE SCORE, VOICE-BASED USER STATE SCORE, AND VOCABULARY-BASED USER STATE SCORE TO BE APPLIED TO USER STATE OUTPUT SCORE CALCULATION

UI PART e
SETTING OF RANGE OF REFLECTION DATA AFTER WEIGHT CHANGE AS TO WHETHER TO REFLECT IN CURRENT AND SUBSEQUENT DATA OR TO REFLECT IN ALL DATA AFTER START OF MTG

FIG. 17

(a) BEFORE UI ADJUSTMENT (b) AFTER UI ADJUSTMENT

RULE-BASED MODEL

| | CUSTOMER-SIDE USER UTTERANCE TEXT | SALES-SIDE USER UTTERANCE TEXT | USER STATE CHANGE REASON |
|---|---|---|---|
| 1 | I DON'T UNDERSTAND | | NOT SEEM TO UNDERSTAND. |
| 2 | | LET ME SEE | SEEMS TO WANT CONCISE EXPLANATION |
| 3 | I SEE | | SEEMS TO UNDERSTAND WELL |
| .. | .. | .. | .. |

USER STATE CHANGE REASON ESTIMATION RESULT INTEGRATION PROCESSING UNIT

| | OUTPUT DATA | SPECIFIC EXAMPLES |
|---|---|---|
| 1 | USER STATE CHANGE REASON | (EXAMPLE 1) IN A CASE WHERE AMOUNT OF CHANGE IN ANY ONE OF "INTEREST, ATTENTION, AND FAVORABLE IMPRESSION OUTPUT SCORE", "UNDERSTANDING, ACCEPTANCE, AND SATISFACTION OUTPUT SCORE", OR "FATIGUE AND STRESS OUTPUT SCORE" IS GREATER THAN OR EQUAL TO SPECIFIED THRESHOLD, OUTPUT USER STATE CHANGE REASON (EXAMPLE 2) WHEN SCORE VALUE OF ANY ONE OF "INTEREST, ATTENTION, AND FAVORABLE IMPRESSION OUTPUT SCORE", "UNDERSTANDING, ACCEPTANCE, AND SATISFACTION OUTPUT SCORE", OR "FATIGUE AND STRESS OUTPUT SCORE" IS EQUAL TO MINIMUM VALUE (1) OR MAXIMUM VALUE (5), OUTPUT USER STATE CHANGE REASON |
| 2 | MEETING RESULT ESTIMATION INFORMATION | GENERATE AND OUTPUT MEETING RESULT ESTIMATION INFORMATION IN A CASE WHERE NO COUNTERMEASURE IS TAKEN AND MEETING RESULT ESTIMATION INFORMATION IN A CASE WHERE COUNTERMEASURE IS TAKEN |
| 3 | WEIGHT RECOMMENDATION INFORMATION REGARDING WEIGHT APPLIED TO USER STATE SCORE CALCULATION | OUTPUT VALUE RECOMMENDED FOR WEIGHT (IMAGE, VOICE, VOCABULARY) APPLIED TO USER STATE SCORE CALCULATION |
| ·· | ·· | ·· |

EXAMPLE OF LEARNING DATA STORED IN STORAGE UNIT OF INFORMATION
PROCESSING DEVICE (LEARNING PROCESSING EXECUTION DEVICE) 100

```
Meeting log : {
    LABEL : [
        {
            STATE LABEL NAME : FATIGUE AND STRESS,
            STATE SCORE : 3,
            TIME STAMP : 00:09:54,
        },
        {
            STATE LABEL NAME : INTEREST, ATTENTION, AND FAVORABLE IMPRESSION,
            STATE SCORE : 4,
            TIME STAMP : 00:12:31,
        }, ...
    ]
    MEETING CONDITION (MTG TAG) : {
        MTG GENRE : BUSINESS TALK,
        MTG SCALE : MEDIUM,
        FATIGUE OF CUSTOMER : LARGE,
        BUSYNESS OF CUSTOMER : LARGE,
    }
    CUSTOMER-SIDE VOICE DURING Meeting,
    SALES-SIDE VOICE DURING Meeting,
    CUSTOMER-SIDE CAMERA IMAGE DURING Meeting,
    SALES-SIDE CAMERA IMAGE DURING Meeting
}
```

Figure 32:
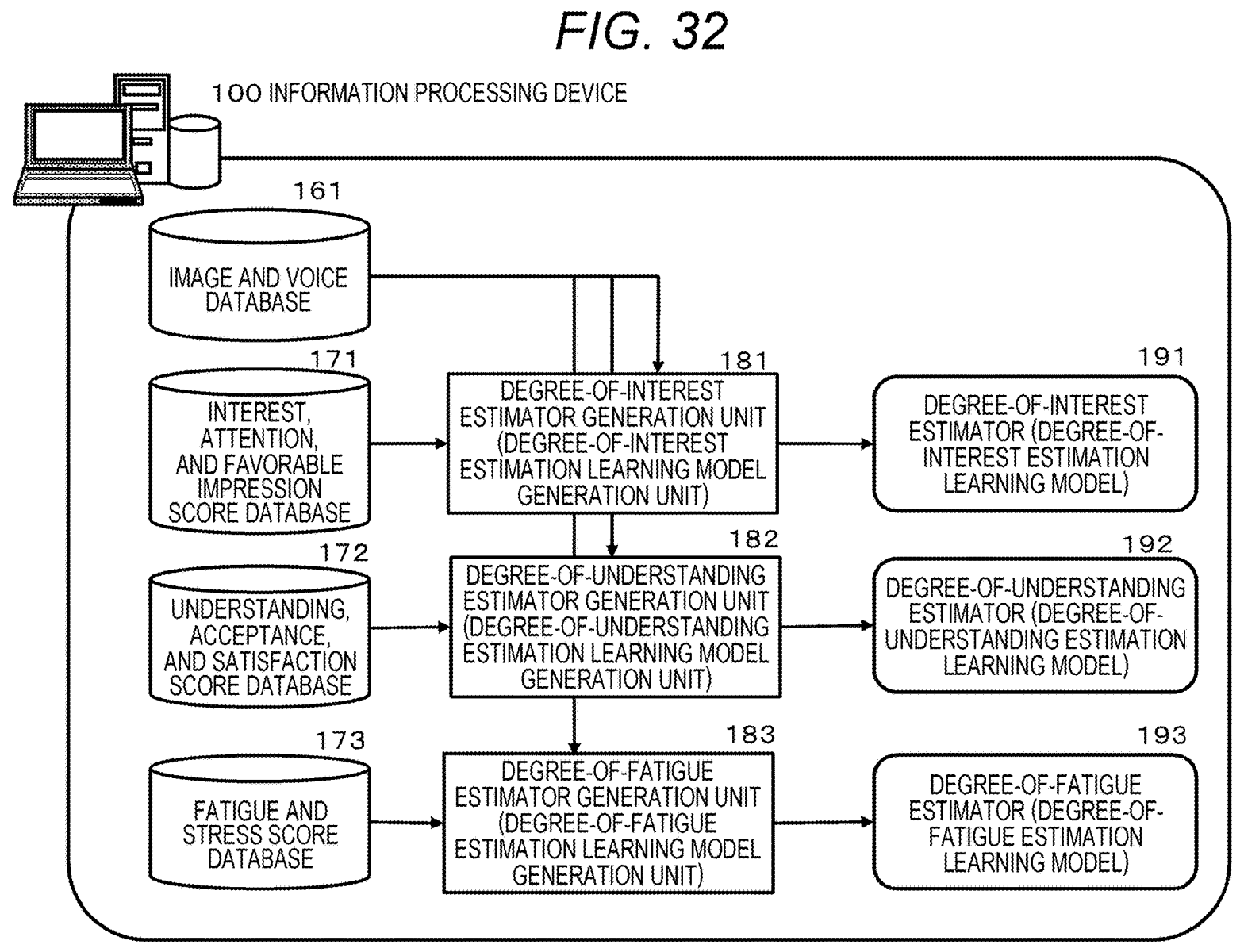

100 INFORMATION PROCESSING DEVICE

161 IMAGE AND VOICE DATABASE

171 INTEREST, ATTENTION, AND FAVORABLE IMPRESSION SCORE DATABASE

172 UNDERSTANDING, ACCEPTANCE, AND SATISFACTION SCORE DATABASE

173 FATIGUE AND STRESS SCORE DATABASE

181 DEGREE-OF-INTEREST ESTIMATOR GENERATION UNIT (DEGREE-OF-INTEREST ESTIMATION LEARNING MODEL GENERATION UNIT)

182 DEGREE-OF-UNDERSTANDING ESTIMATOR GENERATION UNIT (DEGREE-OF-UNDERSTANDING ESTIMATION LEARNING MODEL GENERATION UNIT)

183 DEGREE-OF-FATIGUE ESTIMATOR GENERATION UNIT (DEGREE-OF-FATIGUE ESTIMATION LEARNING MODEL GENERATION UNIT)

191 DEGREE-OF-INTEREST ESTIMATOR (DEGREE-OF-INTEREST ESTIMATION LEARNING MODEL)

192 DEGREE-OF-UNDERSTANDING ESTIMATOR (DEGREE-OF-UNDERSTANDING ESTIMATION LEARNING MODEL)

193 DEGREE-OF-FATIGUE ESTIMATOR (DEGREE-OF-FATIGUE ESTIMATION LEARNING MODEL)

*FIG. 38*

| | (A)<br>REASON WHY USER STATE HAS CHANGED FOR BETTER (POSITIVELY CHANGED) | (B)<br>REASON WHY USER STATE HAS CHANGED FOR WORSE (NEGATIVELY CHANGED) |
|---|---|---|
| (USER STATE 1)<br>INTEREST, ATTENTION, AND FAVORABLE IMPRESSION STATE | 1. GOOD BALANCE OF UTTERANCE RATIO<br>2. UNDERSTAND MY INTENTION<br>3. HUMOR ME<br>4. GOT USEFUL INFORMATION<br>⋮ | 1. LONG-WINDED EXPLANATION<br>2. NOT UNDERSTAND MY INTENTION<br>3. NOT HUMOR ME<br>4. ANSWERED SOMETHING THAT WASN'T ASKED<br>⋮ |
| (USER STATE 2)<br>UNDERSTANDING, ACCEPTANCE, AND SATISFACTION STATE | 1. GOT ANSWER I EXPECTED<br>2. SUFFICIENT EXPLANATION<br>3. GOOD BALANCE OF UTTERANCE RATIO<br>⋮ | 1. RECEIVED ANSWER DEVIATING FROM INTENT OF QUESTION<br>2. FREQUENT BACKCHANNELING<br>3. LACK OF EXPLANATION<br>4. LOT OF SILENCE<br>⋮ |
| (USER STATE 3)<br>FATIGUE AND STRESS STATE | 1. STATE OF BEING UNDERSTOOD IS CONTINUING<br>⋮ | 1. NO BREAK<br>⋮ |

*FIG. 40*

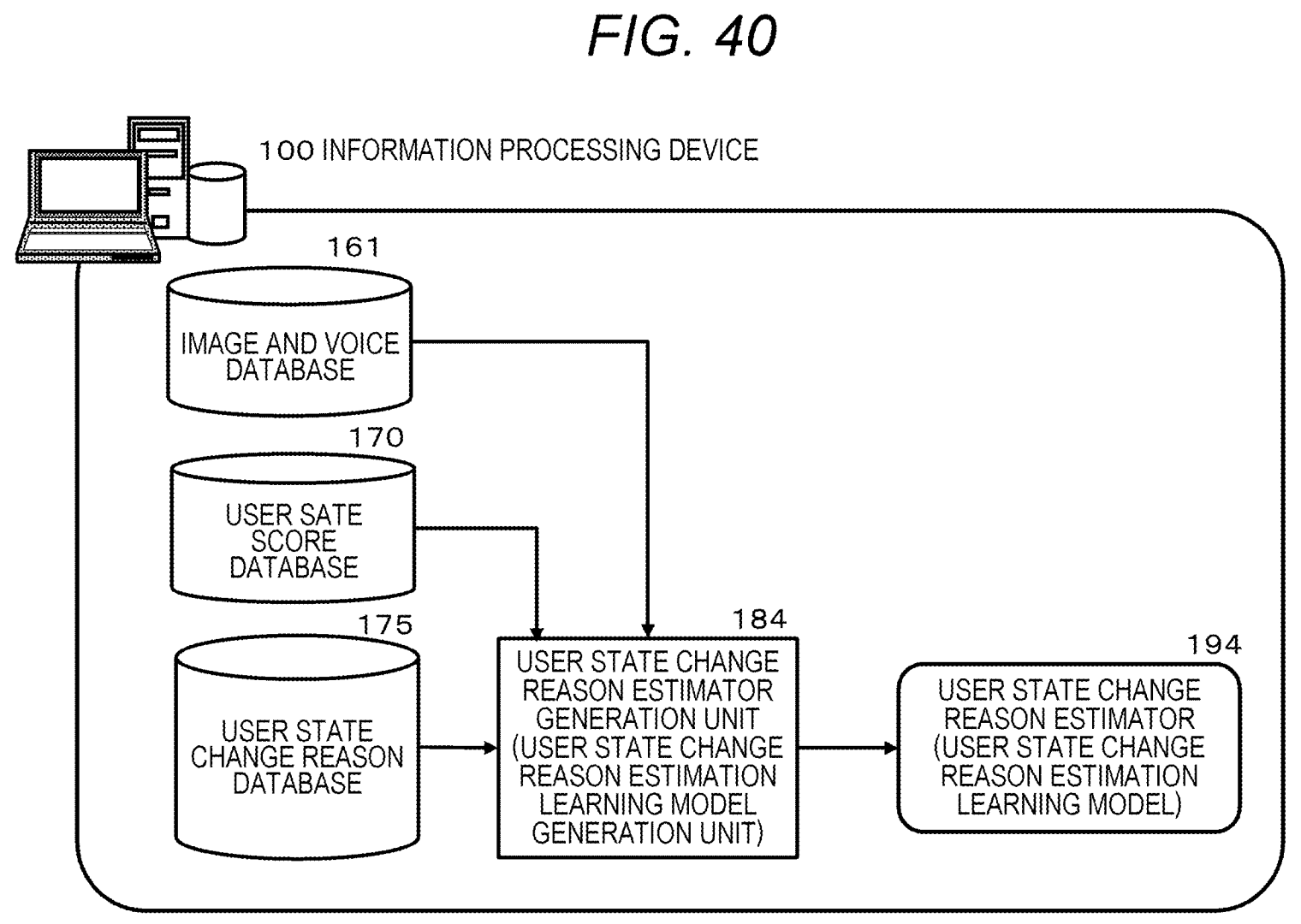

100 INFORMATION PROCESSING DEVICE

161 IMAGE AND VOICE DATABASE

170 USER SATE SCORE DATABASE

175 USER STATE CHANGE REASON DATABASE

184 USER STATE CHANGE REASON ESTIMATOR GENERATION UNIT (USER STATE CHANGE REASON ESTIMATION LEARNING MODEL GENERATION UNIT)

194 USER STATE CHANGE REASON ESTIMATOR (USER STATE CHANGE REASON ESTIMATION LEARNING MODEL)

*FIG. 41*

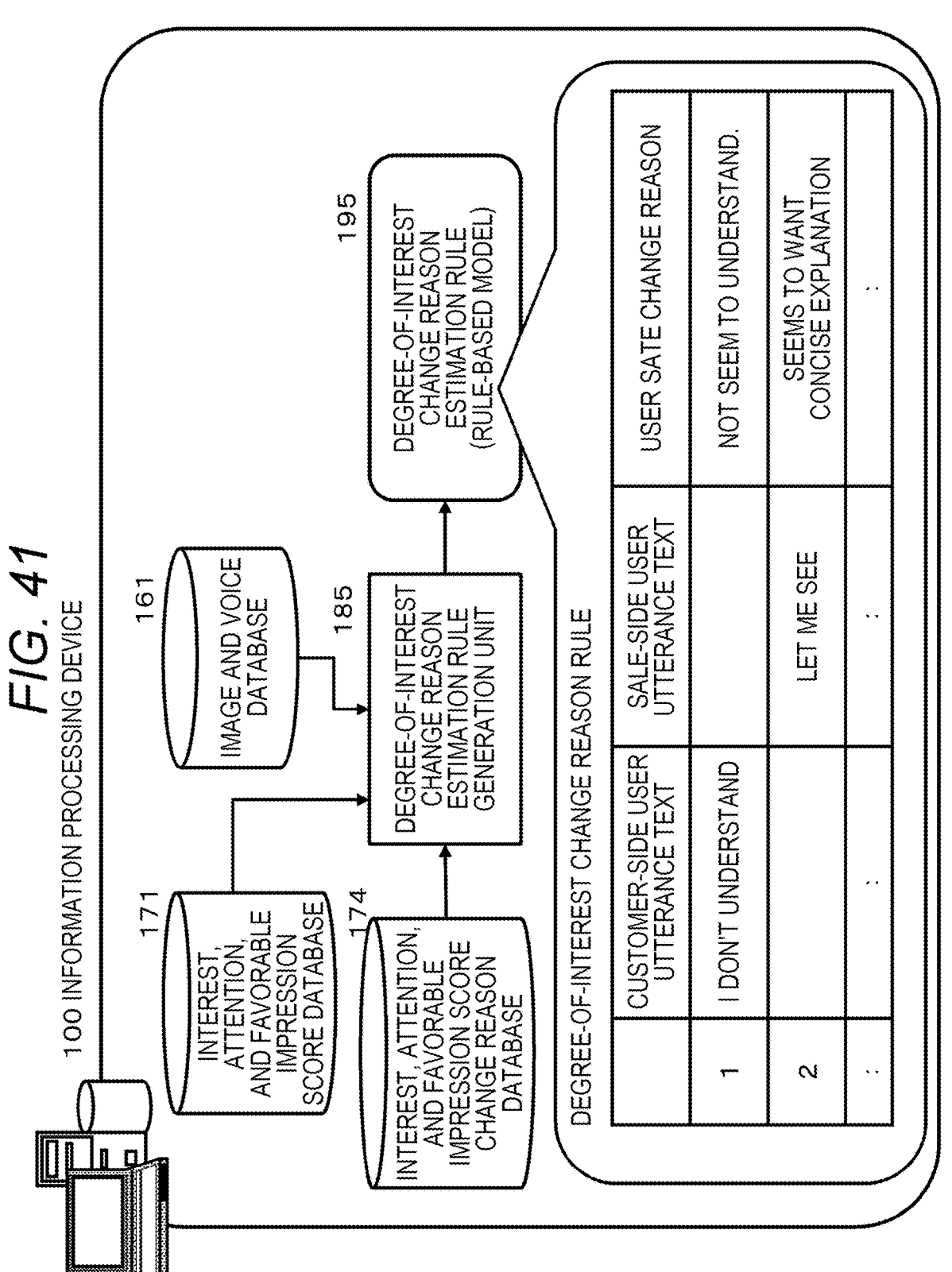

100 INFORMATION PROCESSING DEVICE

161 IMAGE AND VOICE DATABASE

171 INTEREST, ATTENTION, AND FAVORABLE IMPRESSION SCORE DATABASE

174 INTEREST, ATTENTION, AND FAVORABLE IMPRESSION SCORE CHANGE REASON DATABASE

185 DEGREE-OF-INTEREST CHANGE REASON ESTIMATION RULE GENERATION UNIT

195 DEGREE-OF-INTEREST CHANGE REASON ESTIMATION RULE (RULE-BASED MODEL)

DEGREE-OF-INTEREST CHANGE REASON RULE

| | CUSTOMER-SIDE USER UTTERANCE TEXT | SALE-SIDE USER UTTERANCE TEXT | USER SATE CHANGE REASON |
|---|---|---|---|
| 1 | I DON'T UNDERSTAND | | NOT SEEM TO UNDERSTAND. |
| 2 | | LET ME SEE | SEEMS TO WANT CONCISE EXPLANATION |
| ⋮ | ⋮ | ⋮ | ⋮ |

INFORMATION PROCESSING DEVICE, INFORMATION PROCESSING METHOD, AND PROGRAM

CROSS-REFERENCE TO RELATED APPLICATIONS

The present application is based on PCT filing PCT/JP2022/043118, filed Nov. 22, 2022, which claims priority from Japanese Patent Application No. 2022-005191, filed Jan. 17, 2022, the entire contents of each are incorporated herein by reference.

TECHNICAL FIELD

The present disclosure relates to an information processing device, an information processing method, and a program. More specifically, the present technology relates to an information processing device, an information processing method, and a program that perform user state estimation processing of estimating emotions and the like of users participating in a remote meeting such as a remote business talk via a communication network on the basis of images, voices, or the like, user state change reason estimation processing of estimating a user state change reason, and the like.

BACKGROUND ART

In recent years, remote interactions or meetings using communication terminals, such as online meetings or online business talks using image and voice communications via a network, have become increasingly popular.

For example, in an online business talk via a network, a communication terminal of a sales-side user who desires to sell a product and a communication terminal of a customer side who is a customer are connected via a communication network such as the Internet, and images and voices are transmitted and received between the terminals for the business talk.

Such a remote meeting using a communication terminal, however, have a problem of difficulty in grasping the emotion or state of the other party, unlike face-to-face meetings.

The sales-side user can observe the state of the customer via a screen, but information obtained from the screen is limited as compared with information obtained in a case where the sales-side user actually meets the customer. For example, it is difficult to grasp subtle changes in expression.

Specifically, for example, it is difficult to accurately grasp the emotion or state of the customer such as whether or not the customer understands or does not understand the explanation made by the sales-side user, or whether or not the customer is interested in the explanation.

Note that, for example, Patent Document 1 (WO 2019/082687 A) discloses, as a conventional technology, human emotion estimation processing.

Patent Document 1 discloses a configuration for estimating human emotions by analyzing human brain waves and calculating a score on the basis of the analysis result.

It is, however, difficult for the configuration to measure brain waves of users participating in a general remote meeting, and the configuration has no versatility.

CITATION LIST

Patent Document

Patent Document 1: WO 2019/082687 A

SUMMARY OF THE INVENTION

Problems to be Solved by the Invention

The present disclosure has been made in view of the above-described problems, for example, and it is therefore an object of the present disclosure to provide an information processing device, an information processing method, and a program that perform user state estimation processing of estimating a state such as an emotion of a user participating in a remote meeting via a communication network on the basis of an image, a voice, or the like, user state change reason estimation processing of estimating a user state change reason, and the like.

Solutions to Problems

A first aspect of the present disclosure is an information processing device including:

a user state estimation unit configured to estimate a user state score indicating a user state on the basis of at least one of image data or voice data of a user; and a user state output score calculation unit configured to calculate a user state output score to be output to a user terminal on the basis of the user state score estimated by the user state estimation unit, in which the user terminal is enabled to display a graph indicating changes over time in the user state output score calculated by the user state output score calculation unit.

Moreover, a second aspect of the present disclosure is an information processing method performed by an information processing device, the information processing method including:

by a user state estimation unit performing a user state estimation step of estimating a user state score indicating a user state on the basis of at least one of image data or voice data of a user; and by a user state output score calculation unit performing a user state output score calculation step of calculating a user state output score to be output to a user terminal on the basis of the user state score estimated in the user state estimation step, in which the user terminal is enabled to display a graph indicating changes over time in the user state output score calculated by the user state output score calculation unit.

Moreover, a third aspect of the present disclosure is a program for causing an information processing device to perform information processing, the information processing including:

causing a user state estimation unit to perform a user state estimation step of estimating a user state score indicating a user state on the basis of at least one of image data or voice data of a user; and causing a user state output score calculation unit to perform a user state output score calculation step of calculating a user state output score to be output to a user terminal on the basis of the user state score estimated in the user state estimation step, in which the user terminal is enabled to display a graph indicating changes over time in the user state output score calculated by the user state output score calculation unit.

Note that the program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Other objects, features, and advantages of the present disclosure will become apparent from a more detailed description based on embodiments of the present disclosure described below and the accompanying drawings. Note that a system in the present specification is a logical set configuration of a plurality of devices, and is not limited to one in which devices with respective configurations are in the same housing.

According to the configuration of the embodiment of the present disclosure, a configuration is enabled where a graph showing changes over time in score indicating a user state of a user participating in a meeting and a user state change reason are estimated and displayed on a terminal of another user participating the meeting.

Specifically, for example, a user state score indicating a user state of any one of a degree of interest, a degree of understanding, or a degree of fatigue of a user participating in a meeting via a communication network is estimated on the basis of at least one of image data or voice data of the user, a user state output score to be output to a user terminal of the user participating in the meeting is calculated on the basis of the estimated user state score, and a graph indicating changes over time in the calculated user state output score and a user state change reason are displayed on a user terminal of another user participating in the meeting.

According to this configuration, a configuration is enabled where a graph showing changes over time in score indicating a user state of a user participating in a meeting and a user state change reason are estimated and displayed on a terminal of another user participating the meeting.

Note that the effects described herein are merely examples and are not limited, and additional effects may also be provided.

BRIEF DESCRIPTION OF DRAWINGS

FIG. 12 is a diagram describing an example of the processing performed by the information processing device of the present disclosure.

FIG. 14 is a diagram for describing an example of calculation processing of calculating the user state score.

FIG. 16 is a diagram for describing a UI displayed on the user terminal.

FIG. 17 is a diagram for describing the UI displayed on the user terminal.

FIG. 21 is a diagram for describing an example of a rule-based model.

FIG. 22 is a diagram for describing an example of the processing performed by the user state change reason estimation unit of the information processing device of the present disclosure.

FIG. 23 is a diagram for describing an example of the data displayed on the user terminal.

FIG. 24 is a diagram for describing an example of the data displayed on the user terminal.

FIG. 25 is a diagram for describing an example of the data displayed on the user terminal.

FIG. 28 is a diagram for describing an example of data indicating a part of data (meeting log) used for machine learning processing performed by the information processing device.

FIG. 29 is a diagram for describing an example of time-series data that can be generated on the basis of a user state score (evaluation value) acquired by the information processing device from a customer-side user terminal.

FIG. 32 is a diagram for describing a configuration and processing of the machine learning processing performed by the information processing device.

5

Figure 34:
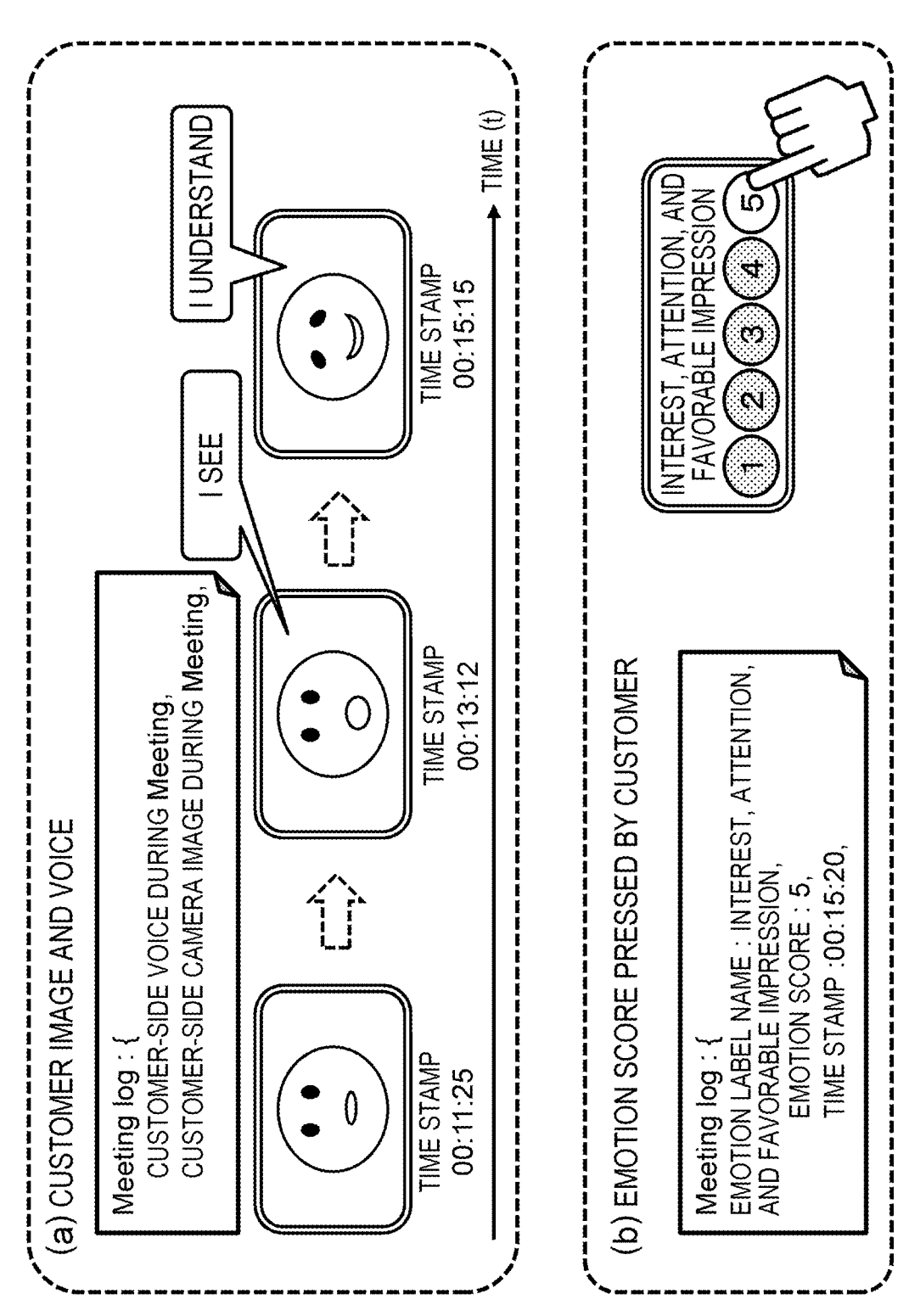

FIG. 34 is a diagram for describing an example of the learning processing of generating the degree-of-interest estimation learning model.

Figure 35:
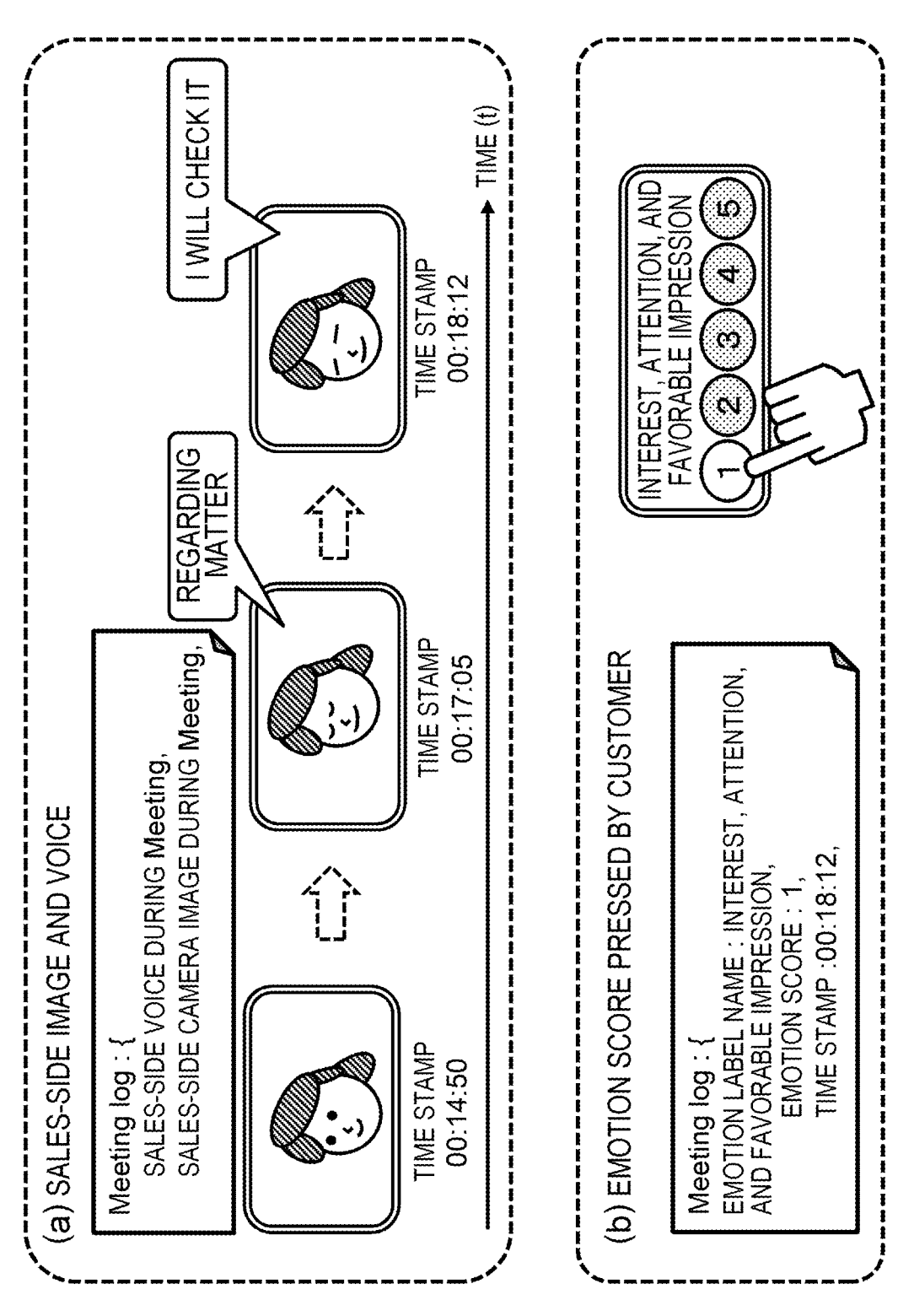

FIG. 35 is a diagram for describing an example of the learning processing of generating the degree-of-interest estimation learning model.

Figure 36:
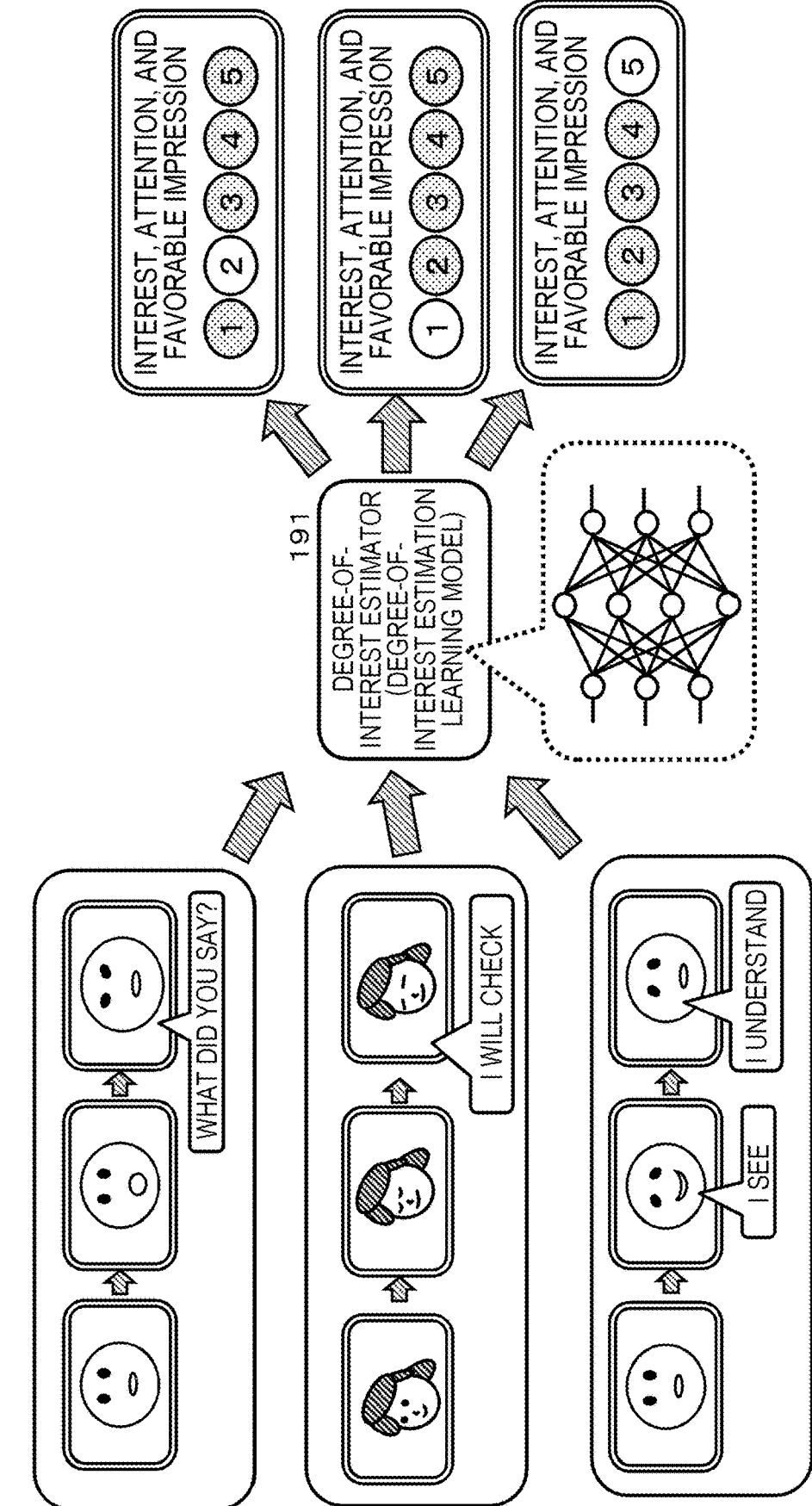

FIG. 36 is a diagram for describing an example of processing of outputting an estimated value of an interest, attention, and favorable impression score of the customer-side user using the degree-of-interest estimation learning model.

Figure 37:
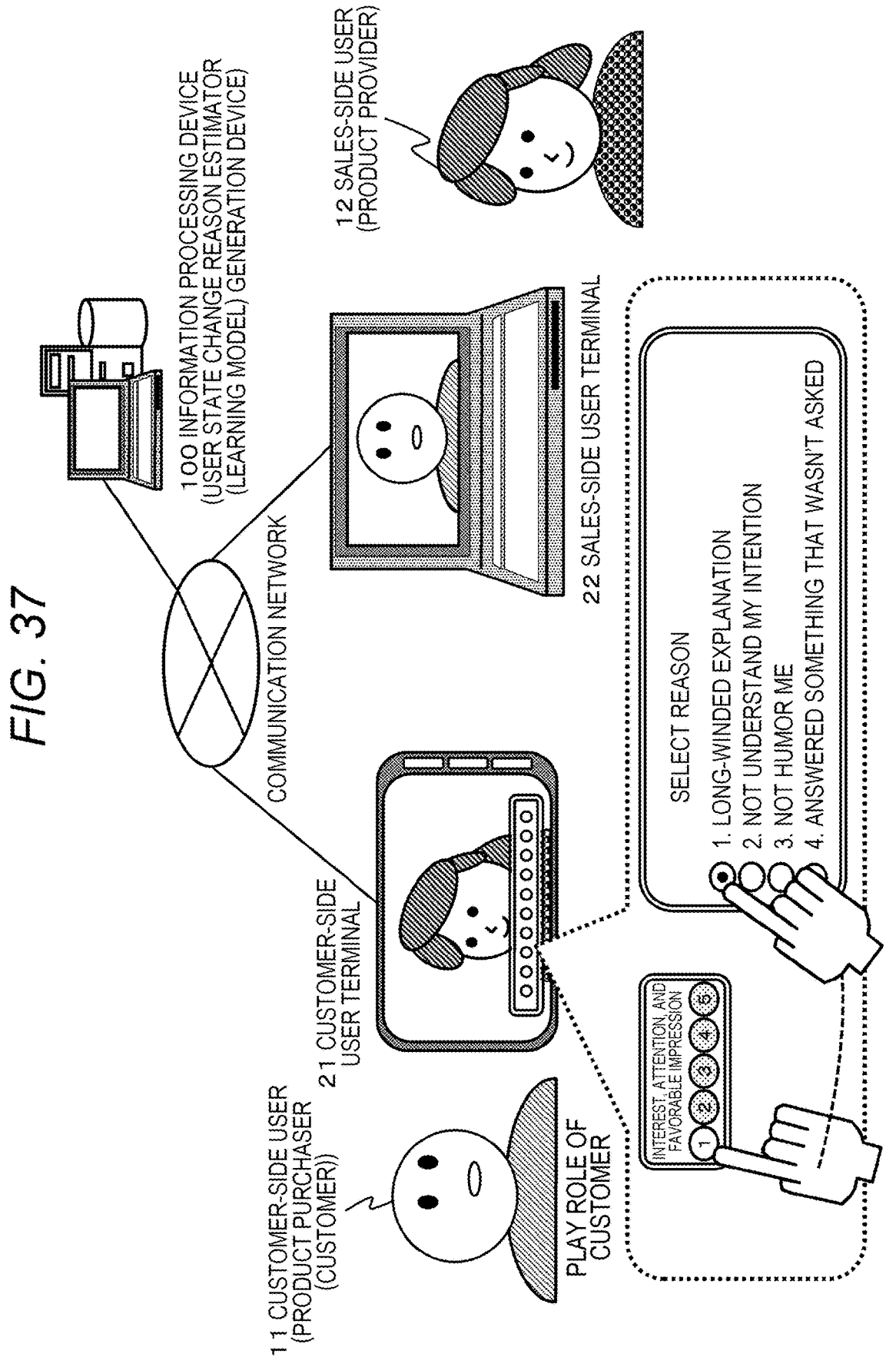

FIG. 37 is a diagram for describing an overview of user state change reason estimation learning model generation processing.

FIG. 38 is a diagram for describing a specific example of a user state change reason.

Figure 39:
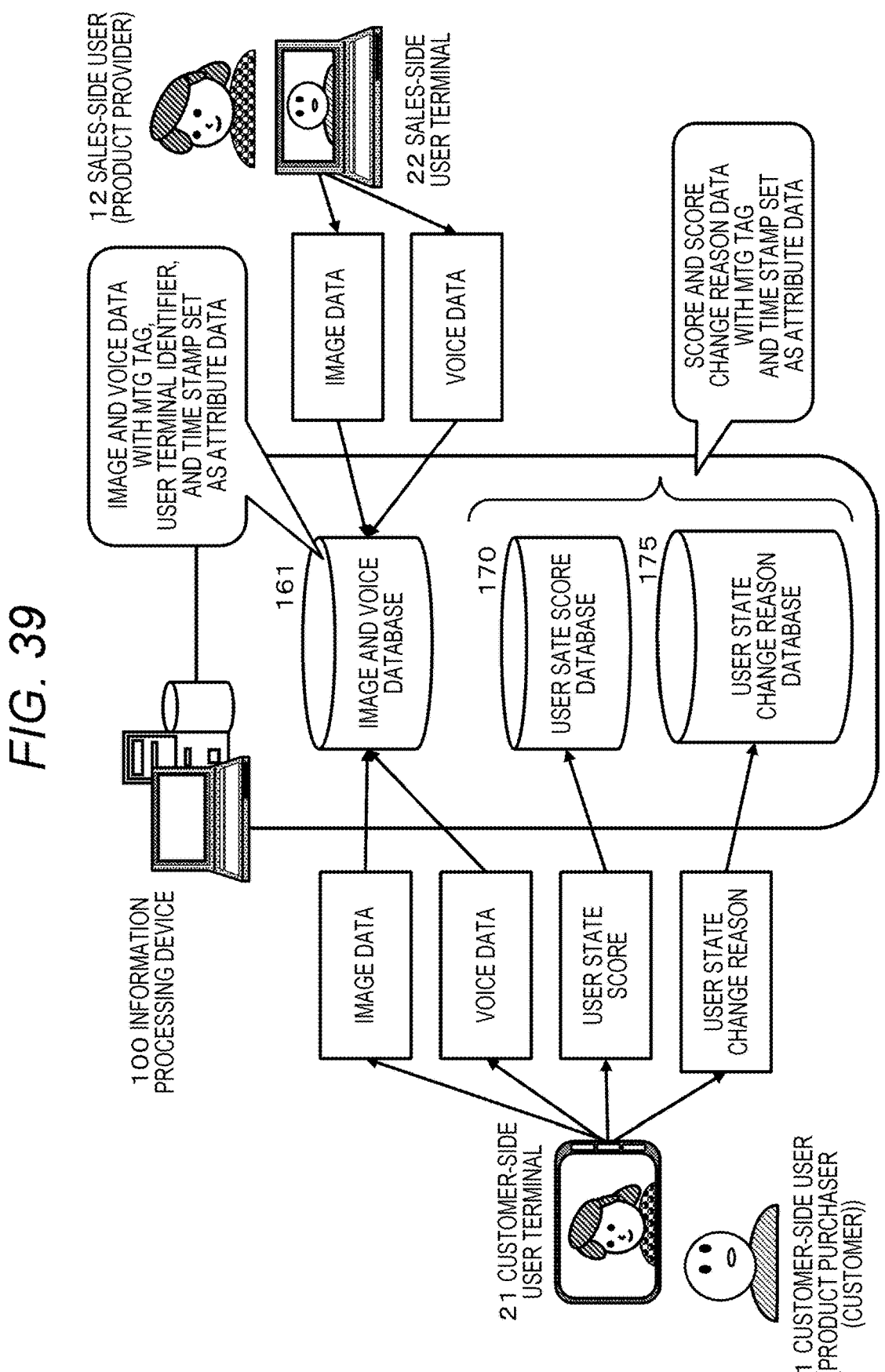

FIG. 39 is a diagram for describing a configuration where the user state change reason estimation learning model generation processing is performed.

FIG. 40 is a diagram for describing the configuration where the user state change reason estimation learning model generation processing is performed.

FIG. 41 is a diagram for describing a configuration where user state change reason estimation rule generation processing is performed.

Figure 42:
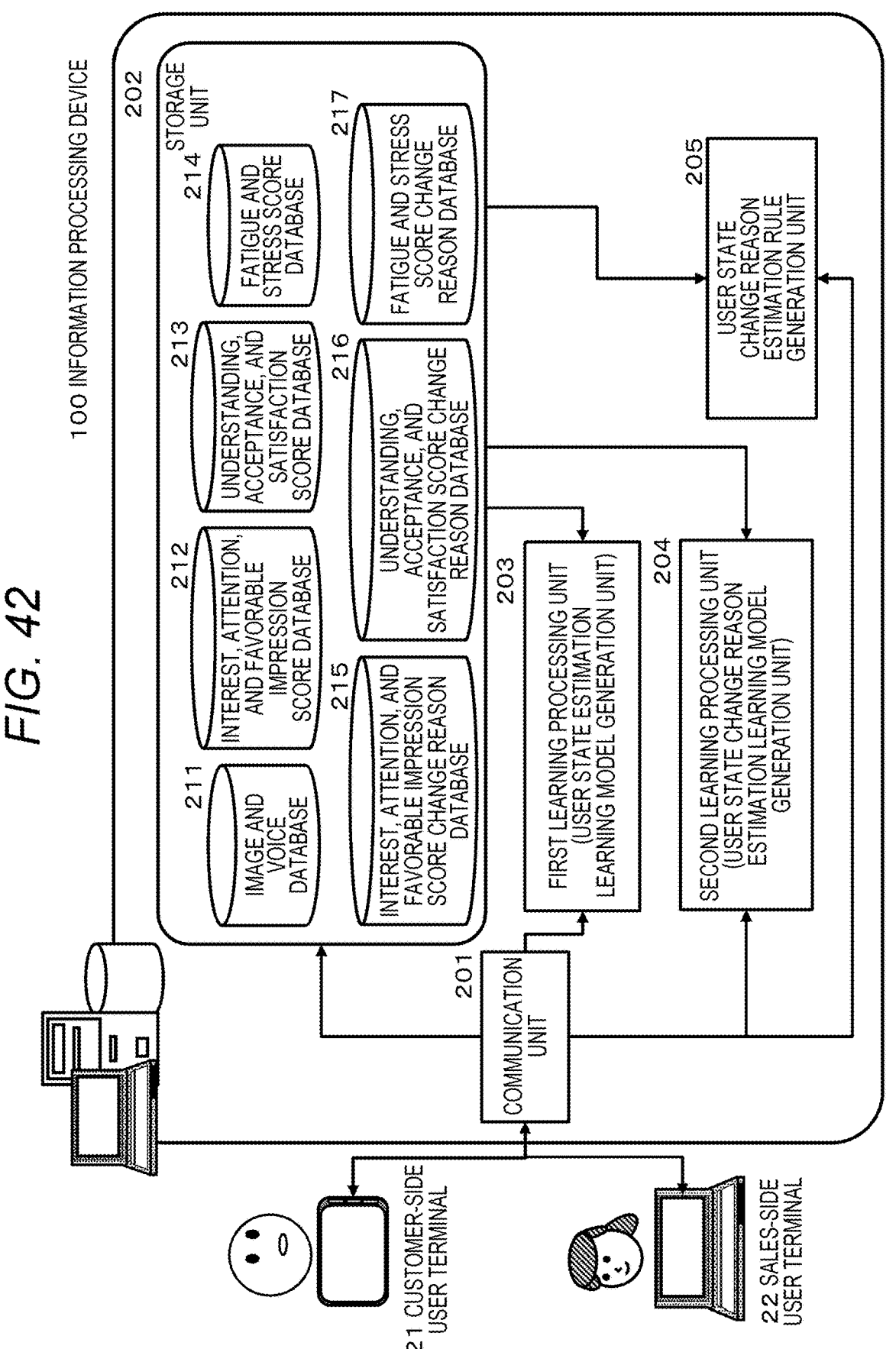

FIG. 42 is a diagram for describing a configuration example of the information processing device.

Figure 43:
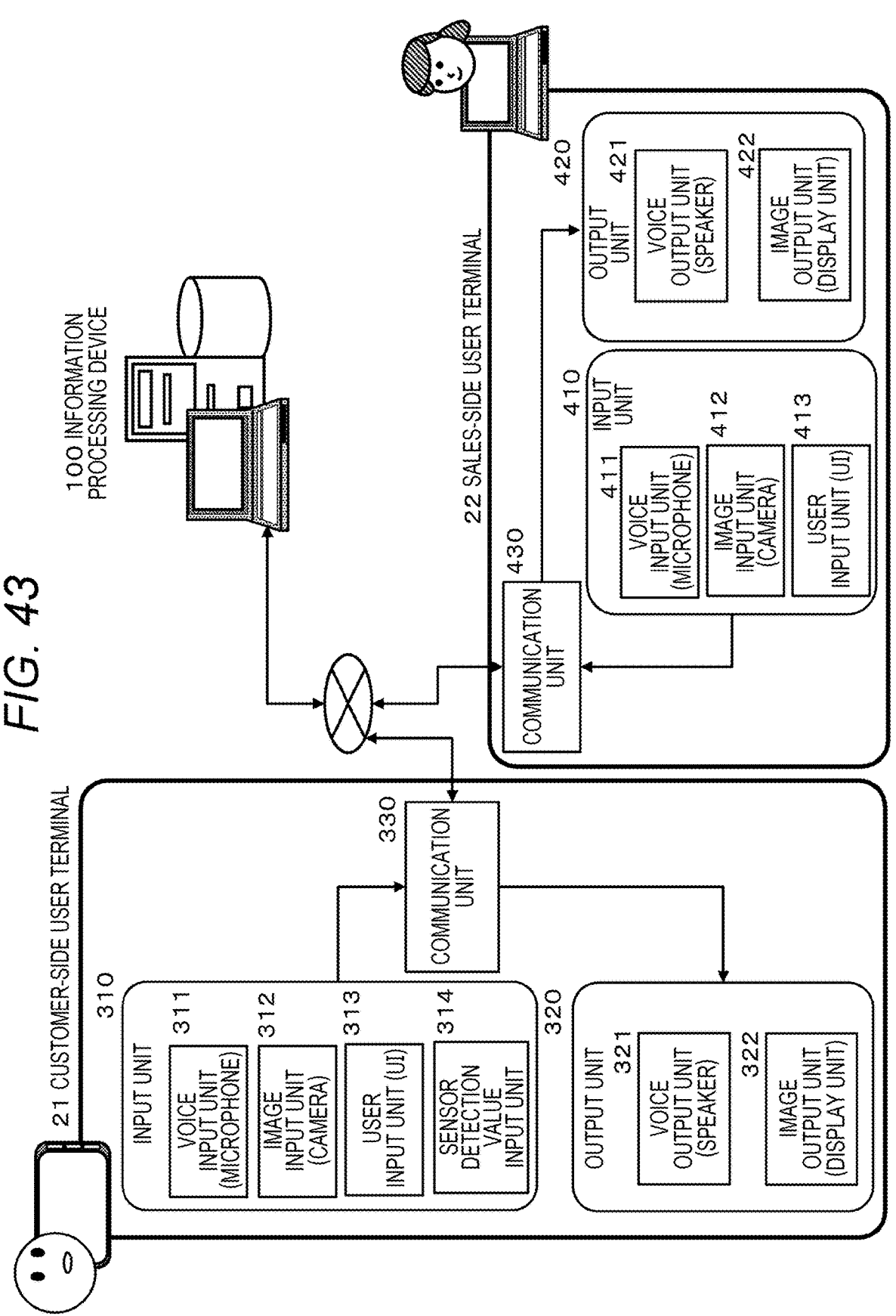

FIG. 43 is a diagram for describing configuration examples of the information processing device and the user terminal.

Figure 44:
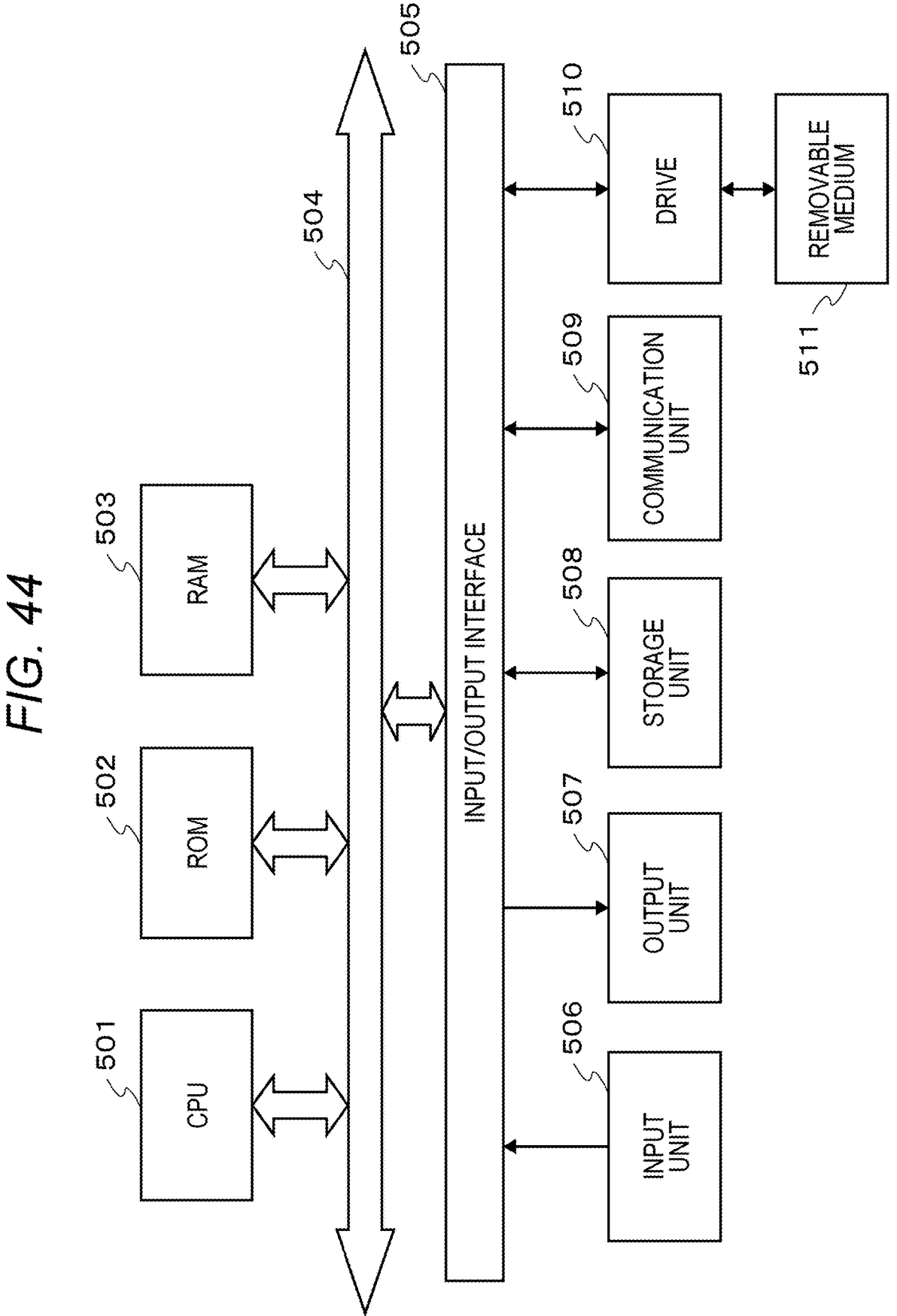

FIG. 44 is a diagram for describing hardware configuration examples of the information processing device and the user terminal.

MODE FOR CARRYING OUT THE INVENTION

Hereinafter, an information processing device, an information processing method, and a program of the present disclosure will be described in detail with reference to the drawings. Note that the description will be given in the following order.

1. Overview of configuration of and processing performed by information processing system of present disclosure
2. Overview of configuration of and processing performed by information processing device
3. Overview of processing performed by information processing device
3-1. Details of processing performed by user state estimation unit
3-2. Details of processing performed by user state output score calculation unit
3-3. Details of processing performed by score calculation algorithm control unit and UI displayed on sales-side user terminal
3-4. Details of processing performed by user state change reason estimation unit
4. Other embodiments
5. Processing of generating learning model used by user state estimation unit
6. Processing of generating learning model and rule-based model used by user state change reason estimation unit
7. Configuration examples of information processing device and user terminal
8. Hardware configuration examples of information processing device and user terminal
9. Summary of configuration of present disclosure

1. Overview of Configuration of and Processing Performed by Information Processing System of Present Disclosure First, an overview of configuration of and processing performed by the information processing system of the present disclosure will be described with reference to FIG. 1 and subsequent drawings.

Figure 1:
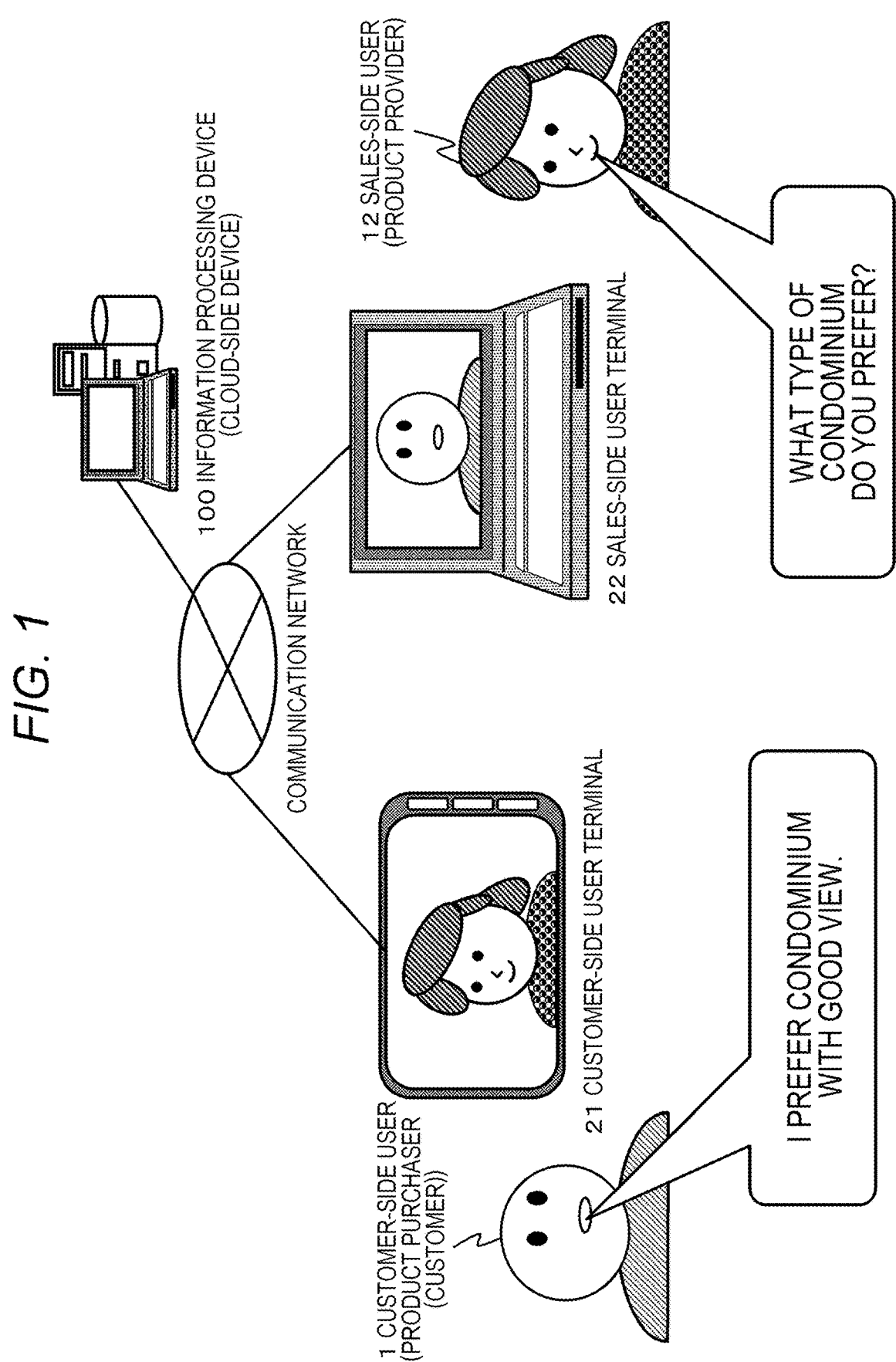
FIG. 1 is a diagram for describing an overview of a configuration of and processing performed by an information processing system of the present disclosure.

FIG. 1 is a diagram illustrating an example of a remote meeting held via a communication network.

FIG. 1 illustrates a customer-side user 11 who is a customer as a potential purchaser and a sales-side user 12 as a product provider.

A customer-side user terminal 21 such as a smartphone and a sales-side user terminal 22 such as a PC are connected via a communication network, and communicates with each other by mutually transmitting and receiving voices and images to conduct a business talk.

In the example illustrated in FIG. 1, the customer-side user 11 who is a customer as a potential purchaser of a condominium, and the sales-side user 12 is a vendor of the condominium.

While listening to desired conditions of the customer-side user 11, the sales-side user 12 gives an explanation including selection of a condominium that meets the desired conditions of the customer-side user 11.

A remote meeting such as the above-described business talk using communication terminals, however, has a problem of difficulty in grasping the user state such as the emotion or degree of understanding of the other party, unlike a face-to-face meeting.

The sales-side user 12 can observe the state of the customer-side user 11 via a screen, but information obtained from the image is less than information obtained in a case of actually facing the customer-side user.

It is difficult for the sales-side user 12 to accurately grasp the state or emotion of the customer-side user 11, such as whether or not the customer-side user understands the explanation made by the sales-side user 12, whether or not the customer-side user is interested in the explanation, or whether or not the customer-side user 11 is annoyed.

The information processing device of the present disclosure generates a user state estimator (learning model) for solving this problem, and estimates a user state such as an emotion or degree of understanding of the user using the generated user state estimator (learning model).

In the example illustrated in FIG. 1, the information processing device 100 that is a cloud-side device performs processing of generating the user state estimator (learning model) and estimates the user state using the generated user state estimator (learning model).

An example of use of the user state estimator (learning model) will be described with reference to FIG. 2.

Figure 2:
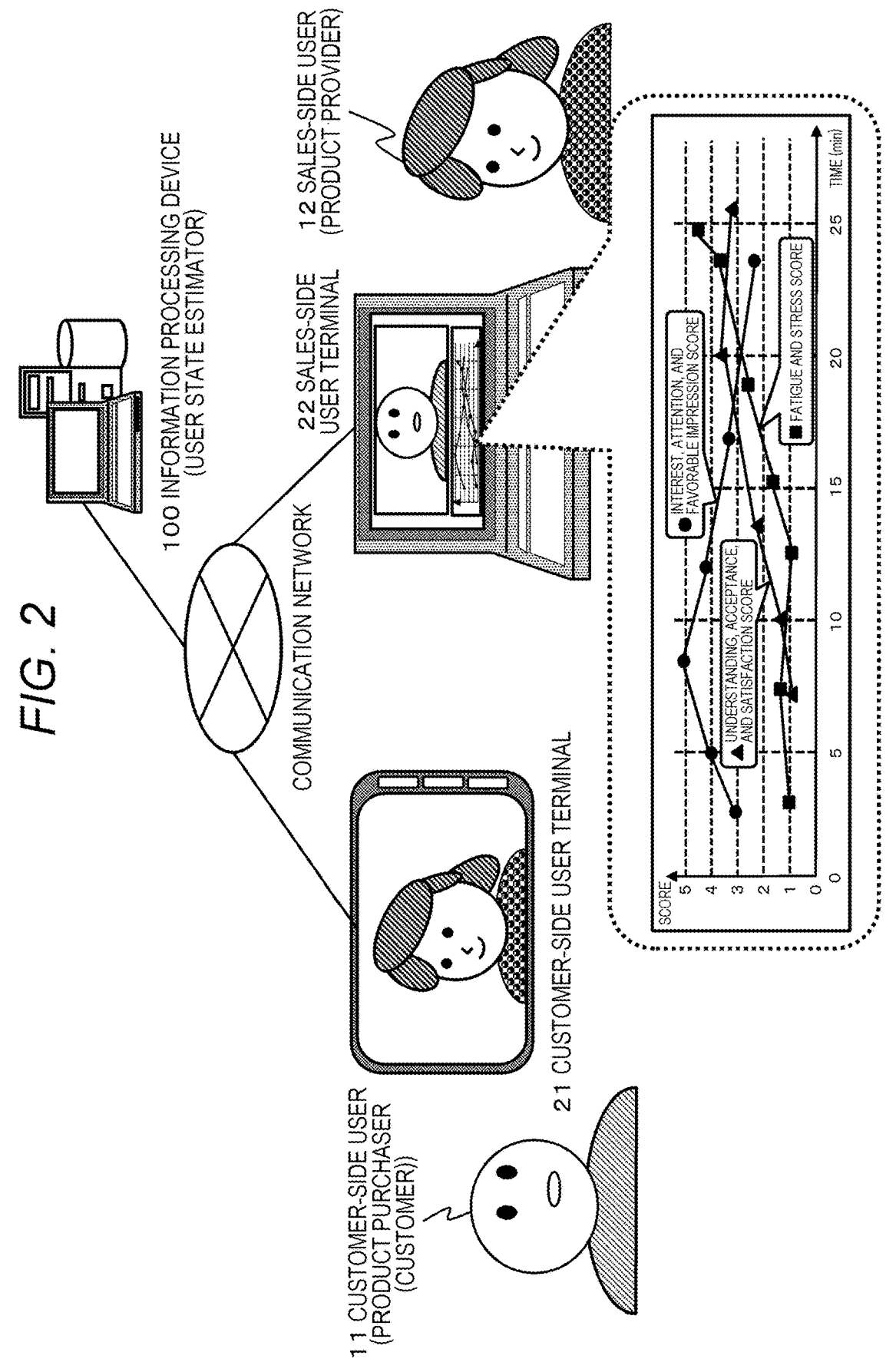
FIG. 2 is a diagram for describing an overview of the configuration of and the processing performed by the information processing system of the present disclosure.

Similar to FIG. 1, FIG. 2 illustrates the customer-side user 11 who is a customer as a potential purchaser and the sales-side user 12 as a product provider.

The customer-side user terminal 21 such as a smartphone and the sales-side user terminal 22 such as a PC are connected via a communication network, and communicates with each other by mutually transmitting and receiving voices and images to conduct a meeting such as a business talk.

In the configuration illustrated in FIG. 2, the information processing device 100 inputs, for example, the following data via the communication network during the meeting period between the customer-side user 11 and the sales-side user 21:

(A) image and voice of the customer-side user 11 from the customer-side user terminal 21; and (B) image and voice of the sales-side user 12 from the sales-side user terminal 22.

The information processing device 100 inputs such pieces of data (A) and (B) to the user state estimator (learning model).

The user state estimator (learning model) estimates the user state on the basis of the input image and voice data.

That is, the user state is estimated on the basis of at least one of image data or voice data of each user participating in the meeting via the communication network.

The user state estimated by the user state estimator (learning model) is an estimated score of each of the following three user states of the customer-side user 11:

(user state 1) interest, attention, and favorable impression;

(user state 2) understanding, acceptance, and satisfaction; and (user state 3) fatigue and stress.

Note that (user state 1) interest, attention, and favorable impression score is referred to as degree-of-interest score, (user state 2) understanding, acceptance, and satisfaction score is referred to as degree-of-understanding score, and (user state 3) fatigue and stress score is referred to as degree-of-fatigue score.

The information processing device 100 transmits time-series data (line graph) of the estimated score (evaluation value) of the user state of the customer-side user 11 estimated by the user state estimator (learning model) to the sales-side user terminal 22 to display the time-series data.

Figure 3:
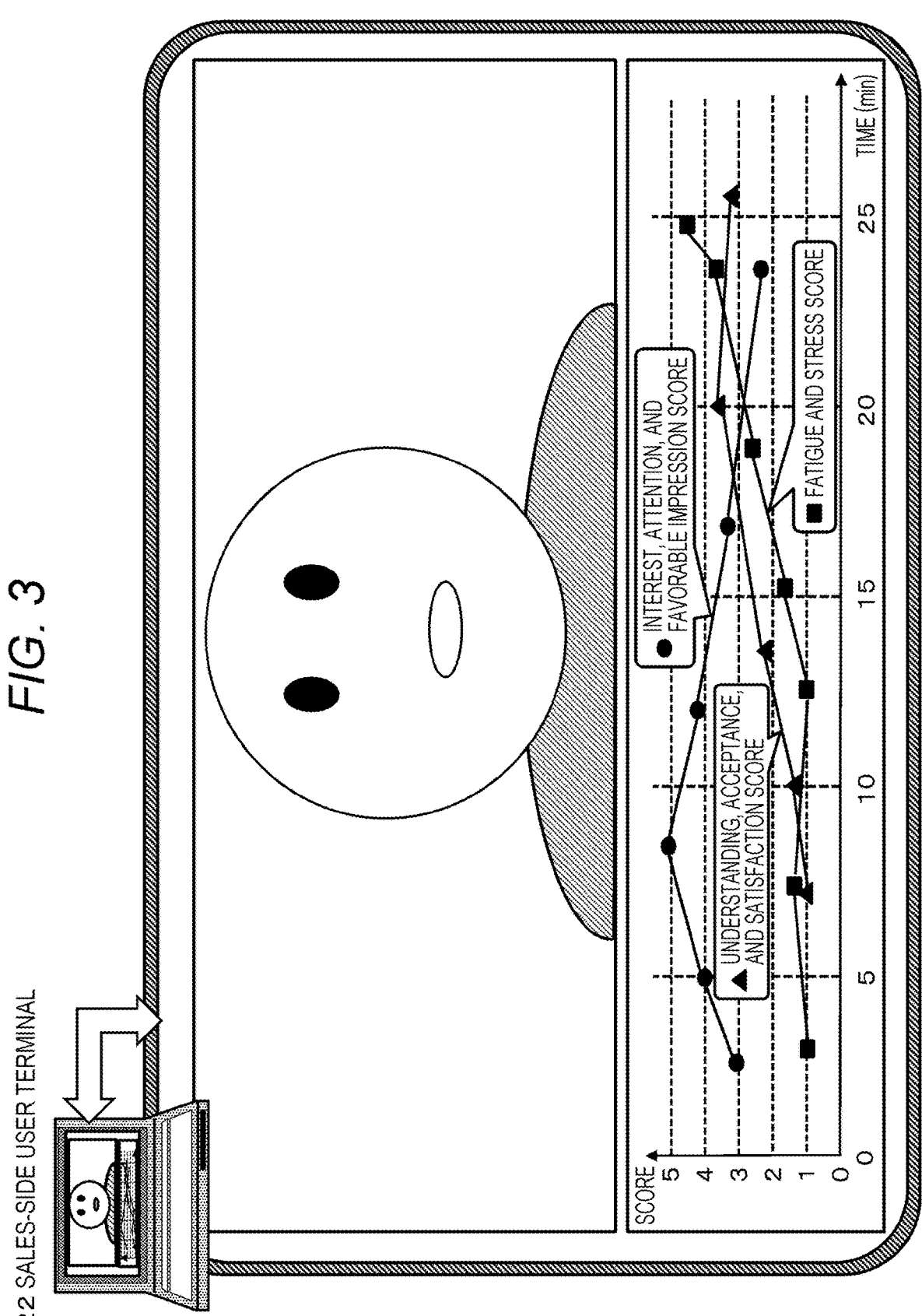
FIG. 3 is a diagram for describing an example of data displayed on a user terminal.

FIG. 3 illustrates an example of data displayed on the sales-side user terminal 22.

Displayed on a display unit of the sales-side user terminal 22 is a graph in which the horizontal axis represents time elapsed from the start of the meeting and the vertical axis represents a value (1 to 5) of the estimated score (evaluation value) of each of the user states 1 to 3.

A graph (line) of (●) is a graph showing changes over time in the estimated score (degree-of-interest score) of "(user state 1) interest, attention, and favorable impression".

A graph (line) of (▲) is a graph showing changes over time in the estimated score (degree-of-understanding score) of "(user state 2) understanding, acceptance, and satisfaction".

A graph (line) of (■) is a graph showing changes over time in the estimated score (degree-of-fatigue score) of "(user state 3) fatigue and stress".

Note that (user state 1) interest, attention, and favorable impression indicates a user state as to whether or not the customer-side user 11 shows an interest in, pays attention to, and has a favorable impression of the explanation and talk made by the sales-side user 12.

The higher the level of "interest, attention, and favorable impression" of the customer-side user 11 for an ongoing meeting such as a business talk is estimated to be (the higher the interest is), the higher the score value (evaluation value), that is, the closer the score value is to 5. On the other hand, the lower the level of "interest, attention, and favorable impression" of the customer-side user 11 is estimated to be (the lower the interest is), the lower the score value (evaluation value), that is, the closer the score value is to 1.

(User state 2) understanding, acceptance, and satisfaction indicates a user state as to whether or not the customer-side user 11 shows understanding of, acceptance of, and satisfaction with the explanation made by the sales-side user 12.

The higher the level of "understanding, acceptance, and satisfaction" of the customer-side user 11 for an ongoing meeting such as a business talk is estimated to be (the higher the understanding is), the higher the score value (evaluation value), that is, the closer the score value is to 5. On the other hand, the lower the level of "understanding, acceptance, and satisfaction" of the customer-side user 11 is estimated to be (the lower the understanding is), the lower the score value (evaluation value), that is, the closer the score value is to 1.

(User state 3) fatigue and stress indicates a user state as to whether or not the customer-side user 11 feels fatigue and stress from the explanation and talk made by the sales-side user 12.

The higher the level of "fatigue and stress" of the customer-side user 11 for an ongoing meeting such as a business talk is estimated to be (the higher the fatigue is), the higher the score value (evaluation value), that is, the closer the score value is to 5. On the other hand, the lower the level of "fatigue and stress" of the customer-side user 11 is estimated to be (the lower the fatigue is), the lower the score value (evaluation value), that is, the closer the score value is to 1.

By viewing the graph displayed on the sales-side user terminal 22, the sales-side user 12 can easily grasp a change in the customer-side state, and can take the best possible measure such as changing the way of explanation or explanation content in accordance with the grasping result.

Figure 4:
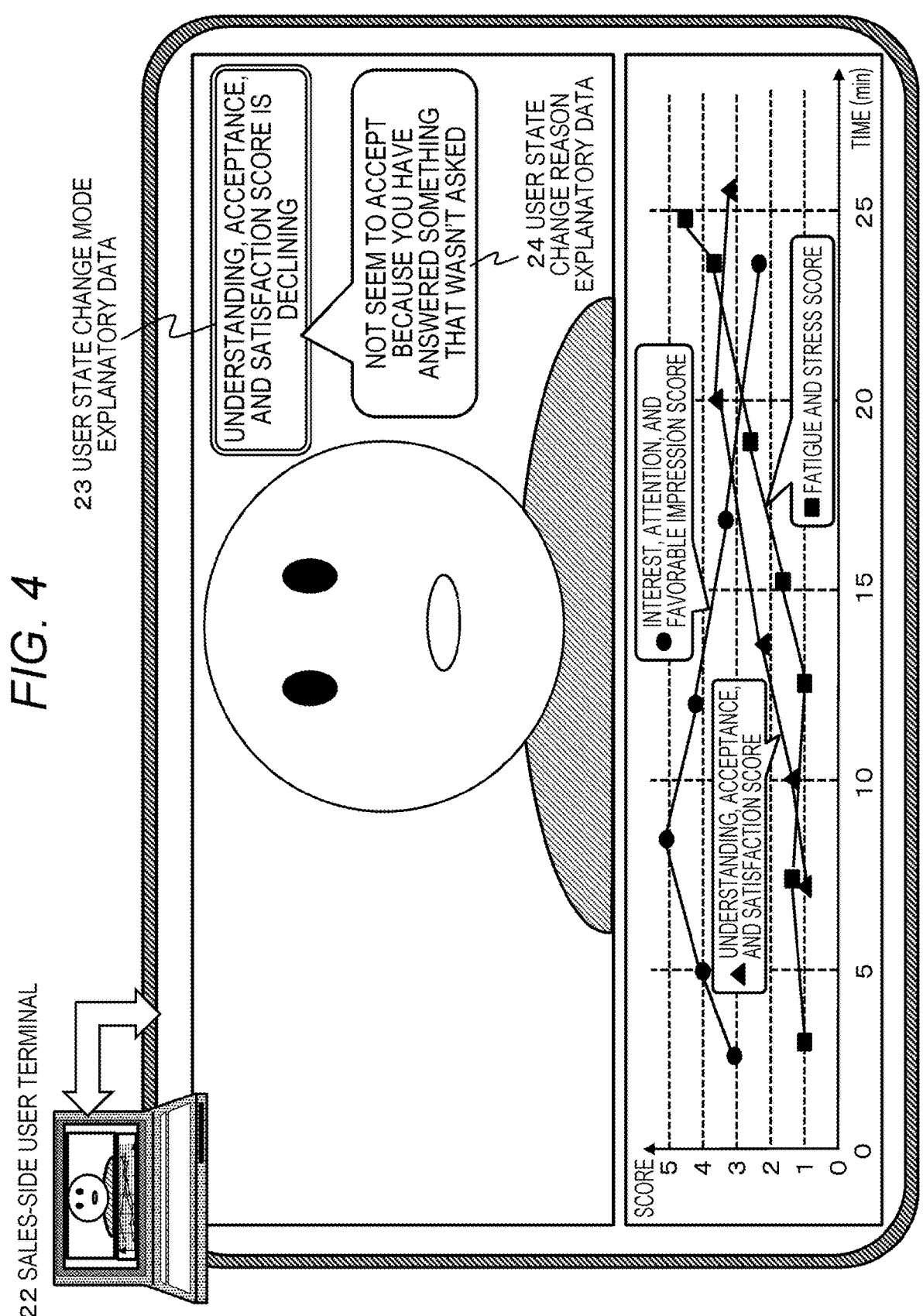
FIG. 4 is a diagram illustrating an example of the data displayed on the user terminal.

Moreover, in a case where there is a change in the estimated score (evaluation value) of any of the user states 1 to 3, the information processing device 100 estimates a reason for the change in the user state, and transmits the estimated reason to the sales-side user terminal 21 to cause the sales-side user terminal 21 to display the estimated reason in addition to the estimated score (evaluation value) (1 to 5) of each of the user states 1 to 3. FIG. 4 illustrates a specific example.

FIG. 4 illustrates an example where user state change mode explanatory data 23 indicating how the user state has changed and user state change reason explanatory data 24 indicating a reason for the change in the user state estimated by the information processing device 100 are displayed together with time-series data of the user state described with reference to FIG. 3.

The user state change reason explanatory data 24 indicates a reason estimated by the information processing device 100 using, for example, a learning model generated in advance.

By referencing the user state change mode explanatory data 23 and the user state change reason explanatory data 24 together with the graph displayed on the sales-side user terminal 22, the sales-side user 12 can accurately grasp the change in the customer-side state, and can take the best possible measure such as changing the way of explanation or explanation content in accordance with the grasping result.

Note that FIGS. 1 and 2 illustrate an example where a device that performs the user state estimation processing using the user state estimator (learning model) is the information processing device 100 deployed on a cloud.

This processing, however, is not limited to processing performed by a device deployed on a cloud, and may be performed using, for example, the sales-side user terminal 22.

Figure 5:
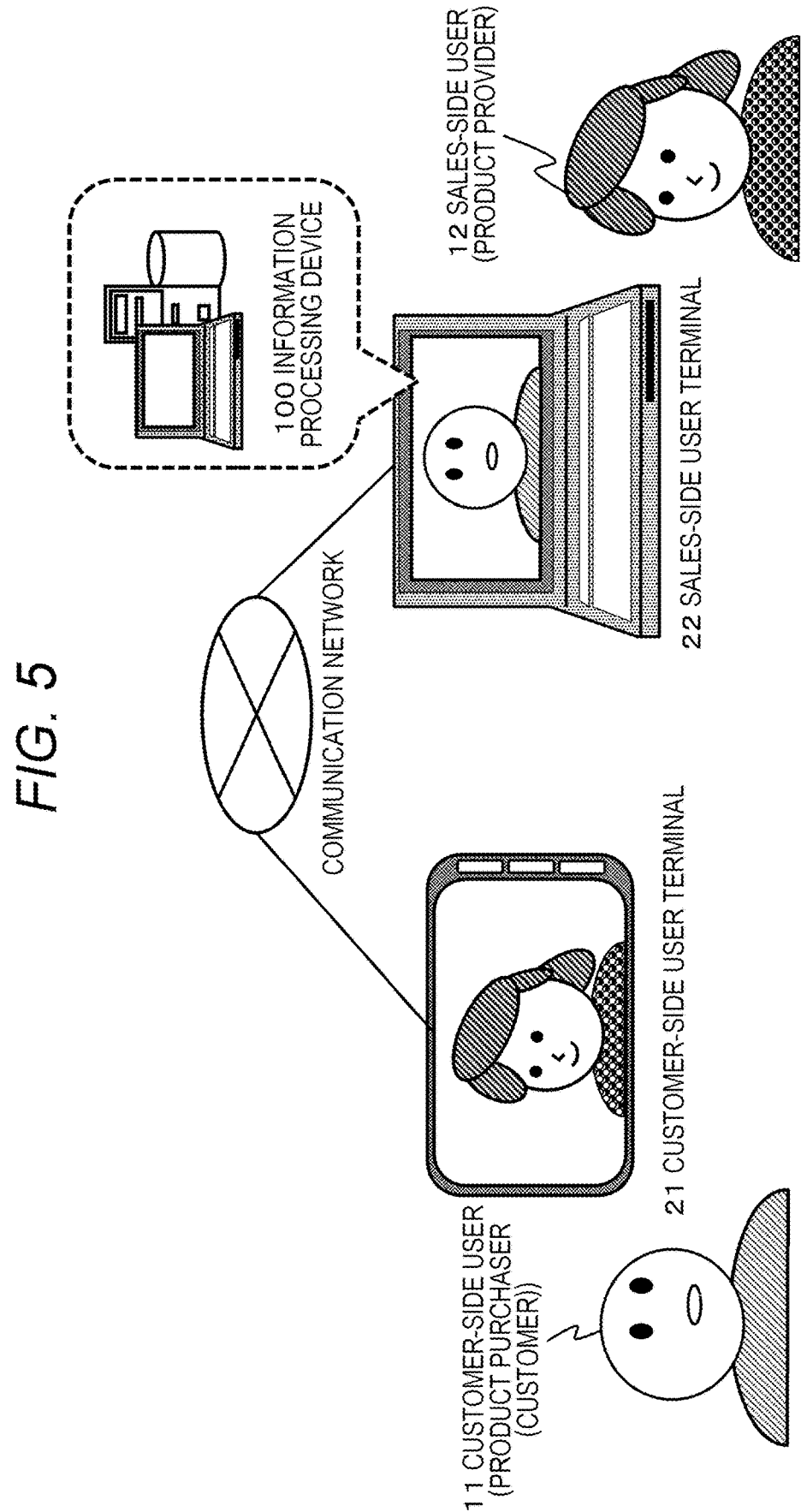
FIG. 5 is a diagram for describing an overview of the configuration of and the processing performed by the information processing system of the present disclosure.

That is, as illustrated in FIG. 5, the user state estimation processing using the user state estimator (learning model) is performed by the sales-side user terminal 22. That is, the processing performed by the information processing device 100 described with reference to FIGS. 1 to 4 may be performed by the sales-side user terminal 22.

Note that a description will be given below of an embodiment as a typical example where the information processing device 100 deployed on the cloud performs the user state estimation processing using the user state estimator (learning model).

2. Overview of Configuration of and Processing Performed by Information Processing Device Next, an overview of configuration of and processing performed by the information processing device will be described.

As described with reference to FIG. 2, the information processing device 100 deployed on the cloud performs the user state estimation processing using the user state estimator (learning model).

Specifically, the information processing device 100 analyzes the user state of the customer-side user 11 who is conducting a meeting via a network, and transmits the analysis result to the sales-side user terminal 22 for display. For example, information regarding the user state of the customer-side user 11 as illustrated in FIGS. 3 and 4 is displayed.

Figure 6:
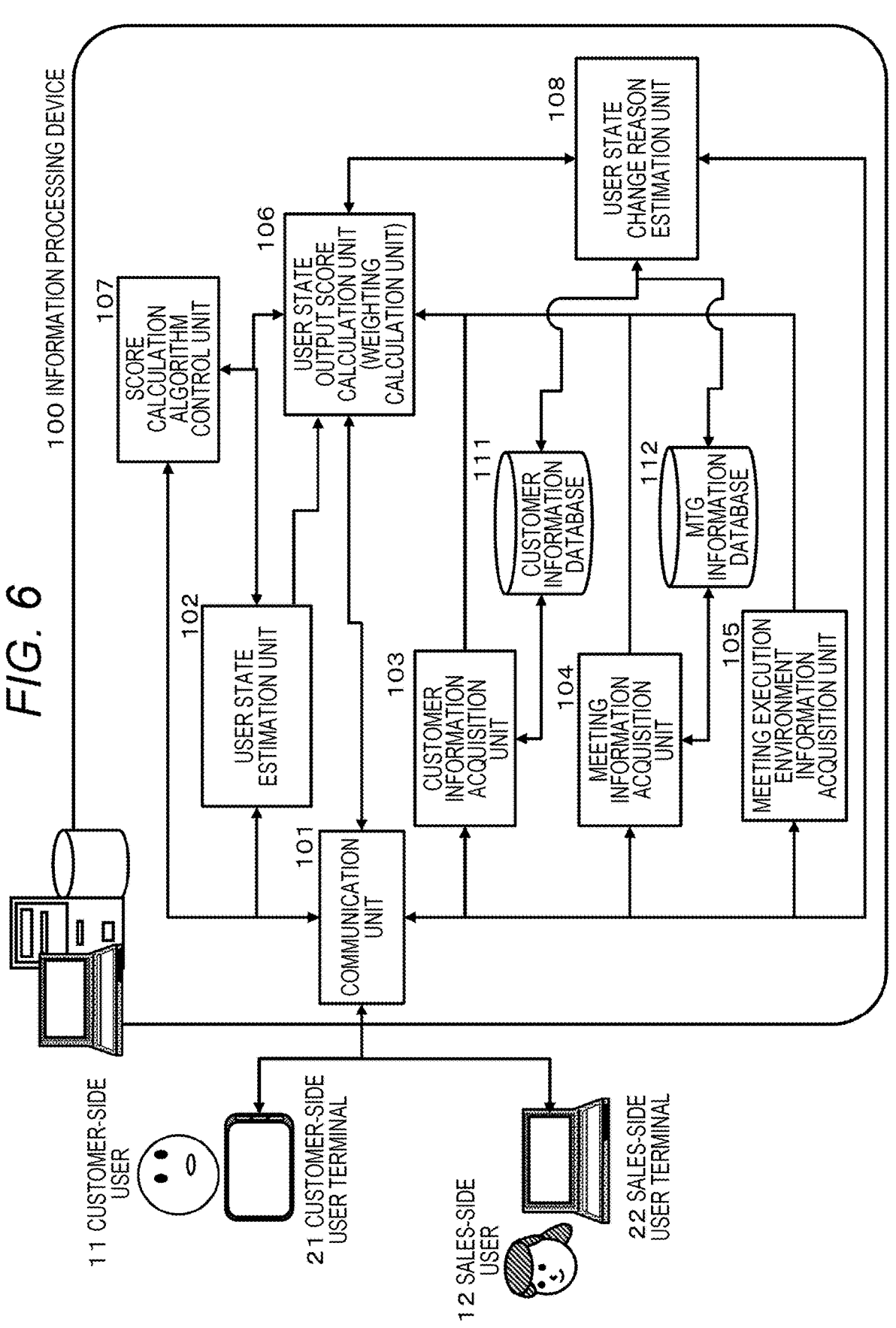
FIG. 6 is a diagram for describing a configuration example of an information processing device of the present disclosure.

FIG. 6 is a diagram illustrating a configuration example of the information processing device 100.

As illustrated in FIG. 6, the information processing device 100 includes a communication unit 101, a user state estimation unit 102, a customer information acquisition unit 103, a meeting information acquisition unit 104, a meeting execution environment information acquisition unit 105, a user state output score calculation unit 106, a score calculation algorithm control unit 107, a user state change reason estimation unit 108, a customer information database 111, and a meeting (MTG) information database 112.

The communication unit 101 performs processing of communicating with an external device such as the customer-side user terminal 21 and the sales-side user terminal 22.

For example, image data and voice data of each user are input from the customer-side user terminal 21 and the sales-side user terminal 22 during a meeting. Moreover, processing of transmitting the result of analysis of the user state of the customer-side user made on the basis of such pieces of input data to the sales-side user terminal 22, and the like are performed.

The user state estimation unit 102 estimates the user state of the customer-side user on the basis of the image data, the voice data, and the like of each user input, via the communication unit 101, from the customer-side user terminal 21 and the sales-side user terminal 22 during a meeting. Specifically, for example, processing of estimating following states is performed:

(user state 1) interest, attention, and favorable impression;
(user state 2) understanding, acceptance, and satisfaction; and
(user state 3) fatigue and stress.

The user state estimation unit 102 estimates the user state of the customer-side user using, for example, a learning model generated in advance. Details of this processing will be described later.

The customer information acquisition unit 103, the meeting information acquisition unit 104, and the meeting execution environment information acquisition unit 105 receive the input of customer information, meeting information, and meeting execution environment information from the customer-side user terminal 21 and the sales-side user terminal 22, respectively.

The customer information is user information regarding the customer-side user 11 who conducts a meeting, and is, for example, information input to the customer-side user terminal 21 by the customer-side user 11 before the start of the meeting. This customer information is recorded in the customer information database 111. Specifically, the user information based on meeting contents, such as age, gender, personality, and physical condition, is recorded.

Note that, in the customer information database 111, information such as a degree of change in expression, a degree of change in tone of voice, used vocabulary, and a stress detection degree is also recorded for each customer, and each customer is subjected to grouping in accordance with such customer characteristics and registered in the database.

The meeting information is, for example, information input to each user terminal by the customer-side user 11 or the sales-side user 12 before the start of the meeting. For example, the information is as follows:

(meeting information a) meeting (MTG) genre;
(meeting information b) meeting (MTG) scale;
(meeting information c) fatigue (customer); and
(meeting information d) busyness (customer).

"(Meeting information a) meeting (MTG) genre" is information indicating a meeting genre such as "business talk", "meeting with external party", "internal meeting", "explanatory meeting", "interview", or "class".

As (meeting information b) meeting (MTG) scale, the scale of the meeting is input. For example, the information indicates the scale of the meeting such as "large" if the number of participants is greater than or equal to 10, "medium" if the number of participants is in a range of from 5 to 9, and "small" if the number of participants is less than or equal to 4.

Note that the meeting information may be set on the basis of not only the three classifications: large, medium, and small, but also two classifications: large and small, and such classification settings are preferably made in accordance with a predefined meeting information setting rule.

(Meeting information c) fatigue (customer) and (meeting information d) busyness (customer) indicate a fatigue level and a busy level of the customer-side user 11 at the start of the meeting.

Such pieces of meeting information c and d may also be set on the basis of not only three classifications: large, medium, and small, but also two classifications: large and small, and such classification settings are preferably made in accordance with the predefined meeting information setting rule.

Note that, for example, the pieces of meeting information a and b are input by the sales-side user 12, and the pieces of meeting information c and d are input by the customer-side user 11 playing the role of a customer.

The sales-side user 12 may ask about the state of the customer-side user 11 and input all the pieces of meeting information a to d.

Note that the above-descried pieces of meeting information a to d are merely examples, and all these pieces of information are not absolutely necessary. Only one of the pieces of information may be used, or meeting information other than the above-described information may be input.

Note that the meeting information is recorded in the meeting information database 112.

The meeting execution environment information acquired by the meeting execution environment information acquisition unit 105 is information regarding an environment where the meeting is conducted such as weather, temperature, and noise.

This information is acquired during the meeting by a microphone or a sensor provided in the customer-side user 21 and the sales-side user 22.

Note that the information acquired by each information acquisition unit such as the customer information acquisition unit 103, the meeting information acquisition unit 104, and the meeting execution environment information acquisition unit 105 is input to the user state output score calculation unit 106 and is used for the user state output score calculation processing. For example, the information is used for processing of calculating a weighting parameter.

Details of this processing will be described later.

The user state output score calculation unit 106 calculates the user state score (evaluation value) that is an output value of the graph indicating the user state of the customer-side user 11 output to the sales-side user terminal 22 described above with reference to FIG. 3.

The user state output score calculation unit 106 calculates a final score (degree-of-interest score, degree-of-understanding score, degree-of-fatigue score) to be output to the sales-side user terminal 22 on the basis of the following user states of the customer-side user 11 estimated by the user state estimation unit 102:

(user state 1) interest, attention, and favorable impression;

(user state 2) understanding, acceptance, and satisfaction; and (user state 3) fatigue and stress.

Note that the user state output score calculation unit 106 performs the score calculation in accordance with an algorithm determined by the score calculation algorithm control unit 107. Furthermore, as described above, the score calculation is performed using the information acquired by the customer information acquisition unit 103, the meeting information acquisition unit 104, and the meeting execution environment information acquisition unit 105.

Details of such processing will be described later.

The score calculation algorithm control unit 107 controls the algorithm applied to the user state score calculation processing performed by the user state output score calculation unit 106.

The score calculation algorithm control unit 107 receives of the input of control information input by the sales-side user 12 from the sales-side user terminal 22 via the communication unit 101, and performs processing of determining and changing the algorithm on the basis of the information.

Details of this processing will also be described later.

For example, in a case where the value of the user state output score of the customer-side user 11 calculated by the user state output score calculation unit 106 largely changes, the user state change reason estimation unit 108 performs processing of estimating a reason for the change.

For example, processing of generating the user state change reason explanatory data 24 to be output to the sales-side user terminal 22 described above with reference to FIG. 4 is performed.

The user state change reason estimation unit 108 performs processing of estimating a reason for the change in the user state using at least one of a learning model or a rule-based model generated in advance.

The user state change reason estimated by the user state change reason estimation unit 108 is output to and displayed on the sales-side user terminal 22 as described with reference to FIG. 4.

Details of the processing performed by the user state change reason estimation unit 108 will also be described later.

3. Details of Processing Performed by Information Processing Device

Next, details of processing performed by the information processing device will be described.

Hereinafter, details of processing performed by each of the components of the information processing device 100 illustrated in FIG. 6, the components including as the user state estimation unit 102, the user state output score calculation unit 106, the score calculation algorithm control unit 107, and the user state change reason estimation unit 108, will be sequentially described in the following order.

3-1. Details of processing performed by user state estimation unit 3-2. Details of processing performed by user state output score calculation unit 3-3. Details of processing performed by score calculation algorithm control unit and UI displayed on sales-side user terminal 3-4. Details of processing performed by user state change reason estimation unit (3-1. Details of Processing Performed by User State Estimation Unit)

First, details of the processing performed by the user state estimation unit 102 of the information processing device 100 will be described.

Figure 7:
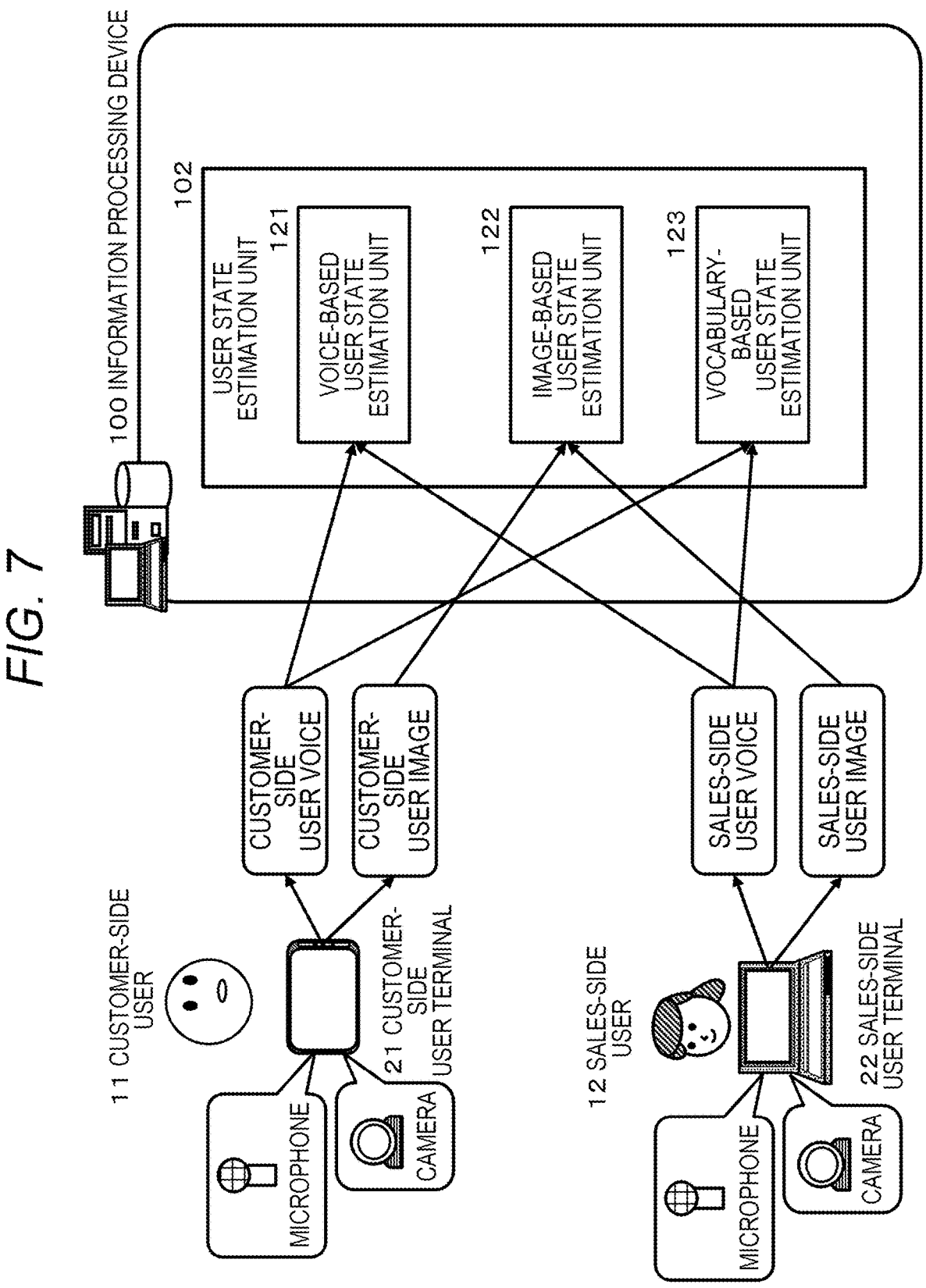
FIG. 7 is a diagram for describing a configuration of and processing performed by a user state estimation unit of the information processing device of the present disclosure.

FIG. 7 is a diagram illustrating a configuration example of the user state estimation unit 102 of the information processing device 100.

As illustrated in FIG. 7, the user state estimation unit 102 includes a voice-based user state estimation unit 121, an image-based user state estimation unit 122, and a vocabulary-based user state estimation unit 123.

The voice-based user state estimation unit 121 receives the input of at least one of voice information containing the voice of the customer-side user 11 acquired by the microphone of the customer-side user terminal 21 or voice information containing the voice of the sales-side user 12 acquired by the microphone of the sales-side user terminal 22, and estimates the user state of the customer-side user 11 on the basis of the input voice information.

The image-based user state estimation unit 122 receives the input of at least one of image information containing the face image showing the expression of the customer-side user 11 acquired by a camera of the customer-side user terminal 21 or image information containing the face image showing the expression of the sales-side user 12 acquired by a camera of the sales-side user terminal 22, and estimates the user state of the customer-side user 11 on the basis of the input image information.

The vocabulary-based user state estimation unit 123 receives the input of at least one of voice information containing the utterance of the customer-side user 11 acquired by the microphone of the customer-side user terminal 21 or voice information containing the utterance of the sales-side user 12 acquired by the microphone of the sales-side user terminal 22, and estimates the user state of the customer-side user 11 on the basis of utterance content acquired from the input voice information.

The vocabulary-based user state estimation unit 123 is provided with a voice analysis unit that converts voice data into text, and the user state of the customer-side user 11 is estimated on the basis of the text-converted utterance content of the customer-side user 11 or the text-converted utterance content of the sales-side user 12.

The voice analysis unit in the vocabulary-based user state estimation unit 123 is, for example, a voice analysis unit using an automatic speech recognition (ASR) function.

Note that the voice-based user state estimation unit 121, the image-based user state estimation unit 122, and the vocabulary-based user state estimation unit 123 are all configured to estimate the following user states of the customer-side user 11:

(user state 1) interest, attention, and favorable impression;

(user state 2) understanding, acceptance, and satisfaction; and (user state 3) fatigue and stress.

Furthermore, the voice-based user state estimation unit 121, the image-based user state estimation unit 122, and the vocabulary-based user state estimation unit 123 all perform the user state estimation processing using, for example, a learning model generated by means of machine learning processing performed in advance.

Specifically, for example, the user state estimation processing is performed using a learning model generated as a result of performing machine learning to which a multilayer neural network algorithm such as a deep neural network (DNN), a convolutional neural network (CNN), or a recurrent neural network (RNN) is applied.

Note that the user state estimation unit 102 is not limited to the voice-based user state estimation unit 121, the image-based user state estimation unit 122, and the vocabulary-based user state estimation unit 122, and may have a configuration including a user state estimation processing unit that uses information other than images, voices, and vocabulary.

Figure 8:
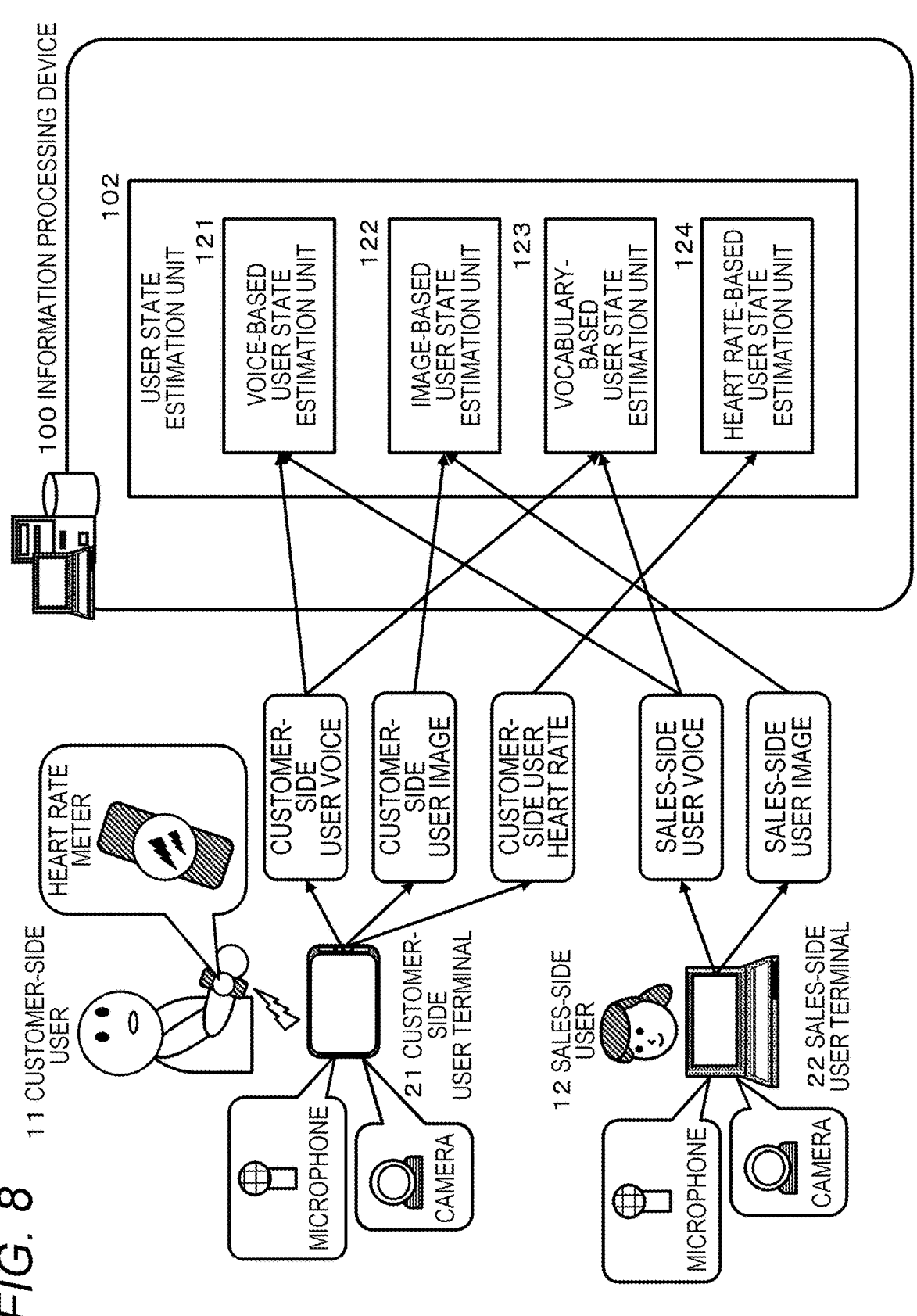
FIG. 8 is a diagram for describing the configuration of and the processing performed by the user state estimation unit of the information processing device of the present disclosure.

For example, a heart rate-based user state estimation unit 124 illustrated in FIG. 8 can be used.

The heart rate-based user state estimation unit 124 illustrated in FIG. 8 performs heart rate-based user state estimation processing using heart rate information that is detection information received, via the customer-side user terminal 21, by the information processing device 100 from a heart rate sensor (heart rate meter) attached to the customer-side user 11.

Note that another configuration may be employed where the heart rate of the user is estimated by means of analysis of the face image (moving image) of the user with no heart rate sensor attached to the user, and information regarding the estimated heart rate is used.

As described above, a configuration may be employed where detection information from various biometric sensors attached to the customer-side user 11 and the sales-side user 12 is used for the user state estimation processing.

As described above, each estimation unit of the user state estimation unit 102 is configured to estimate the following user states of the customer-side user 11:

(user state 1) interest, attention, and favorable impression;

(user state 2) understanding, acceptance, and satisfaction; and (user state 3) fatigue and stress.

An example of the user state estimation processing performed by the image-based user state estimation unit 122 of the user state estimation unit 102 will be described with reference to FIG. 9.

As described above, the image-based user state estimation unit 122 receives the input of at least one of image information containing the face image showing the expression of the customer-side user 11 acquired by the camera of the customer-side user terminal 21 or image information containing the face image of the sales-side user 12 acquired by the camera of the sales-side user terminal 22, and estimates the user state of the customer-side user 11 on the basis of the input image information.

Figure 9:
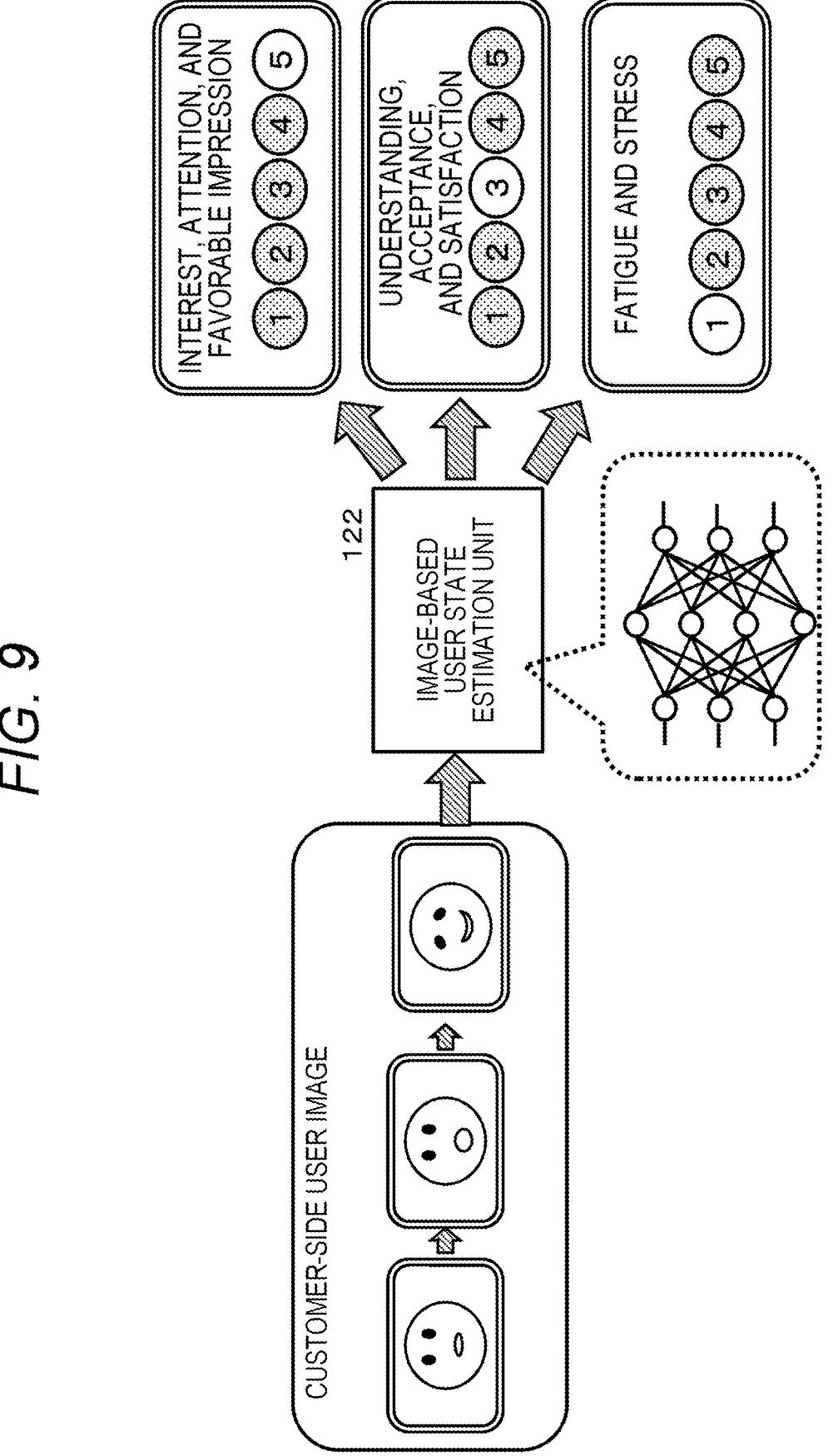
FIG. 9 is a diagram describing an example of the processing performed by the information processing device of the present disclosure.

The example illustrated in FIG. 9 indicates a processing example where the image-based user state estimation unit 122 receives the input of image information containing the face image of the customer-side user 11 and estimates the user state of the customer-side user 11 on the basis of the input image information.

As described above, the image-based user state estimation unit 122 includes a learning model of a neural network type such as DNN, CNN, or RNN, for example, inputs the image information containing the face image of the customer-side user 11 to the learning model, and outputs a user state estimated score (evaluation value).

The example illustrated in FIG. 9 is an example where the image-based user state estimation unit 122 estimates and outputs, on the basis of the image information containing the face image of the customer-side user 11, each of the following scores (evaluation values) as the user state of the customer-side user 11:

(user state 1) interest, attention, and favorable impression score (degree-of-interest score)=5;

(user state 2) understanding, acceptance, and satisfaction score (degree-of-understanding score)=3; and (user state 3) fatigue and stress score (degree-of-fatigue score)=1.

Note that the score (evaluation value) of each of the user states 1 to 3 is determined on a scale of 1 to 5.

Figure 10:
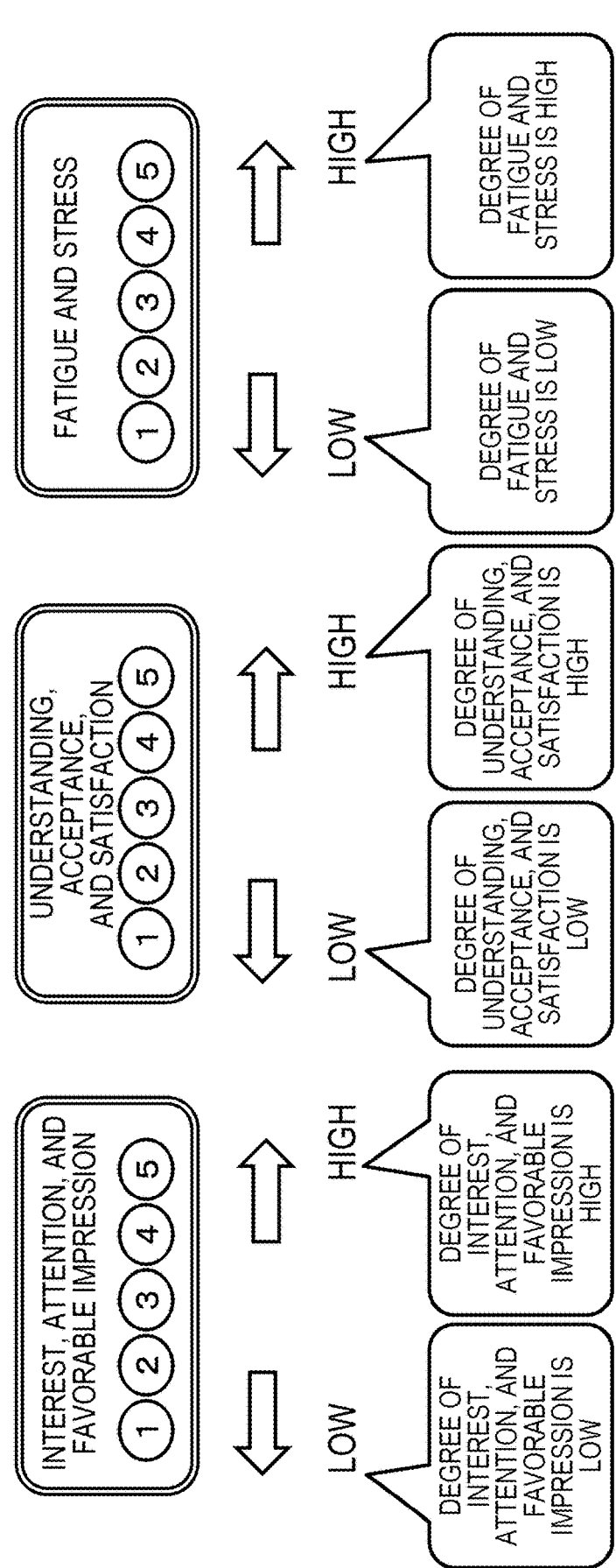
FIG. 10 is a diagram for describing a setting example of a user state score.

FIG. 10 illustrates a setting example of the score (evaluation value)=1 to 5 of (user states 1 to 3).

As for (user state 1) interest, attention, and favorable impression score (degree-of-interest score), the higher the level of interest, attention, and favorable impression of the customer-side user 11 for the explanation and talk made by the sales-side user 12, the higher the score (evaluation value) (the closer the score is to 5), and the lower the level of interest, attention, and favorable impression, the lower the score (evaluation value) (the closer the score is to 1).

As for (user state 2) understanding, acceptance, and satisfaction score (degree-of-understanding score), the higher the level of understanding, acceptance, and satisfaction of the customer-side user 11 for the explanation and talk made by the sales-side user 12, the higher the score (evaluation value) (the closer the score is to 5), and the lower the level of understanding, acceptance, and satisfaction, the lower the score (evaluation value) (the closer the score is to 1).

As for (user state 3) fatigue and stress score (degree-of-fatigue score), the higher the level of fatigue and stress of the customer-side user 11 for the explanation and talk made by the sales-side user 12, the higher the score (evaluation value) (the closer the score is to 5), and the lower the level of fatigue and stress, the lower the score (evaluation value) (the closer the score is to 1).

Figure 11:
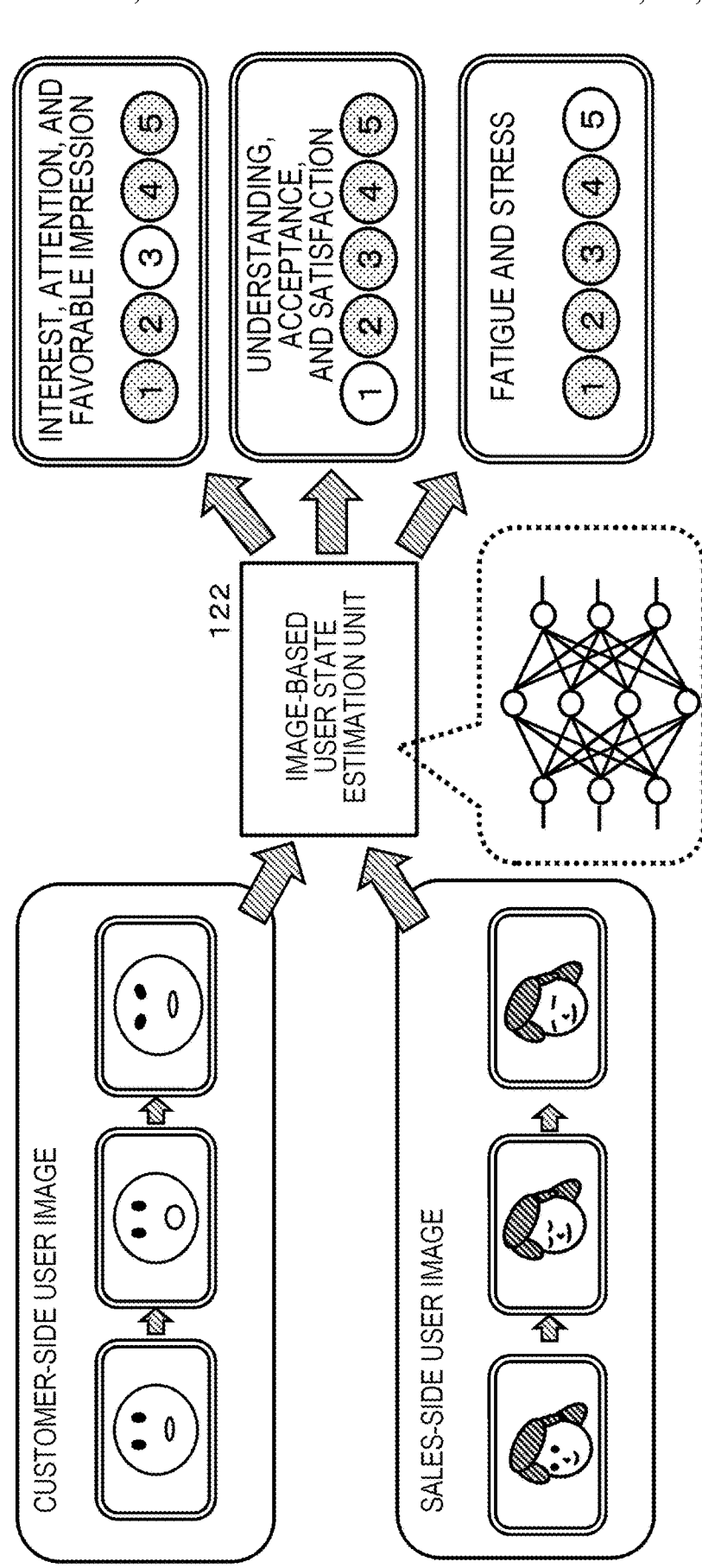
FIG. 11 is a diagram describing an example of the processing performed by the information processing device of the present disclosure.

FIG. 11 is a diagram illustrating a processing example where the image-based user state estimation unit 122 estimates the user state of the customer-side user 11 using two types of image data including not only the image information containing the face image of the customer-side user 11 but also the image information containing the face image of the sales-side user 12.

As described above, the image-based user state estimation unit 122 performs processing of estimating the user state of the customer-side user 11 using at least one of the face image of the customer-side user 11 or the face image of the sales-side user 12.

The same applies to each estimation unit other than the image-based user state estimation unit 122 of the user state estimation unit 102, and such an estimation unit outputs, on the basis of each piece of input information (voice, image, vocabulary, heart rate, and the like), the following estimated scores (evaluation values) of the user state of the customer-side user 11:

(user state 1) interest, attention, and favorable impression;
(user state 2) understanding, acceptance, and satisfaction; and
(user state 3) fatigue and stress.

The estimated scores of the three user states 1 to 3 estimated by the respective estimation units of the user state estimation unit 102 are input to the user state output score calculation unit 106.

(3-2. Details of processing performed by user state output score calculation unit) Next, details of processing performed by the user state output score calculation unit will be described.

Processing performed by the user state output score calculation unit 106 will be described with reference to FIG. 12.

Figure 12:
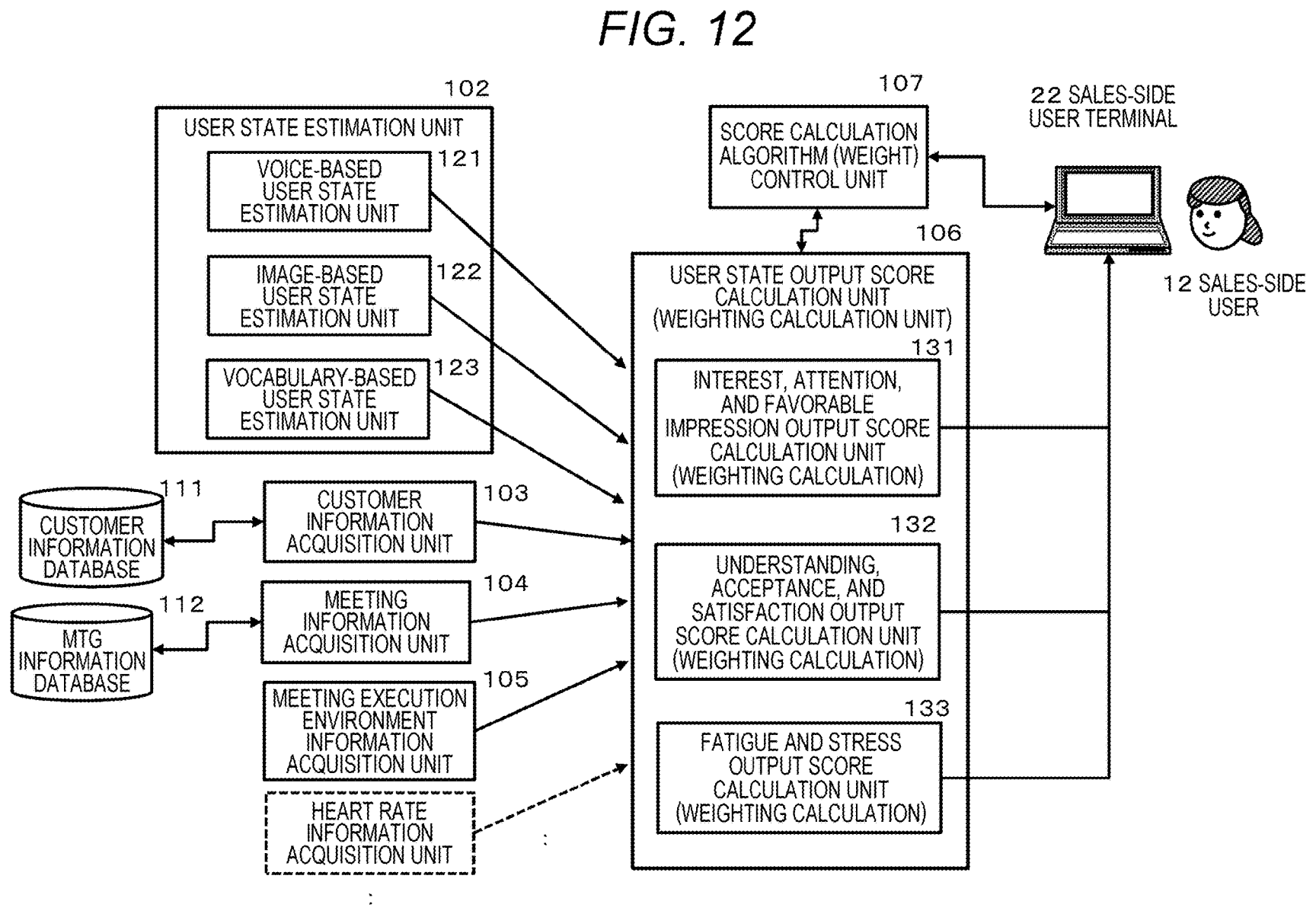

As illustrated in FIG. 12, the user state output score calculation unit 106 includes an interest, attention, and favorable impression output score calculation unit 131, an understanding, acceptance, and satisfaction output score calculation unit 132, and a fatigue and stress output score calculation unit 133.

The user state output score calculation unit 106 calculates the user state score (evaluation value) of the customer-side user 11 to be output to the sales-side user terminal 22 described above with reference to FIG. 3.

The interest, attention, and favorable impression output score calculation unit 131 calculates an interest, attention, and favorable impression output score of the customer user 11 in the graph to be output to the sales-side user terminal 22.

The understanding, acceptance, and satisfaction output score calculation unit 132 calculates an understanding, acceptance, and satisfaction output score of the customer user 11 in the graph to be output to the sales-side user terminal 22.

The fatigue and stress output score calculation unit 133 calculates a fatigue and stress score of the customer user 11 in the graph to be output to the sales-side user terminal 22.

As described above, the user state output score calculation unit 106 calculates a final score (evaluation value) to be output to the sales-side user terminal 22 on the basis of the value of the estimated score of the user state of the customer-side user 11 estimated by each estimation unit of the user state estimation unit 102, the estimated score including the estimated scores (degree-of-interest score, degree-of-understanding score, and degree-of-fatigue score) of the following user states:

(user state 1) interest, attention, and favorable impression;
(user state 2) understanding, acceptance, and satisfaction; and
(user state 3) fatigue and stress.

Specifically, the final output score is calculated by means of weighted addition processing and the like performed on the estimated score estimated by each estimation unit of the user state estimation unit 102.

As illustrated in FIG. 12, the final score (evaluation value) to be output to the sales-side user terminal 22 is calculated by means of weighted addition performed using a weight parameter calculated using the information acquired by the customer information acquisition unit 103, the meeting information acquisition unit 104, and the meeting execution environment information acquisition unit 105.

The information acquired by the customer information acquisition unit 103, the meeting information acquisition unit 104, and the meeting execution environment information acquisition unit 105 includes, for example, elapsed time of the meeting, weather, personality, physical condition, and activity log of the customer-side user and the sales-side user, and the like, and the weight parameter can be adjusted using such pieces of information.

As described above, for example, in the customer information database 111, information such as the degree of change in expression, the degree of change in tone of voice, the used vocabulary, and the stress detection degree of each customer is recorded, and grouping is performed in accordance with such customer characteristics. For example, for customers belonging to the same group, processing such as setting the same weight parameter used for the user state output score calculation processing can be performed.

Furthermore, the user state output score calculation unit 106 performs the score calculation in accordance with the algorithm determined by the score calculation algorithm control unit 107.

An example of the output score (evaluation value) calculation processing of outputting the output score to the sales-side user terminal 22 performed by the user state output score calculation unit 106 will be described with reference to FIG. 13.

Figure 13:
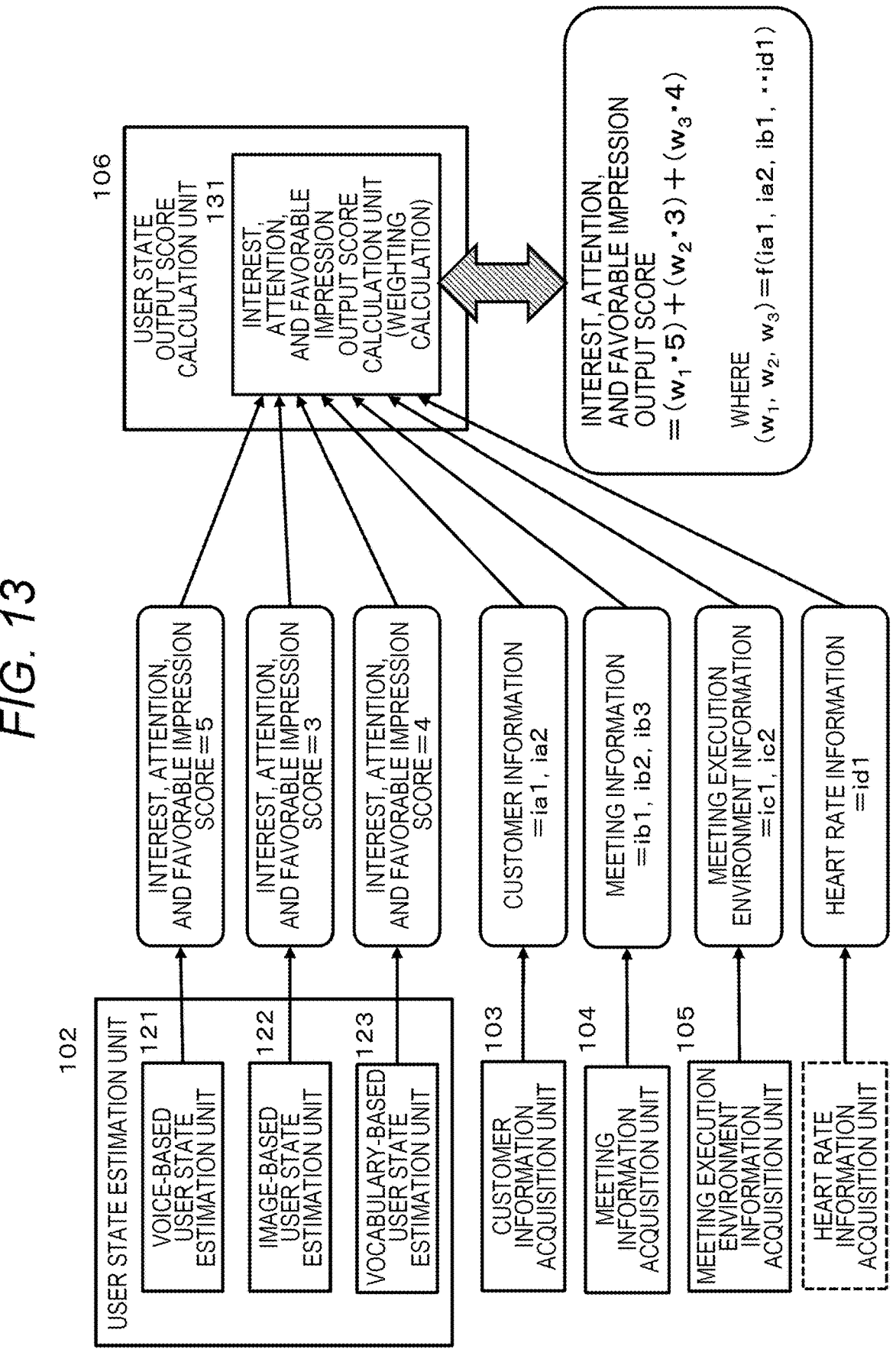
FIG. 13 is a diagram describing an example of the processing performed by the information processing device of the present disclosure.

The example illustrated in FIG. 13 is a diagram illustrating a processing example performed by the interest, attention, and favorable impression output score calculation unit 131 that is one of the output score calculation units in the user state output score calculation unit 106.

The interest, attention, and favorable impression output score calculation unit 131 of the user state output score calculation unit 106 receives the input of three interest, attention, and favorable impression score values estimated by the following three user state estimation units of the user state estimation unit 102 located upstream of the user state output score calculation unit 106: the voice-based user state estimation unit 121; the image-based user state estimation unit 122; and the vocabulary-based user state estimation unit 123, and calculates a final output score value by weighting and adding up the three score values. That is, the interest, attention, and favorable impression score (degree-of-interest score) to be output to the sales-side user terminal 22 is calculated.

As illustrated in FIG. 13, it is assumed that the interest, attention, and favorable impression output scores estimated by the three user state estimation units of the user state estimation unit 102, that is, the voice-based user state estimation unit 121, and the image-based user state estimation unit 122, are as following:

interest, attention, and favorable impression output score estimated by the voice-based user state estimation unit 121=5;

interest, attention, and favorable impression output score estimated by the image-based user state estimation unit 122=3; and interest, attention, and favorable impression output score estimated by the vocabulary-based user state estimation unit 123=4.

In this case, the interest, attention, and favorable impression output score calculation unit 131 of the user state output score calculation unit 106 calculates a final output score value in accordance with the following calculation formula (Formula 1). That is, the interest, attention, and favorable impression output score to be output to the sales-side user terminal 22 is calculated.

$$\text{Interest,attention, and favorable impression output score}=(w_1\cdot5)+(w_2\cdot3)+(w_3\cdot4) \tag{Formula 1}$$

In the above-described (Formula 1), 5, 3, and 4 are the estimated values of interest, attention, and favorable impression scores estimated by the three user state estimation units of the user state estimation unit 102, that is, the voice-based user state estimation unit 121 and the image-based user state estimation unit 122.

Furthermore, $w_1$, $w_2$, and $w_3$ are weight parameters by which the scores estimated by the three user state estimation units are multiplied.

That is, $w_1$=multiplication weight coefficient for the voice-based user state score (interest, attention, and favorable impression output score, etc.) estimated by the voice-based user state estimation unit 121, $w_2$=multiplication weight coefficient for the image-based user state score (interest, attention, and favorable impression output score, etc.) estimated by the image-based user state estimation unit 122, and $w_3$=multiplication weight coefficient for the vocabulary-based user state score (interest, attention, and favorable impression output score, etc.) estimated by the vocabulary-based user state estimation unit 123.

Note that the voice-based user state estimation unit 121 performs user state estimation processing mainly based on tone of voice, the image-based user state estimation unit 122 performs user state estimation processing mainly based on expression, and the vocabulary-based user state estimation unit 123 performs user state estimation processing based on utterance content.

Furthermore, basically, the weight parameters $w_1$, $w_2$, and $w_3$ may be preset, but for example, it is also possible to change the weight parameters w1, w2, and w3 one after another using pieces of information acquired by the customer information acquisition unit 103, the meeting information acquisition unit 104, the meeting execution environment information acquisition unit 105, and the like. For example, the weight parameters $w_1$, $w_2$, and $w_3$ may be calculated in accordance with the following formula (Formula 2):

$$(w_1,w_2,w_3)=f(ia1,ia2,ib1,\ldots id1) \tag{Formula 2}$$

Note that, in the above-described (Formula 2), ia1, ia2, ib1, . . . id1 are values indicating the pieces of information acquired by the customer information acquisition unit 103, the meeting information acquisition unit 104, the meeting execution environment information acquisition unit 105, and the like, and f( ) is a weight calculation function using each of the above-described pieces of information, and this function is performed to calculate the weight parameters $w_1$, $w_2$, and $w_3$.

Note that the weight calculation function f is predefined. Furthermore, it can be changed under the control of the score calculation algorithm control unit 107.

The score calculation algorithm control unit 107 is operable from the sales-side user terminal 22 via the communication unit 101, and can set or change the score calculation algorithm according to the operation of the sales-side user 12.

As illustrated in FIG. 13, the user state output score calculation unit 106 includes the understanding, acceptance, and satisfaction output score calculation unit 132, and the fatigue and stress output score calculation unit 133 in addition to the interest, attention, and favorable impression output score calculation unit 131.

Such output score calculation units also perform processing similar to the output score calculation processing performed by the interest, attention, and favorable impression output score calculation unit 131 described with reference to FIG. 13.

FIG. 14 illustrates examples of the output scores calculated by the interest, attention, and favorable impression output score calculation unit 131, the understanding, acceptance, and satisfaction output score calculation unit 132, and the fatigue and stress output score calculation unit 133 of the user state output score calculation unit 106 for the three user state scores estimated by the three user state estimation units: the voice-based user state estimation unit 121; the image-based user state estimation unit 122; and the vocabulary-based user state estimation unit 123, of the user state estimation unit 102 located upstream of the user state output score calculation unit 106.

For example, (1) in the table shown in FIG. 14 is an output score calculation example of the interest, attention, and favorable impression output score calculation unit 131 of the user state output score calculation unit 106. Three interest, attention, and favorable impression scores estimated by the three user state estimation units: the voice-based user state estimation unit 121; the image-based user state estimation unit 122; and the vocabulary-based user state estimation unit 123, of the user state estimation unit 102 located upstream of the user state output score calculation unit 106 are 5, 3, and 4, respectively.

At this time, the interest, attention, and favorable impression output score calculation unit 131 of the user state output score calculation unit 106 calculates an interest, acceptance, and favorable impression output score=4 in accordance with the equation of interest, attention, and favorable impression output score=$(w_1\cdot5)+(w_2\cdot3)+(w_3\cdot4)$=4.

Furthermore, (2) in the table shown in FIG. 14 is an output score calculation example of the understanding, acceptance, and satisfaction output score calculation unit 132 of the user state output score calculation unit 106. Three understanding, acceptance, and satisfaction scores estimated by the three user state estimation units: the voice-based user state estimation unit 121; the image-based user state estimation unit 122; and the vocabulary-based user state estimation unit 123, of the user state estimation unit 102 located upstream are 3, 4, and 3, respectively.

At this time, the understanding, acceptance, and satisfaction output score calculation unit 132 of the user state output score calculation unit 106 calculates an understanding, acceptance, and satisfaction output score=3 in accordance with the equation of understanding, acceptance, and satisfaction output score=$(w_1\cdot3)+(w_2\cdot4)+(w_3\cdot3)$=3.

Moreover, (3) in the table shown in FIG. 14 is an output score calculation example of the fatigue and stress output score calculation unit 133 of the user state output score calculation unit 106. Three fatigue and stress scores estimated by the three user state estimation units: the voice-based user state estimation unit 121; the image-based user state estimation unit 122; and the vocabulary-based user state estimation unit 123, of the user state estimation unit 102 located upstream are 1, 2, and 1, respectively.

At this time, the fatigue and stress output score calculation unit 131 of the user state output score calculation unit 106 calculates a fatigue and stress score=1 in accordance with the equation of fatigue and stress output score=$(w_1 \cdot 1)+(w_2 \cdot 2)+(w_3 \cdot 1)=1$.

As described above, the interest, attention, and favorable impression output score calculation unit 131, the understanding, acceptance, and satisfaction output score calculation unit 132, and the fatigue and stress output score calculation unit 133 of the user state output score calculation unit 106 each calculate the output score to be output to the sales-side user terminal 22 by weighting and adding up the values estimated by the user state estimation units of the user state estimation unit 102 located upstream. That is, the following output scores are calculated:

(user state 1 score) interest, attention, and favorable impression score;

(user state 2 score) understanding, acceptance, and satisfaction score; and (user state 3 score) fatigue and stress score.

Such output score values calculated by the user state output score calculation unit 106 are output to the sales-side user terminal 22 and displayed in graph form.

Figure 15:
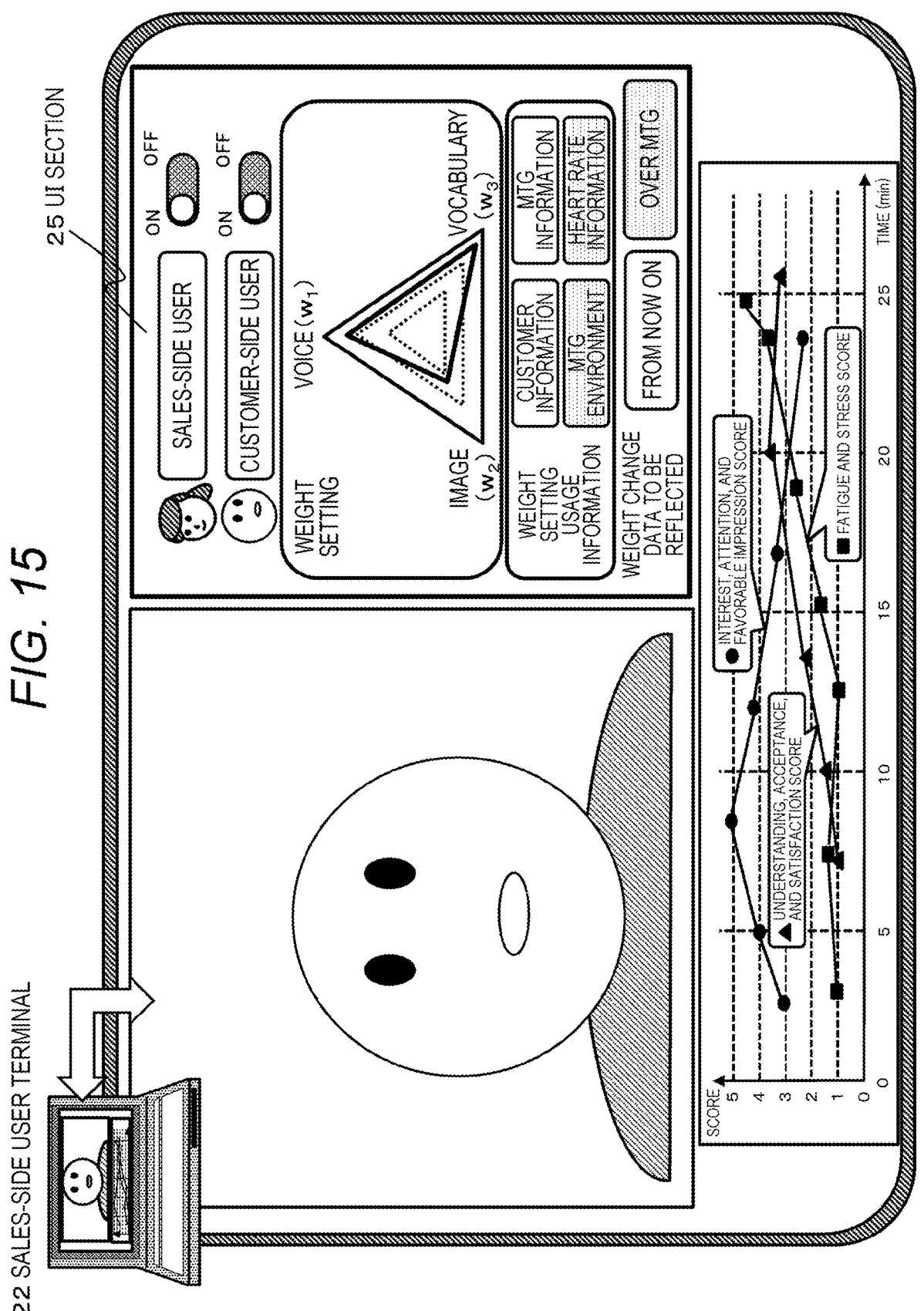
FIG. 15 is a diagram for describing an example of the data displayed on the user terminal.

FIG. 15 illustrates a graph display example.

As illustrated in FIG. 15, the graph displayed on the display unit of the sales-side user terminal 22 is a graph in which the horizontal axis represents time elapsed from the start of the meeting and the vertical axis represents the value (1 to 5) of the estimated score (evaluation value) of each of the user states 1 to 3.

The user state estimation unit 102 and the user state output score calculation unit 106 of the information processing device 100 continuously perform processing during the meeting period using the customer-side user terminal 21 and the sales-side user terminal 22.

In a case where there is a change in the user state score estimated by the user state estimation unit 102, or the like, graph update processing is performed.

Note that, in a graph on the lower side of the image displayed on the sales-side user terminal 22 illustrated in FIG. 15, a graph (line) of (●) is a graph showing changes over time in the estimated score (degree-of-interest score) of "(user state 1) interest, attention, and favorable impression";

a graph (line) of (▲) is a graph showing changes over time in the estimated score (degree-of-understanding score) of "(user state 2) understanding, acceptance, and satisfaction"; and a graph (line) of (■) is a graph showing changes over time in the estimated score (degree-of-fatigue score) of "(user state 3) fatigue and stress".

By viewing the graph displayed on the sales-side user terminal 22, the sales-side user 12 can easily grasp a change in the customer-side state, and can take the best possible measure such as changing the way of explanation or explanation content in accordance with the grasping result.

Note that the graph generation processing may be performed by the user state output score calculation unit 106 of the information processing device 100 or may be performed in the sales-side user terminal 22.

In a case where the user state output score calculation unit 106 of the information processing device 100 generates a graph, the user state output score calculation unit 106 generates the graph on the basis of the user state output score at each time and transmits the graph to the sales-side user terminal 22.

Furthermore, in a case where the sales-side user terminal 22 generates and displays a graph, the user state output score calculation unit 106 transmits, one after another, the user state output score at each time to the sales-side user terminal 22. The sales-side user terminal 22 plots, one after another, the user state output scores received from the user state output score calculation unit 106 along the time axis to generate and display a graph.

Upper right display data of the display data illustrated in FIG. 15 is a UI section 25 that can be manipulated by the sales-side user 12.

The sales-side user 12 can change the score calculation algorithm applied to the information processing device 100 by manipulating the UI section 25.

That is, information regarding the manipulation of the UI section 25 made by the sales-side user 12 is transmitted to the information processing device 100 via the network.

The UI manipulation information received by the communication unit 101 of the information processing device 100 is input to the score calculation algorithm control unit 107 of the information processing device 100.

The score calculation algorithm control unit 107 of the information processing device 100 changes and controls the score calculation algorithm in accordance with the information regarding the manipulation of the UI section 25 made by the sales-side user 12.

(3-3. Details of Processing Performed by Score Calculation Algorithm Control Unit and UI Displayed on Sales-Side User Terminal)

Next, details of processing performed by the score calculation algorithm control unit and a UI displayed on the sales-side user terminal will be described.

A specific configuration example of the UI section 25 that is displayed on the sales-side user terminal 22 and can be manipulated by the sales-side user 12 will be described with reference to FIG. 16.

As illustrated in FIG. 16, the following UI parts a to e (manipulation parts a to e) are displayed in the UI section 25:

UI part a: setting as to whether to enable (ON) or disable (OFF) image, voice, and vocabulary of sales-side user;

UI part b: setting as to whether to enable (ON) or disable (OFF) image, voice, and vocabulary of customer-side user;

UI part c: weight setting of each of image-based user state score, voice-based user state score, and vocabulary-based user state score to be applied to user state output score calculation;

UI part d: selection of information used to adjust weight of each of image-based user state score, voice-based user state score, and vocabulary-based user state score to be applied to user state output score calculation; and UI part e: setting of a range of data after weight change to be reflected (setting as to whether or not to reflect in data from now on or to reflect in all data after start of MTG).

The UI part a is a UI that sets whether to enable (ON) or disable (OFF) the image, voice, and vocabulary of the sales-side user, and can set whether to use (ON) the image, voice, and vocabulary of the sales-side user for score calculation or not (OFF).

The UI part b is a UI that sets whether to enable (ON) or disable (OFF) the image, voice, and vocabulary of the customer-side user, and can set whether to use (ON) the image, voice, and vocabulary of the customer-side user for score calculation or not (OFF).

The UI part c is a UI that sets the respective weights of the image-based user state score, the voice-based user state score, and the vocabulary-based user state score to be applied to the user state output score calculation, and can change the image, voice, and vocabulary weights ($w_1$, $w_2$, $w_3$) to be applied to the score calculation.

Each vertex of the triangle shown in the drawing corresponds to the weight value of a corresponding one of the image-based user state score, the voice-based user state score, and the vocabulary-based user state score. The weight increases as the vertex is set outward, and the weight decreases as the vertex is moved inward.

The UI part d is a UI that selects information to be used to adjust the weight of each of the image-based user state score, the voice-based user state score, and the vocabulary-based user state score to be applied to the user state output score calculation, and can select information to be applied to the processing of calculating the image, voice, and vocabulary weights ($w_1$, $w_2$, $w_3$) to be applied to the score calculation.

The example illustrated in the drawing indicates a configuration example where information to be applied to the processing of calculating the image, voice, and vocabulary weights ($w_1$, $w_2$, $w_3$) can be selected from four pieces of information including customer information, MTG information, MTG environment, and heart rate information, and the example illustrated in the drawing corresponds to a setting example where the customer information and the MTG information are used, and the MTG environment and the heart rate information are not used.

The UI part e is a UI that sets a range of data after weight change to be reflected. It is possible to select a setting to reflect in data from now on or a setting to reflect in all data after the start of MTG.

Figure 17:
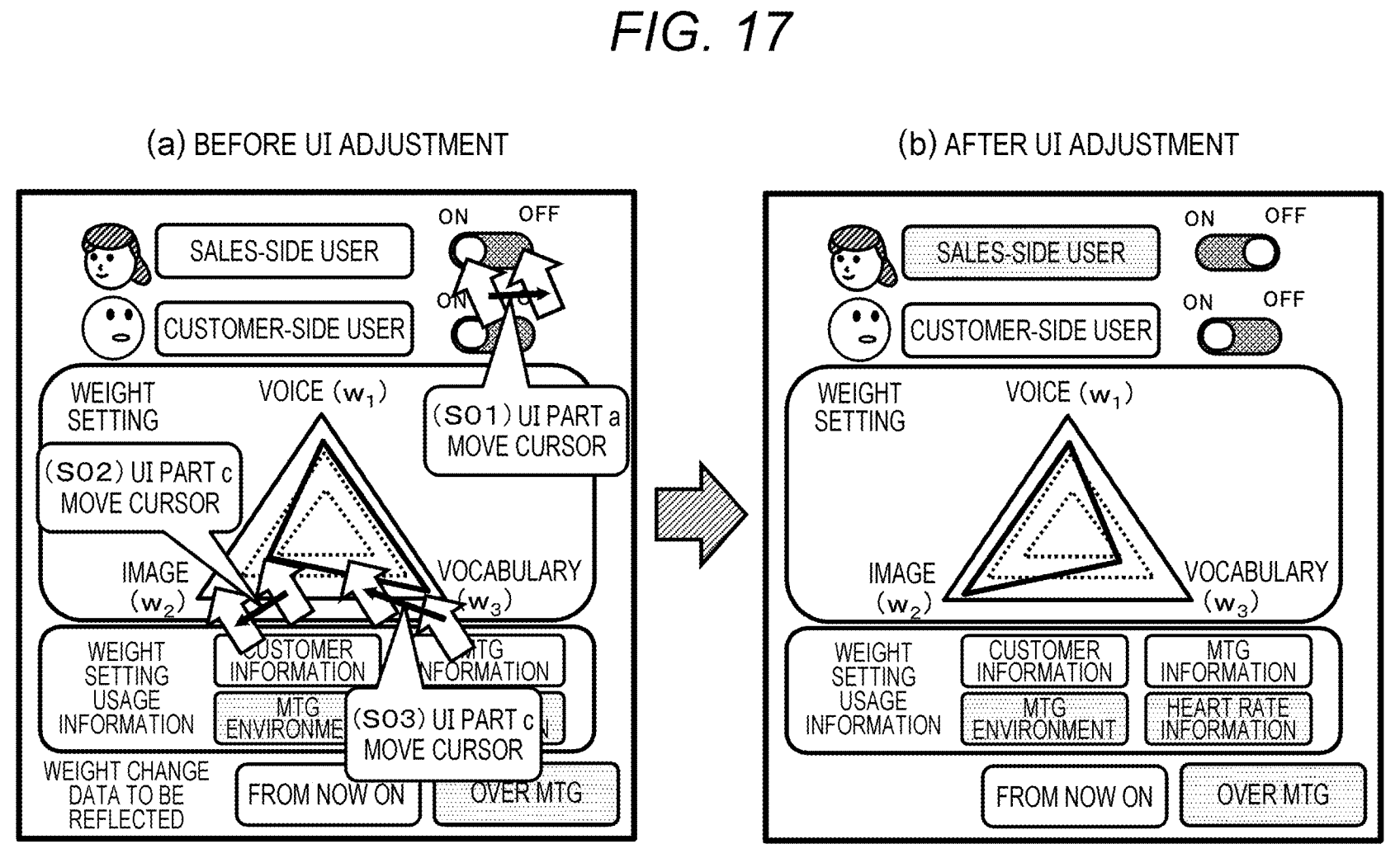

FIG. 17 illustrates an adjustment example of the UI section 25. The UI section 25 can be manipulated by the sales-side user 12 at any time. The settings can be changed at any timing before the start of the meeting or during the meeting, the change information is transmitted to the information processing device 100 via the network, and the score calculation algorithm control unit 107 of the information processing device 100 changes the score calculation algorithm in real time.

FIG. 17 illustrates setting examples of the UI section 25: (a) before UI adjustment; and (b) after UI adjustment.

(a) is an example where the sales-side user 12 performs three manipulations of steps S01 to S03 illustrated in the drawing before the UI adjustment.

In step S01, the setting of the UI part a is changed from ON to OFF.

The UI part a is a UI that sets whether to enable (ON) or disable (OFF) of the image, voice, and vocabulary of the sales-side user. When the score is calculated, the (ON) setting to enable the use of the image, voice, and vocabulary of the sales-side user is changed to the (OFF) setting to disable the use of the image, voice, and vocabulary.

In steps S02 and S03, the weight setting of the UI part c is changed.

The UI part c is a UI that sets the respective weights of the image-based user state score, the voice-based user state score, and the vocabulary-based user state score to be applied to the user state output score calculation, and can change the image, voice, and vocabulary weights ($w_1$, $w_2$, $w_3$) to be applied to the score calculation.

In the example illustrated in the drawing, the image vertex of the triangle is moved outward in step S02, and the vocabulary vertex is moved inward in step S03.

With this setting change, the weight values applied to the user state score calculation are changed. Specifically, the weight for the vocabulary-based user state score is changed to be smaller, and the weight for the image-based user state score is changed to be larger.

As described above, these pieces of change information are immediately transmitted to the information processing device 100, and the score calculation algorithm control unit 107 of the information processing device 100 changes the score calculation algorithm in accordance with the information regarding the manipulation made by the sales-side user 12.

Figure 18:
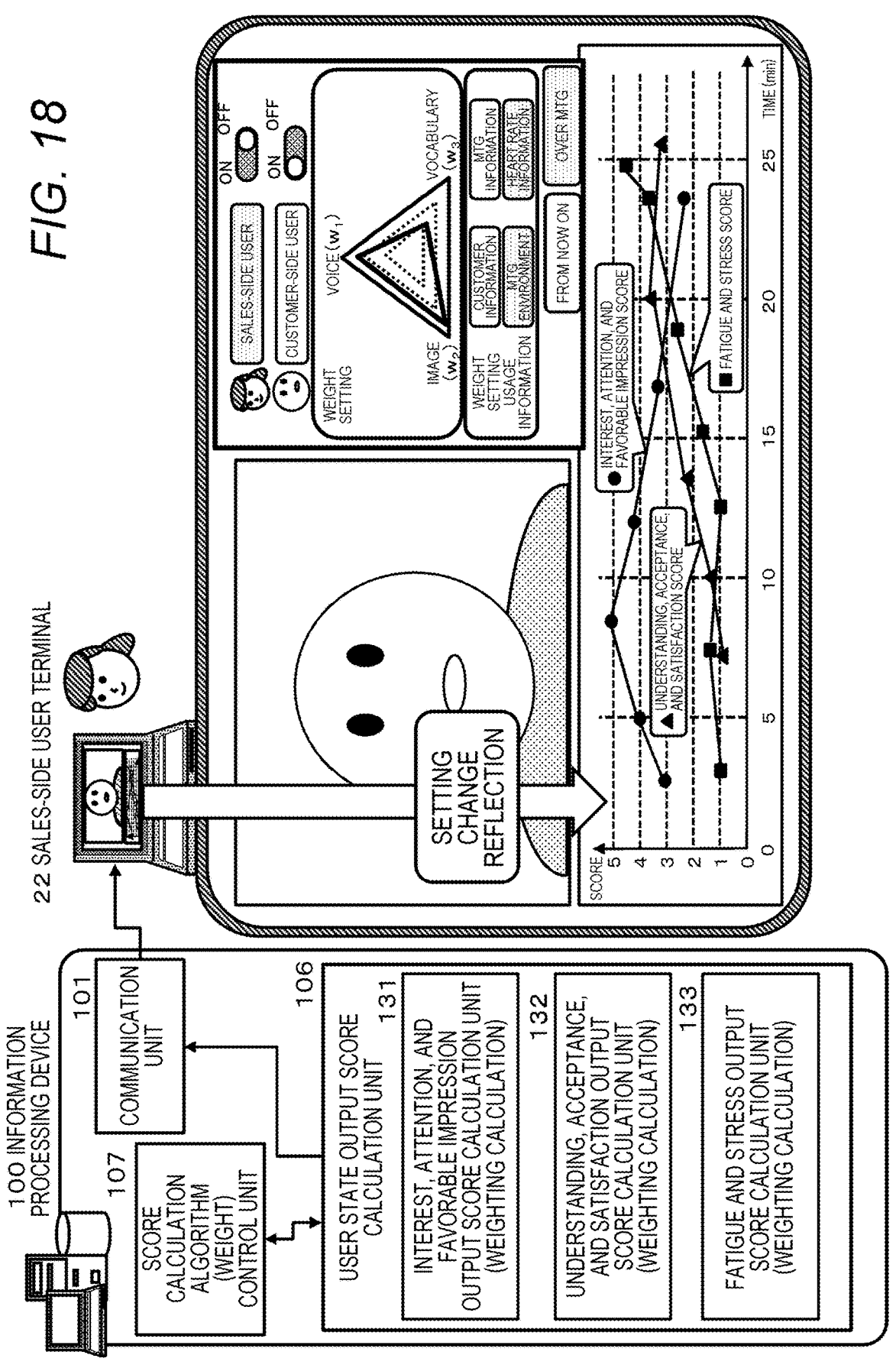
FIG. 18 is a diagram for describing an example of the data displayed on the user terminal.

When the score calculation algorithm is changed in accordance with the manipulation made by the sales-side user 12 on the UI section 25 described above, for example, the graph being displayed on the sales-side user terminal 22 illustrated in FIG. 18 is changed to a graph including a new update score calculated in accordance with the changed algorithm and then displayed.

The sales-side user 12 can change the user state estimated score calculation algorithm to a more appropriate form while referencing the updated graph displayed on the sales-side user terminal 22.

(3-4. Details of Processing Performed by User State Change Reason Estimation Unit)

Next, details of processing performed by the user state change reason estimation unit will be described.

A configuration and processing of the user state change reason estimation unit 108 will be described with reference to FIG. 19 and subsequent drawings.

Figure 19:
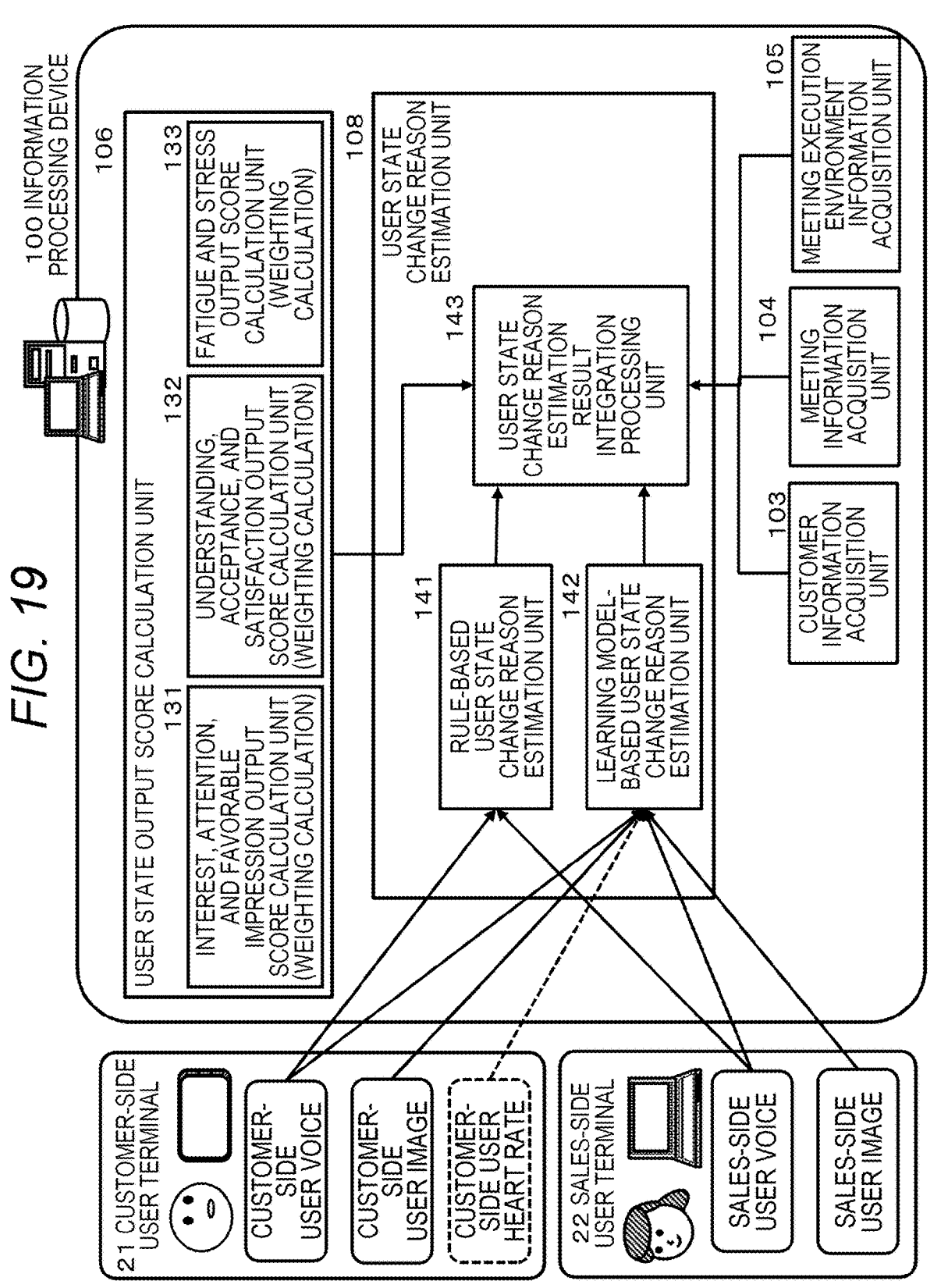
FIG. 19 is a diagram for describing an example of a configuration of and processing performed by a user state change reason estimation unit of the information processing device of the present disclosure.

As illustrated in FIG. 19, the user state change reason estimation unit 108 includes a rule-based user state change reason estimation unit 141, a learning model-based user state change reason estimation unit 142, and a user state change reason estimation result integration processing unit 143.

The rule-based user state change reason estimation unit 141 estimates a user state change reason using data (rule-based model) registered in advance on the basis of the utterance content of at least one of the utterance of the customer-side user 11 or the utterance of the sales-side user 12.

The learning model-based user state change reason estimation unit 142 estimates a user state change reason using a learning model generated in advance on the basis of the voice and image of the customer-side user 11 and the voice and image of the sales-side user 12.

Moreover, the user state change reason may be estimated using a learning model generated in advance using detection information of another sensor, for example, a biometric sensor such as a heart rate sensor of the customer-side user.

The user state change reason estimation result integration processing unit 143 receives the input of the estimation result of the rule-based user state change reason estimation unit 141 and the input of the estimation result of the learning model-based user state change reason estimation unit 142, and performs processing of selecting one of the estimation results, processing of selecting both of the estimation results, processing of generating a new user state change reason by combining the two estimation results, or the like to generate a user state change reason to be finally output to the sales-side user terminal 22.

A detailed configuration example of the rule-based user state change reason estimation unit 141 will be described with reference to FIG. 20.

Figure 20:
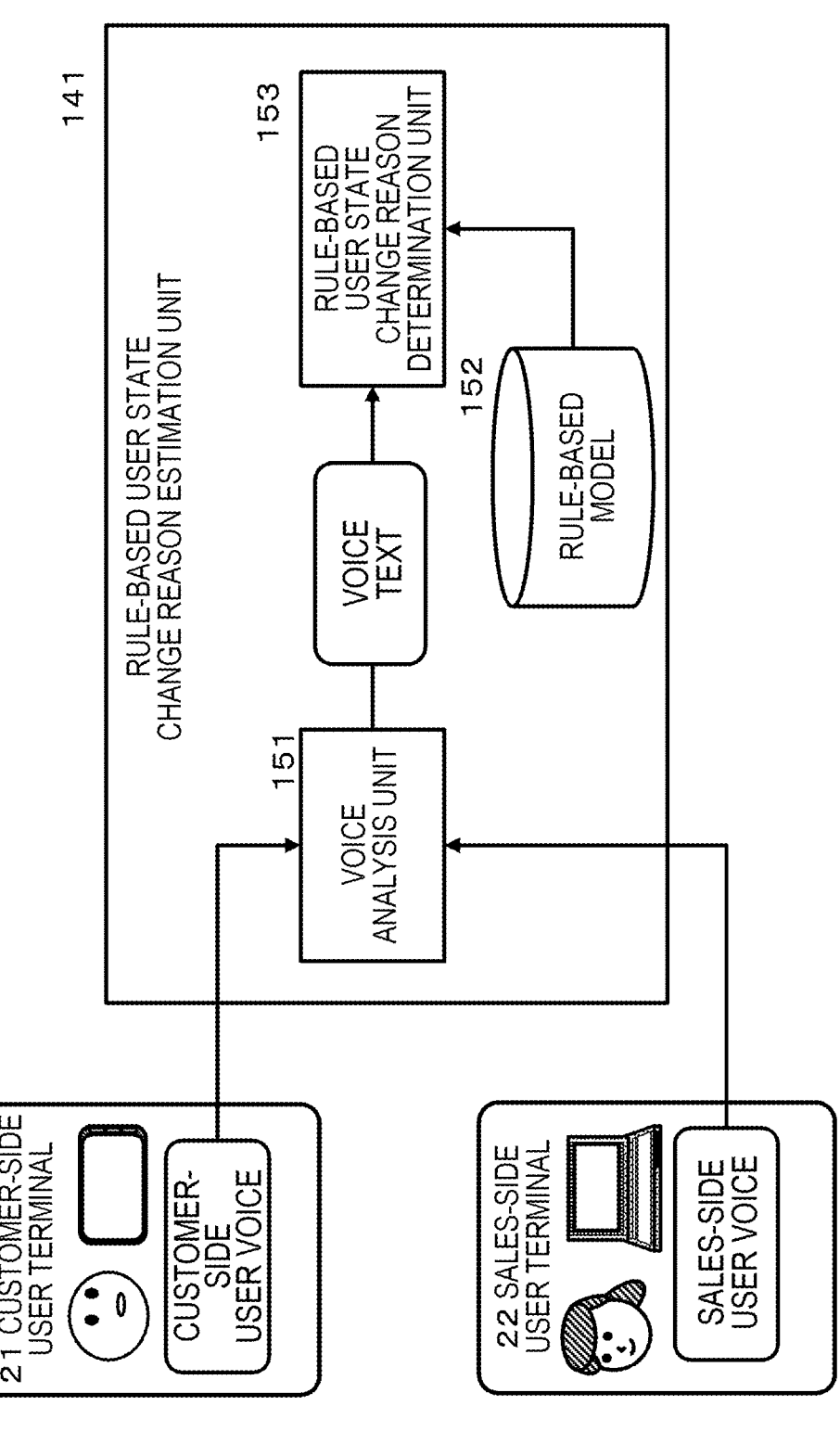
FIG. 20 is a diagram for describing an example of the configuration of and the processing performed by the user state change reason estimation unit of the information processing device of the present disclosure.

As illustrated in FIG. 20, the rule-based user state change reason estimation unit 141 includes a voice analysis unit 151, a rule-based model 152, and a rule-based user state change reason determination unit 153.

Voice data containing the voice of the customer-side user 11 acquired by the microphone of the customer-side user terminal 21 and voice data containing the voice of the sales-side user 12 acquired by the microphone of the sales-side user terminal 22 are input to the voice analysis unit 151.

The voice analysis unit 151 converts the voice data into text and outputs the text to the rule-based user state change reason determination unit 153.

The voice analysis unit is, for example, a voice analysis unit using an automatic speech recognition (ASR) function.

The rule-based user state change reason determination unit 153 references the rule-based model 152 on the basis of the text data input from the voice analysis unit 151, that is, the text indicating the utterance content of the customer-side user 11 or the text indicating the utterance content of the sales-side user 12 to estimate a user state change reason on the basis of the input utterance text.

The rule-based model 152 is a rule-based model having various utterance texts of the customer-side user 11 and the sales-side user recorded therein in association with user state change reason. Specifically, for example, data as illustrated in FIG. 21 is registered.

The rule-based user state change reason determination unit 153 references the rule-based model 152 having data as illustrated in FIG. 21 registered therein to select text data input from the voice analysis unit 151, that is, registration data closest to the text indicating the utterance content of the customer-side user 11 or the text indicating the utterance content of the sales-side user 12 and acquire the user state change reason recorded in association with the selected data. The acquired user state change reason is output to the user state change reason estimation result integration processing unit 143.

On the other hand, the learning model-based user state change reason estimation unit 142 illustrated in FIG. 19 estimates a user state change reason using a learning model generated in advance.

The learning model is a learning model that receives the input of voice and image information of the customer-side user 11 and the input of voice and image information of the sales-side user 12 and outputs a user state change reason.

Alternatively, another configuration may be employed where, for example, in a case where sensor detection information detected by a sensor such as a heart rate sensor or another biometric sensor of the customer-side user can be acquired, a learning model that receives the input of the sensor detection information in addition to the voice and image information and outputs a user state change reason is generated and used.

Specifically, for example, the learning model is generated as a result of performing machine learning to which a multilayer neural network algorithm such as a deep neural network (DNN), a convolutional neural network (CNN), or a recurrent neural network (RNN) is applied.

Note that a specific example of the learning model generation processing method will be described later.

The user state change reason estimated by the learning model-based user state change reason estimation unit 142 using the learning model is also output to the user state change reason estimation result integration processing unit 143.

The user state change reason estimation result integration processing unit 143 receives the input of the estimation result of the rule-based user state change reason estimation unit 141 and the input of the estimation result of the learning model-based user state change reason estimation unit 142, and performs processing of selecting one of the estimation results, processing of selecting both of the estimation results, processing of generating a new user state change reason by combining the two estimation results, or the like.

The user state change reason estimation result integration processing unit 143 determines a user state change reason to be finally output to the sales-side user terminal 22.

Note that, in the processing of determining a user state change reason to be finally output to the sales-side user terminal 22, the user state change reason estimation result integration processing unit 143 verifies a change state of each of the output scores of the three types of user state output score calculation units 131 to 133: the interest, attention, and favorable impression output score calculation unit 131; the understanding, acceptance, and satisfaction output score calculation unit 132, the fatigue and stress output score calculation unit 133 of the user state output score calculation unit 106.

The user state change reason estimation result integration processing unit 143 determines and outputs the user state change reason to be output to the sales-side user terminal 22, for example, in a case where the amount of change in the output score calculated by any one of the user state output score calculation units 131 to 133 is greater than or equal to a predetermined threshold.

Alternatively, in a case where the output score calculated by any one of the user state output score calculation units 131 to 133 is equal to the minimum value (score=1) or the maximum value (score=5), the user state change reason to be output to the sales-side user terminal 22 is determined and output.

Furthermore, the user state change reason estimation result integration processing unit 143 may be configured to use the customer information input from the customer information acquisition unit 103, the meeting information input from the meeting information acquisition unit 104, and the meeting execution environment information input from the meeting execution environment information acquisition unit 105 as auxiliary information used when determining the user state change reason to be output to the sales-side user terminal 22.

Moreover, the user state change reason estimation result integration processing unit 143 may be configured to not only output the user state change reason but also generate, for example, estimation information regarding a meeting result, recommended value information regarding a weight to be applied to the user state score calculation, or the like, and output the resultant information to the sales-side user terminal 22.

FIG. 22 is a diagram showing a summary of data examples generated by the user state change reason estimation result integration processing unit 143 and output to the sales-side user terminal 22.

As shown in FIG. 22, the user state change reason estimation result integration processing unit 143 outputs, for example, the following information to the sales-side user terminal 22:

(1) user state change reason;

(2) meeting result estimation information; and (3) weight recommendation information regarding weight applied to user state score calculation.

For example, the user state change reason estimation result integration processing unit 143 estimates the pieces of information (1) to (3) using the learning model generated in advance or the rule-based model and outputs the pieces of information to the sales-side user terminal 22.

(1) The user state change reason is output, for example, in the following cases as shown in the column of the specific example in FIG. 22:

(example 1) In a case where the amount of change in any one of "interest, attention, and favorable impression output score", "understanding, acceptance, and satisfaction output score", or "fatigue and stress output score" is greater than or equal to the specified threshold, the user state change reason is output; and (example 2) When the score value of any one of "interest, attention, and favorable impression output score", "understanding, acceptance, and satisfaction output score", or "fatigue and stress output score" is equal to the minimum value (1) or the maximum value (5), the user state change reason is output.

(2) For the meeting result estimation information, meeting result estimation information in a case where no countermeasure is taken and meeting result estimation information in a case where a countermeasure is taken are generated and output.

(3) For the weight recommendation information regarding the weight to be applied to the user state score calculation, a value recommended for a weight (image, voice, vocabulary) applied to the user state score calculation is output.

Figure 23:
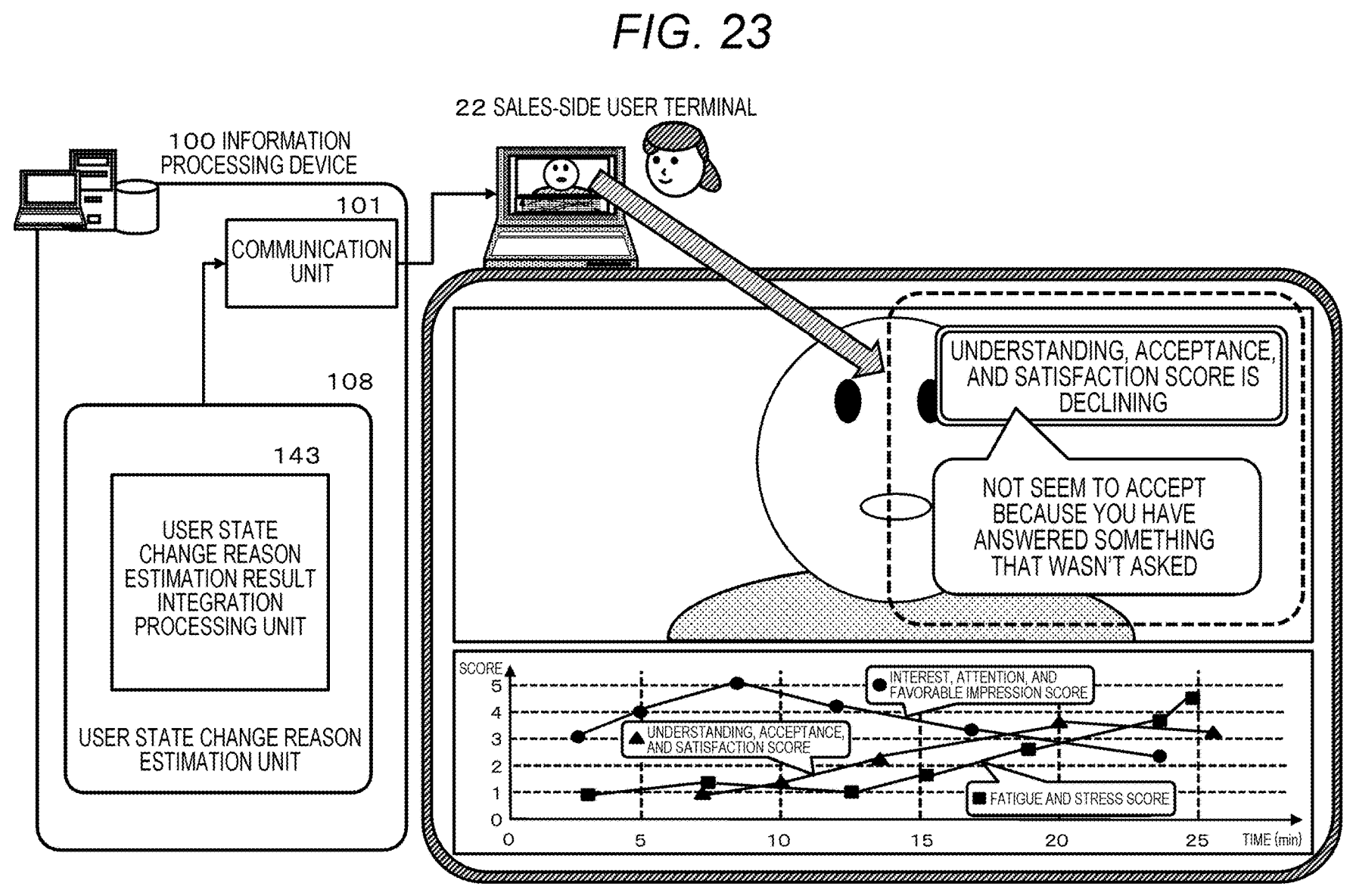

FIG. 23 is a diagram illustrating an example where the user state change reason that is information output from the user state change reason estimation result integration processing unit 143 of the user state change reason estimation unit 108 to the sales-side user terminal 22 is displayed on the sales-side user terminal 22.

Figure 24:
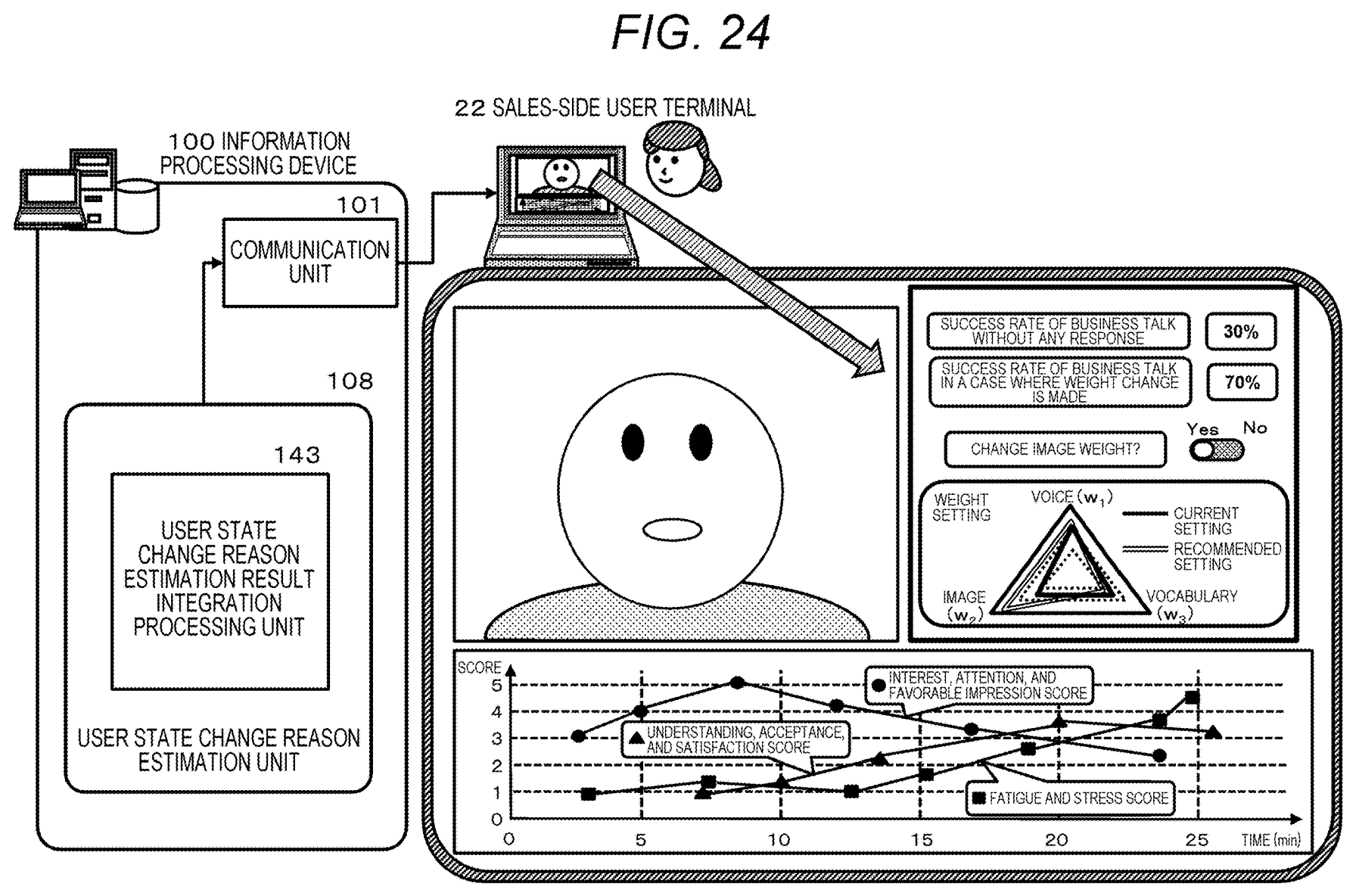

FIG. 24 is a diagram illustrating an example where the meeting result estimation information and the weight recommendation information regarding the weight to be applied to the user state score calculation are displayed on the sales-side user terminal 22.

Figure 25:
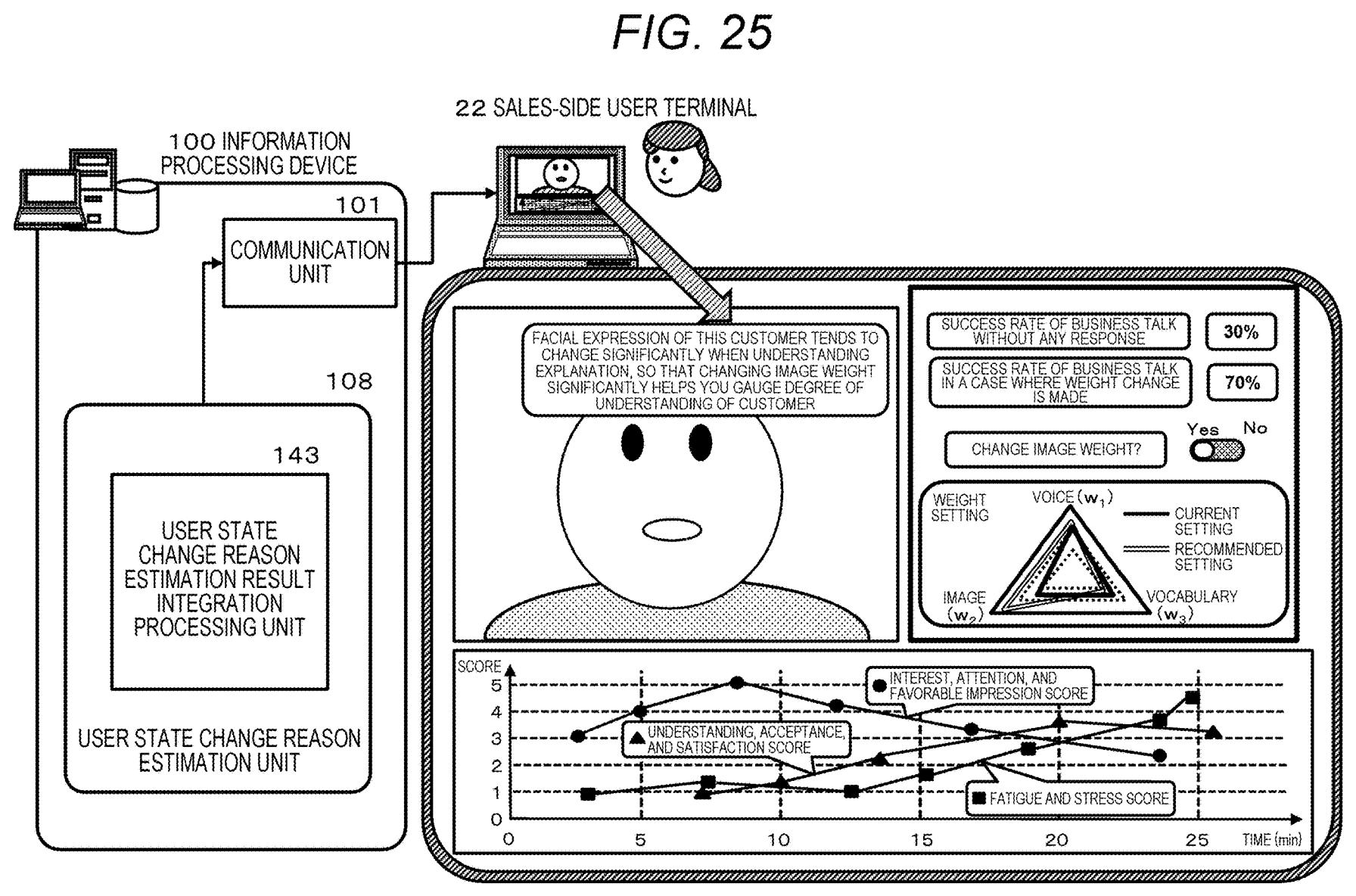

FIG. 25 is a diagram illustrating an example where a reason for the presentation of the weight recommendation information regarding the weight to be applied to the user state score calculation is further displayed on the sales-side user terminal 22.

By referencing such display data, the sales-side user 12 can take an appropriate measure such as changing the way of explanation.

4. Other Embodiments

Next, other embodiments will be described.

The above-described embodiment has been given as a processing example of analyzing the user state of the user participating in the meeting via the communication network and displaying the analysis result on the user terminal of another user participating in the meeting.

The processing of the present disclosure described above, that is, the processing of analyzing the user state of the user and displaying the analysis result on the user terminal of another user is used not only for such an online meeting, and various other use forms are possible.

For example, the processing is also applicable to processing of displaying the user state analysis result on a wearable device such as a glasses-type or goggle-type device that displays an augmented reality (AR) image obtained by superimposing, on a real object image in a real space, a virtual object image that does not actually exist in the real space, or a virtual reality (VR) image.

Specifically, for example, the processing is applicable to a scene where a plurality of users wearing glasses-type devices has a face-to-face meeting.

A user state of a meeting partner is estimated by analyzing an image or voice input via a camera or a microphone mounted on the glasses-type device worn by each user. Moreover, a graph and the like based on the estimated user state are generated, and the user state analysis result such as the generated graph is displayed as a virtual object on the glasses-type device.

The above-described configuration and processing of the present disclosure are applicable to such various scenes.

5. Processing of Generating Learning Model Used by User State Estimation Unit Next, processing of generating the learning model used by the user state estimation unit will be described.

As described above with reference to FIG. 6, the user state estimation unit 102 of the information processing device 100 estimates the user state of the customer-side user on the basis of the image data, the voice data, and the like of each user from the customer-side user terminal 21 and the sales-side user terminal 22 during the meeting input via the communication unit 101. Specifically, for example, processing of estimating following states is performed:

(user state 1) interest, attention, and favorable impression;

(user state 2) understanding, acceptance, and satisfaction; and (user state 3) fatigue and stress.

The user state estimation unit 102 estimates the user state of the customer-side user using, for example, a learning model generated in advance.

Hereinafter, a specific example of processing of generating the learning model used by the user state estimation unit 102 will be described.

Figure 26:
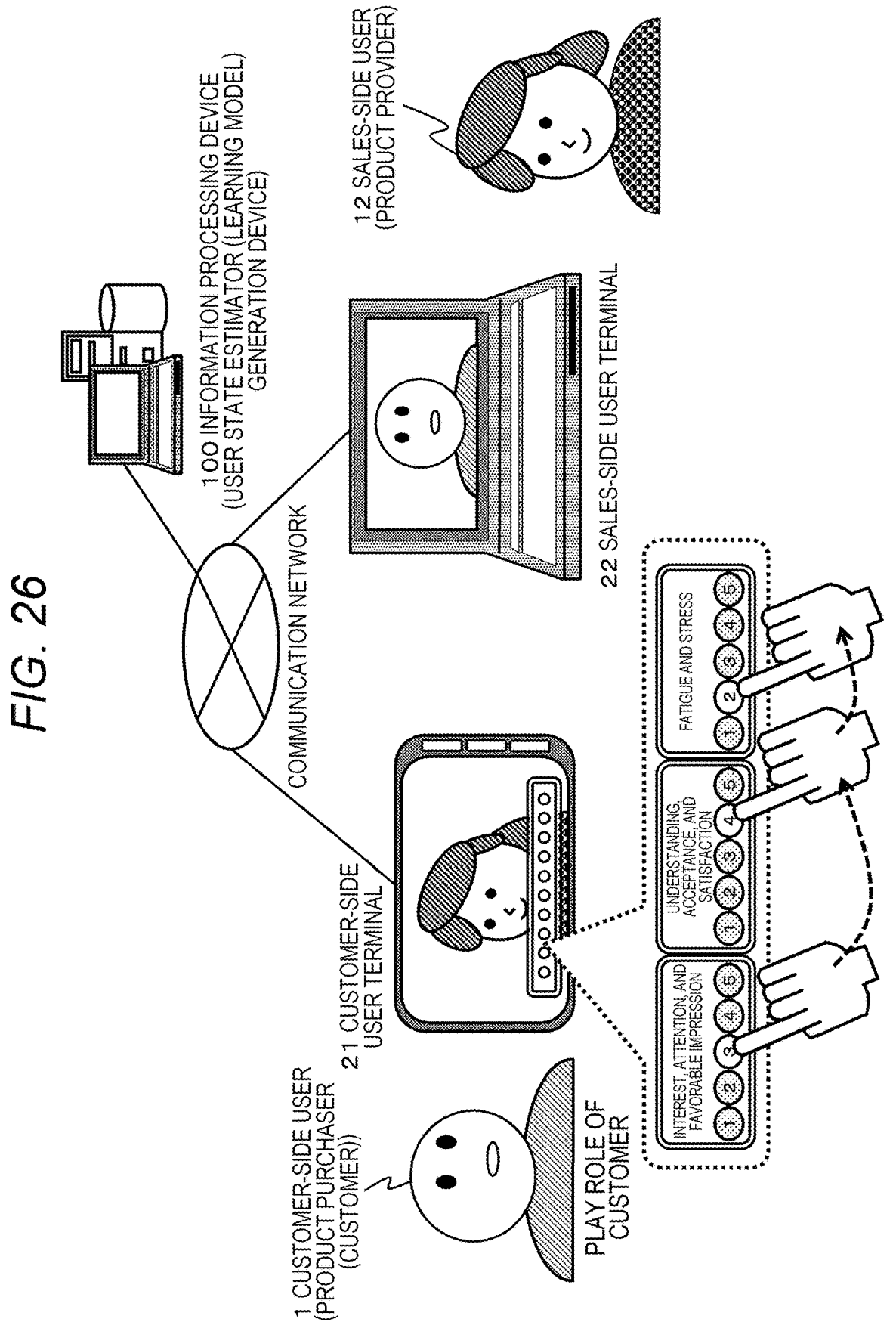
FIG. 26 is a diagram for describing an overview of user state estimation learning model generation processing.

FIG. 26 is a diagram illustrating a mock meeting configuration for acquiring learning data used for the processing of generating the learning model used by the user state estimation unit 102.

FIG. 26 illustrates the customer-side user 11 who is a customer as a potential purchaser and the sales-side user 12 as a product provider.

The customer-side user terminal 21 such as a smartphone and the sales-side user terminal 22 such as a PC are connected via a communication network, and communicates with each other by mutually transmitting and receiving voices and images to conduct a business talk.

Note that, in a case where a mock meeting for acquiring learning data used for the processing of generating the learning model is conducted, the customer-side user 11 is not a real customer but a person who plays the role of a customer.

For example, a full-time employee or a part-time worker belonging to the same company as the sales-side user 12 plays the role of a customer.

The sales-side user 12 conducts a meeting such as a mock business talk with the customer-side user 11 playing the role of a customer via a network.

The customer-side user 11 playing the role of a customer inputs a user state such as his/her own emotion to the customer-side user terminal 21 as needed during the mock meeting.

Figure 27:
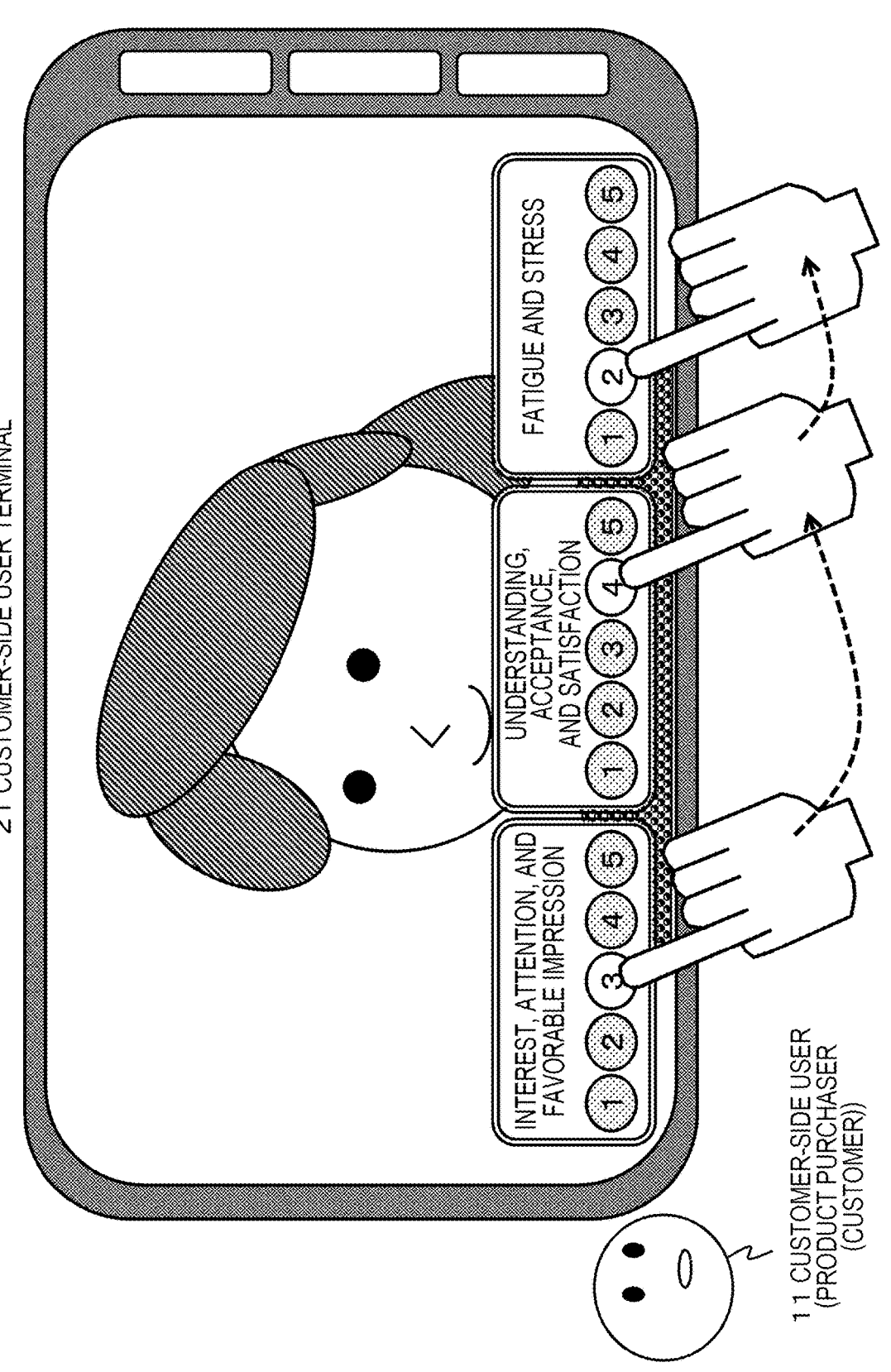
FIG. 27 is a diagram for describing an example of processing of inputting a user state score (evaluation value) indicating a user state such as a user's own emotion and the like during a meeting.

Examples of the input items include the following three user states as illustrated in FIG. 27:

(user state 1) interest, attention, and favorable impression;

(user state 2) understanding, acceptance, and satisfaction; and (user state 3) fatigue and stress.

Note that, for "(user state 3) fatigue and stress" of the user states 1 to 3, in a case where a heart rate sensor is used or in a case where a heart rate is estimated from a face image, information acquired from the heart rate sensor or acquired as a result of analysis of the face image may be used without user input.

(User state 1) interest, attention, and favorable impression indicates a user state as to whether or not the customer-side user 11 shows an interest in, pays attention to, and has a favorable impression of the explanation and talk made by the sales-side user 12.

During the meeting (business talk) with the sales-side user 12, the customer-side user 11 playing the role of a customer determines his/her interest, attention, and favorable impression level, and inputs a score (evaluation value) based on the determination as needed.

The score (evaluation value) is determined on a scale of 1 to 5, and the higher the interest, attention, and favorable impression, the higher the score (evaluation value).

In a case where the customer-side user 11 playing the role of a customer feels that the level of "interest, attention, and favorable impression" for the explanation and talk made by the sales-side user 12 is equal to the maximum level, the score=5 is input at that timing.

The display of the customer-side user terminal 21 is a touch panel, and the customer-side user 11 inputs the score=5 to the display.

On the other hand, in a case where the customer-side user 11 playing the role of a customer feels that the level of "interest, attention, and favorable impression" for the explanation and talk made by the sales-side user 12 is equal to the minimum level, the score=1 is input at that timing.

The customer-side user 11 playing the role of a customer inputs, within the meeting (business talk) period with the sales-side user 12, the score (evaluation value) as needed and at any timing when the customer-side user 11 feels that the level of "interest, attention, and favorable impression" has changed.

(User state 2) understanding, acceptance, and satisfaction indicates a user state as to whether or not the customer-side user 11 shows understanding of, acceptance of, and satisfaction with the explanation made by the sales-side user 12.

The customer-side user 11 playing the role of a customer inputs a score (evaluation value) as needed during the meeting (business talk) with the sales-side user 12.

In a case where the customer-side user 11 playing the role of a customer feels that the level of "understanding, acceptance, and satisfaction" for the explanation made by the sales-side user 12 is equal to the maximum level, the customer-side user 11 inputs the score=5 at that timing, and in a case where the customer-side user 11 feels that the level is equal to the minimum level, the customer-side user 11 inputs the score=1 at that timing.

The customer-side user 11 playing the role of a customer inputs, within the meeting (business talk) period with the sales-side user 12, the score (evaluation value) as needed and at any timing when the customer-side user 11 feels that the level of "understanding, acceptance, and satisfaction" has changed.

(User state 3) fatigue and stress indicates a user state as to whether or not the customer-side user 11 feels fatigue and stress from the explanation and talk made by the sales-side user 12.

The customer-side user 11 playing the role of a customer inputs a score (evaluation value) as needed during the meeting (business talk) with the sales-side user 12.

In a case where the customer-side user 11 playing the role of a customer feels that the level of "fatigue and stress" for the explanation and talk made by the sales-side user 12 is equal to the maximum level (tired or under strong stress), the score=5 is input at that timing, and in a case where the customer-side user 11 feels that the level is equal to the minimum level (not tired or relaxed), the score=1 is input at that timing.

The customer-side user 11 playing the role of a customer inputs, within the meeting (business talk) period with the sales-side user 12, the score (evaluation value) as needed and at any timing when the customer-side user 11 feels that the level of "fatigue and stress" has changed.

The scores (evaluation values) of the following three user states input by the customer-side user 11 playing the role of a customer:

(user state 1) interest, attention, and favorable impression;

(user state 2) understanding, acceptance, and satisfaction; and (user state 3) fatigue and stress, are transmitted from the customer-side user terminal 21 to the information processing device 100 together with a time stamp indicating score (evaluation value) input timing.

The information processing device 100 further receives the input of the image and voice of each user during the meeting period via the customer-side user terminal 21 and the sales-side user terminal 22.

The information processing device 100 receives the input of the following data during the meeting period:

(A) image and voice of the customer-side user 11 from the customer-side user terminal 21; and (B) image and voice of the sales-side user 12 from the sales-side user terminal 22; and (C) score (evaluation value) data string of the above-described (user states 1 to 3) from the customer-side user terminal 21.

The information processing device 100 receives the input of the above-described data (A) to (C) during the meeting period, and performs learning processing using the input data to generate a user state estimator (learning model).

FIG. 28 is data input from the customer-side user terminal 21 and the sales-side user terminal 22 to the information processing device 100, and is a data example indicating a part of data (meeting log) used for machine learning processing performed by the information processing device 100.

A recording area [label] at the top of the log data (meeting log) illustrated in FIG. 28 is a recording area for the score (evaluation value) of the user state input by the customer-side user 11 playing the role of a customer during the meeting.

In the [label] recording area, the scores (evaluation values) of the following three user states input by the customer-side user 11 playing the role of a customer during the meeting:

(user state 1) interest, attention, and favorable impression;

(user state 2) understanding, acceptance, and satisfaction; and (user state 3) fatigue and stress, are recorded together with a state label name indicating a user state type and a time stamp indicating score (evaluation value) setting timing.

The next recording area [meeting condition (MTG tag)] is a recording area for meeting conditions set before the start of the meeting. The meeting conditions (MTG tag) include, for example, the following conditions (tags):

(tag a) meeting (MTG) genre=business talk, interview;

(tag b) meeting (MTG) scale=large, medium, small;

(tag c) fatigue (customer)=large, medium, small; and (tag d) busyness (customer)=large, medium, small.

Moreover, recording areas for the image and voice of each user during the meeting period, that is, the image and voice of the customer-side user 11 and the image and voice of the sales-side user 12 are set at the end.

The information processing device 100 receives the input of the log data (meeting Log) containing such pieces of data from at least one of the customer-side user terminal 21 or the sales-side user terminal 22, and performs machine learning processing using the input data to generate a user state estimator (learning model).

Note that the log data illustrated in FIG. 28 is part of the log data acquired during the meeting period. It is possible to generate, by using the data of [label] acquired as log data during one meeting period, time-series data of the user state score (evaluation value) sequentially input by the customer-side user 11 during the meeting.

Figure 29:
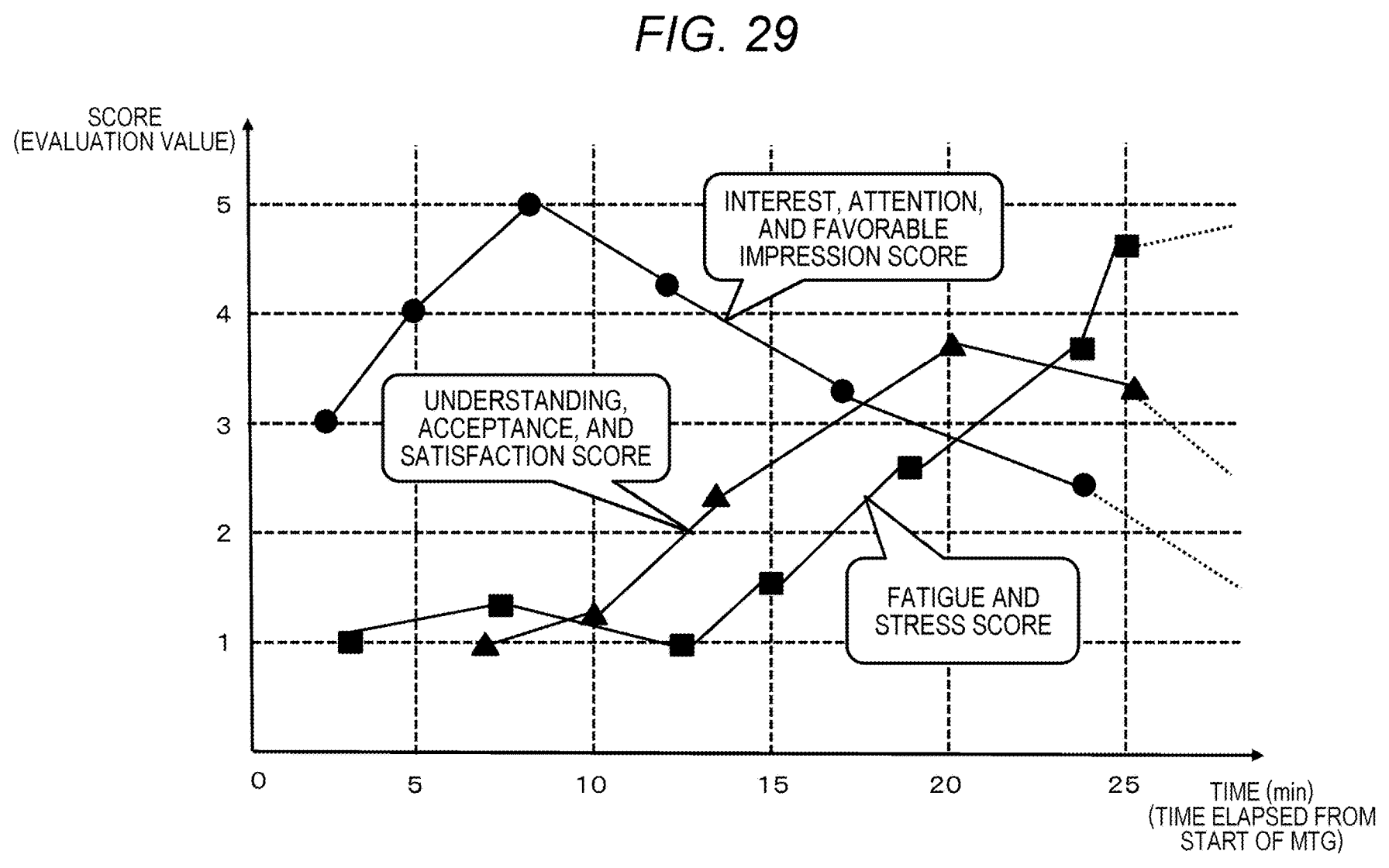

FIG. 29 illustrates an example of time-series data that can be generated on the basis of the user state score (evaluation value) acquired by the information processing device 100 from the customer-side user terminal 21.

FIG. 29 illustrates time-series data of each of the following user states:

(user state 1) interest, attention, and favorable impression;

(user state 2) understanding, acceptance, and satisfaction; and (user state 3) fatigue and stress.

For example, it is possible to analyze, by analyzing the time-series data, a change in the state of the customer-side user terminal 21 in detail during the meeting period.

The information processing device 100 performs machine learning processing using the log data illustrated in FIG. 28 to generate a learning model to be used by the user state estimation unit.

Details of the machine learning processing performed by the information processing device 100 will be described with reference to FIG. 30 and subsequent drawings.

Figure 30:
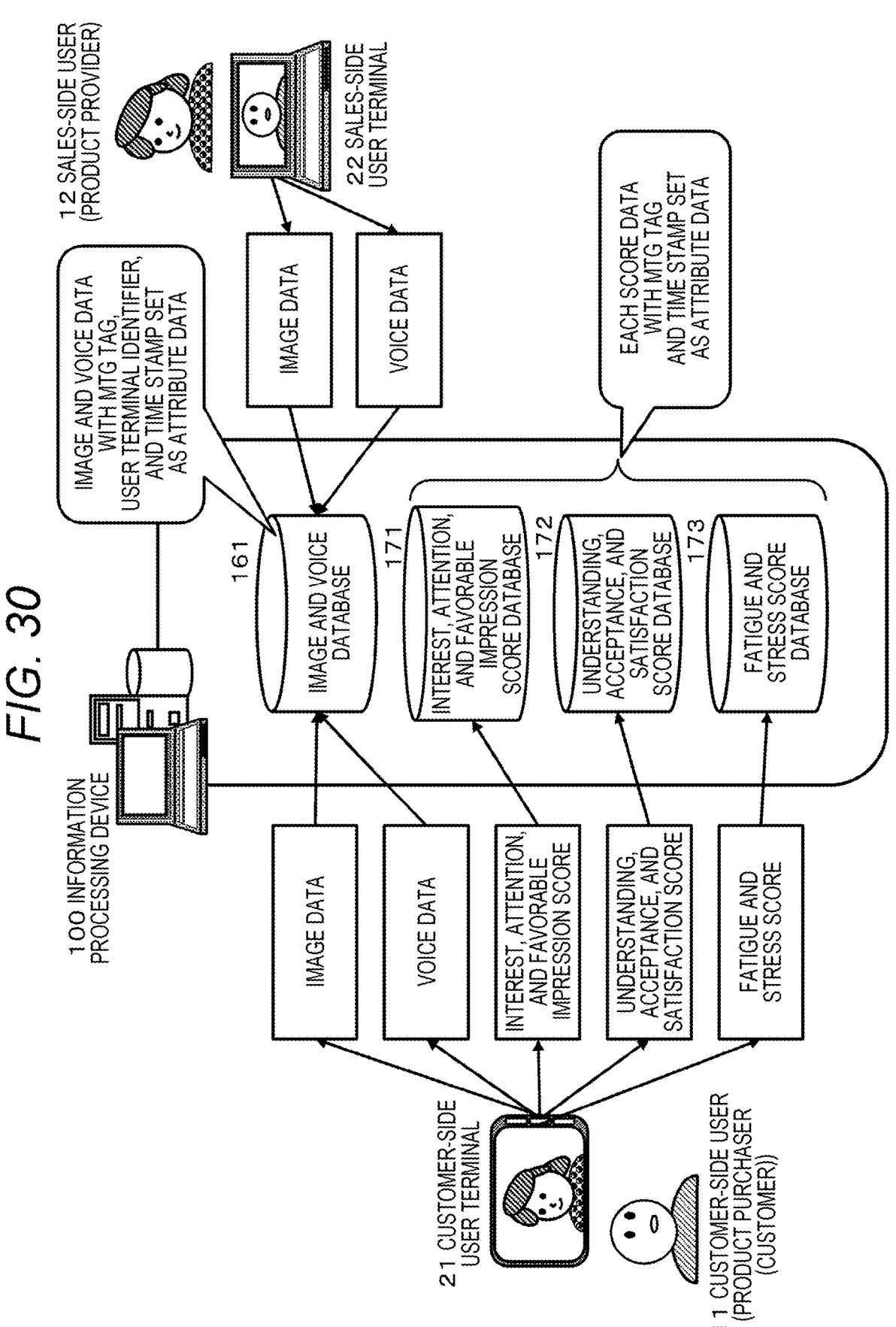
FIG. 30 is a diagram for describing a configuration example of collecting data used for the machine learning processing performed by the information processing device.

FIG. 30 is a diagram illustrating a configuration example of how to collect data used for the machine learning processing performed by the information processing device 100.

As illustrated in FIG. 30, the information processing device 100 acquires the following data from the customer-side user terminal 21 during the meeting period:

image data;

voice data;

(score corresponding to user state 1)=interest, attention, and favorable impression score;

(score corresponding to user state 2)=understanding, acceptance, and satisfaction score; and (score corresponding to user state 3)=fatigue and stress score.

The image data and the voice data are image data containing the face image of the customer-side user 11 and the utterance voice data of the customer-side user 11 acquired by the camera and the microphone of the customer-side user terminal 21.

(score corresponding to user state 1)=interest, attention, and favorable impression score;

(score corresponding to user state 2)=understanding, acceptance, and satisfaction score; and (score corresponding to user state 3)=fatigue and stress score, these pieces of score data are, as described above with reference to FIG. 29, time-series data of the user state score (evaluation value) input by the customer-side user 11 to the customer-side user terminal 21 during the meeting period.

The information processing device 100 stores these pieces of data in a storage unit (database) provided in the information processing device 100.

As illustrated in FIG. 30, the image data and the voice data are stored in an image and voice database 161.

The interest, attention, and favorable impression score is stored in an interest, attention, and favorable impression score database 171, the understanding, acceptance, and satisfaction score is stored in an understanding, acceptance, and satisfaction score database 172, and the fatigue and stress score is stored in a fatigue and stress score database 173.

Moreover, the information processing device 100 acquires, in a similar manner, the following data from the sales-side user terminal 22 during the meeting period:

image data; and voice data.

These image data and voice data are image data containing the face image of the sales-side user 12 and the utterance voice data of the sales-side user 12 acquired by the camera and the microphone of the sales-side user terminal 22.

These pieces of data are also recorded in the image and voice database 161 of the information processing device 100.

Note that the image and voice data recorded in the image and voice database 161 contain, as attribute information, recording time information such as a time stamp indicating the acquisition time of image and voice, user identification information for identifying whether the image and the voice are data of the customer-side user 11 acquired from the customer-side user terminal 21 or data of the sales-side user 12 acquired from the sales-side user terminal 22, and the like.

Note that, in the example illustrated in FIG. 30, the heart rate information regarding the heart rate of the customer-side user 11 and the like are not collected; however, for example, in a case where a learning model for performing user state estimation processing using the sensor detection information such as the heart rate information regarding the heart rate of the customer-side user 11 is generated, the heart rate information regarding the heart rate of the customer-side user 11 and the like are also collected, and learning processing including the sensor detection information is performed.

Figure 31:
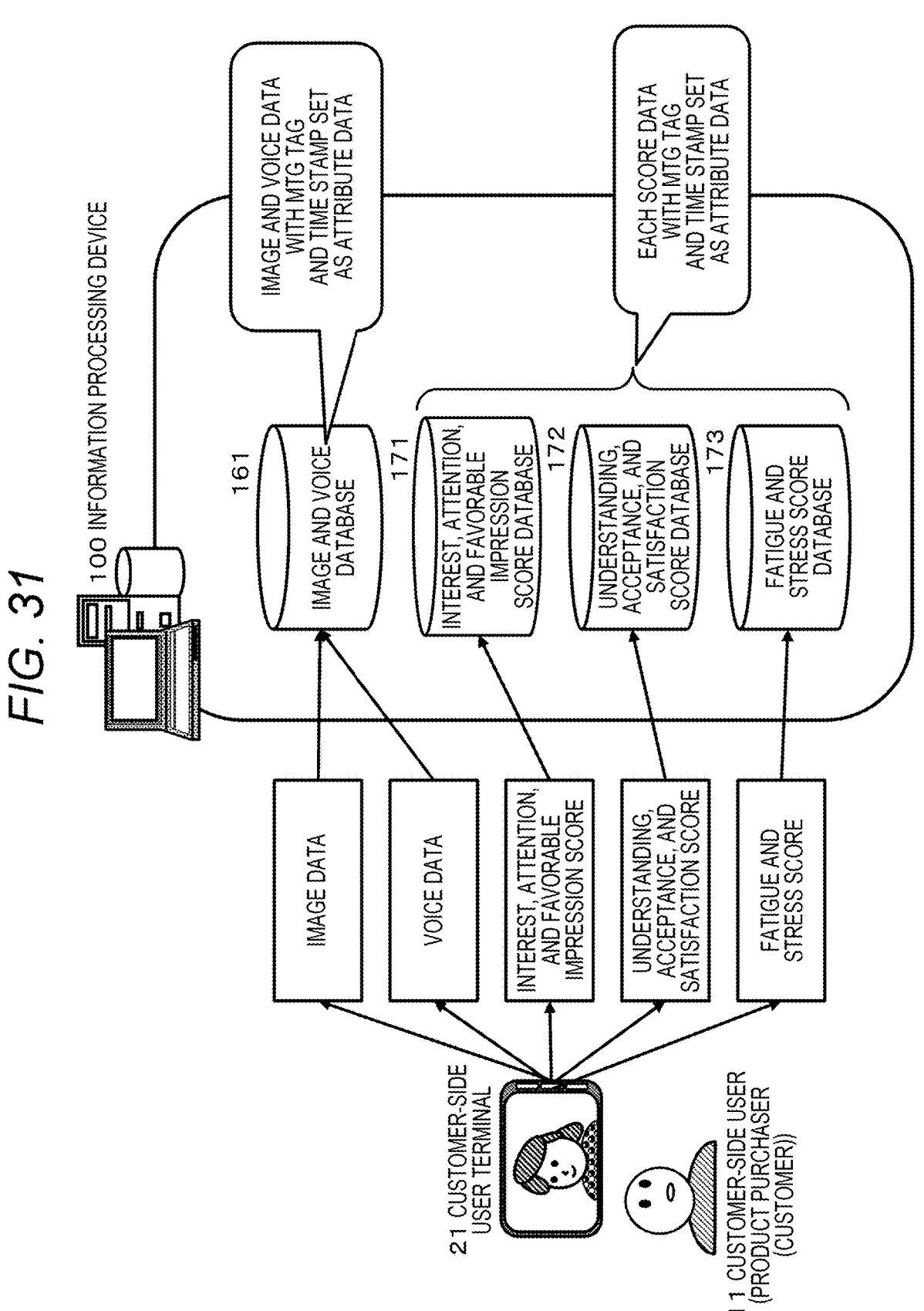
FIG. 31 is a diagram for describing a configuration example where an image, a voice, and a user state score are acquired only from the customer-side user terminal and applied to learning processing.

Furthermore, the example of how the information processing device 100 collects learning data illustrated in FIG. 30 is a configuration example where the image data and the voice data during the meeting period are acquired also from the sales-side user terminal 22; however, for example, as illustrated in FIG. 31, it is also possible to acquire the image, the voice, and each user state score only from the customer-side user terminal 21 without acquiring the image data and the voice data from the sales-side user terminal 22, and apply them to the learning processing.

Hereinafter, as illustrated in FIG. 30, a processing example of acquiring data during the meeting period from both the customer-side user terminal 21 and the sales-side user terminal 22 and performing learning processing will be described.

FIG. 32 is a diagram illustrating a configuration and processing of machine learning processing performed by the information processing device 100.

As illustrated in FIG. 32, the information processing device 100 includes a degree-of-interest estimator generation unit (degree-of-interest estimation learning model generation unit) 181, a degree-of-understanding estimator generation unit (degree-of-understanding estimation learning model generation unit) 182, and a degree-of-fatigue estimator generation unit (degree-of-fatigue estimation learning model generation unit) 183.

The degree-of-interest estimator generation unit (degree-of-interest estimation learning model generation unit) 181 performs machine learning processing using the data stored in the interest, attention, and favorable impression score database 171 and the data stored in the image and voice database 161 to generate a degree-of-interest estimator (degree-of-interest estimation learning model) 191.

That is, the degree-of-interest estimator generation unit (degree-of-interest estimation learning model generation unit) 181 performs machine learning processing using the following data to generate the degree-of-interest estimator (degree-of-interest degree estimation learning model) 191:

(a) the image and voice of the customer-side user 11 and the image and voice of the sales-side user 12 during the meeting period; and (b) the interest, attention, and favorable impression score (evaluation value) input by the customer-side user 11 during the meeting period.

Furthermore, the degree-of-understanding estimator generation unit (degree-of-understanding estimation learning model generation unit) 182 performs machine learning processing using the data stored in the understanding, acceptance, and satisfaction score database 172 and the data stored in the image and voice database 161 to generate a degree-of-understanding estimator (degree-of-understanding estimation learning model) 192.

That is, the degree-of-understanding estimator generation unit (degree-of-understanding estimation learning model generation unit) 182 performs machine learning processing using the following data to generate the degree-of-understanding estimator (degree-of-fatigue understanding estimation learning model) 192:

(a) the image and voice of the customer-side user 11 and the image and voice of the sales-side user 12 during the meeting period; and (b) the understanding, acceptance, and satisfaction score (evaluation value) input by the customer-side user 11 during the meeting period.

Moreover, the degree-of-fatigue estimator generation unit (degree-of-fatigue estimation learning model generation unit) 183 performs machine learning processing using the data stored in the fatigue and stress score database 173 and the data stored in the image and voice database 161 to generate a degree-of-fatigue estimator (degree-of-fatigue estimation learning model) 193.

That is, the degree-of-fatigue estimator generation unit (degree-of-fatigue estimation learning model generation unit) 183 performs machine learning processing using the following data to generate the degree-of-fatigue estimator (degree-of-fatigue degree estimation learning model) 193:

(a) the image and voice of the customer-side user 11 and the image and voice of the sales-side user 12 during the meeting period; and (b) the fatigue and stress score (evaluation value) input by the customer-side user 11 during the meeting period.

Note that the learning processing units of the information processing device 100, that is, the degree-of-interest estimator generation unit (degree-of-interest estimation learning model generation unit) 181, the degree-of-understanding estimator generation unit (degree-of-understanding estimation learning model generation unit) 182, and the degree-of-fatigue estimator generation unit (degree-of-fatigue estimation learning model generation unit) 183 perform deep learning processing as the machine learning processing, for example.

For example, the degree-of-interest estimator generation unit (degree-of-interest estimation learning model generation unit) 181 performs "supervised learning processing" in which the data stored in the interest, attention, and favorable impression score database 171 and the data stored in the image and voice database 161 are used as training data.

Through this learning processing, the degree-of-interest estimator (degree-of-interest estimation learning model) 191 that estimates the interest, attention, and favorable impression score of the customer-side user on the basis of at least one of the image and voice data of the customer-side user or the image and voice data of the sales-side user is generated.

Furthermore, the degree-of-understanding estimator generation unit (degree-of-understanding estimation learning model generation unit) 182 performs "supervised learning processing" in which the data stored in the understanding, acceptance, and satisfaction score database 172 and the data stored in the image and voice database 161 are used as training data.

Through this learning processing, the degree-of-understanding estimator (degree-of-understanding estimation learning model) 192 that estimates the understanding, acceptance, and satisfaction score of the customer-side user on the basis of at least one of the image and voice data of the customer-side user or the image and voice data of the sales-side user is generated.

Moreover, the degree-of-fatigue estimator generation unit (degree-of-fatigue estimation learning model generation unit) 183 performs "supervised learning processing" in which the data stored in the fatigue and stress score database 173 and the data stored in the image and voice database 161 are used as training data.

Through this learning processing, the degree-of-fatigue estimator (degree-of-fatigue estimation learning model) 193 that estimates the fatigue and stress score of the customer-side user on the basis of at least one of the image and voice data of the customer-side user or the image and voice data of the sales-side user is generated.

A specific example of the learning processing will be described with reference to FIG. 33 and subsequent drawings.

Figure 33:
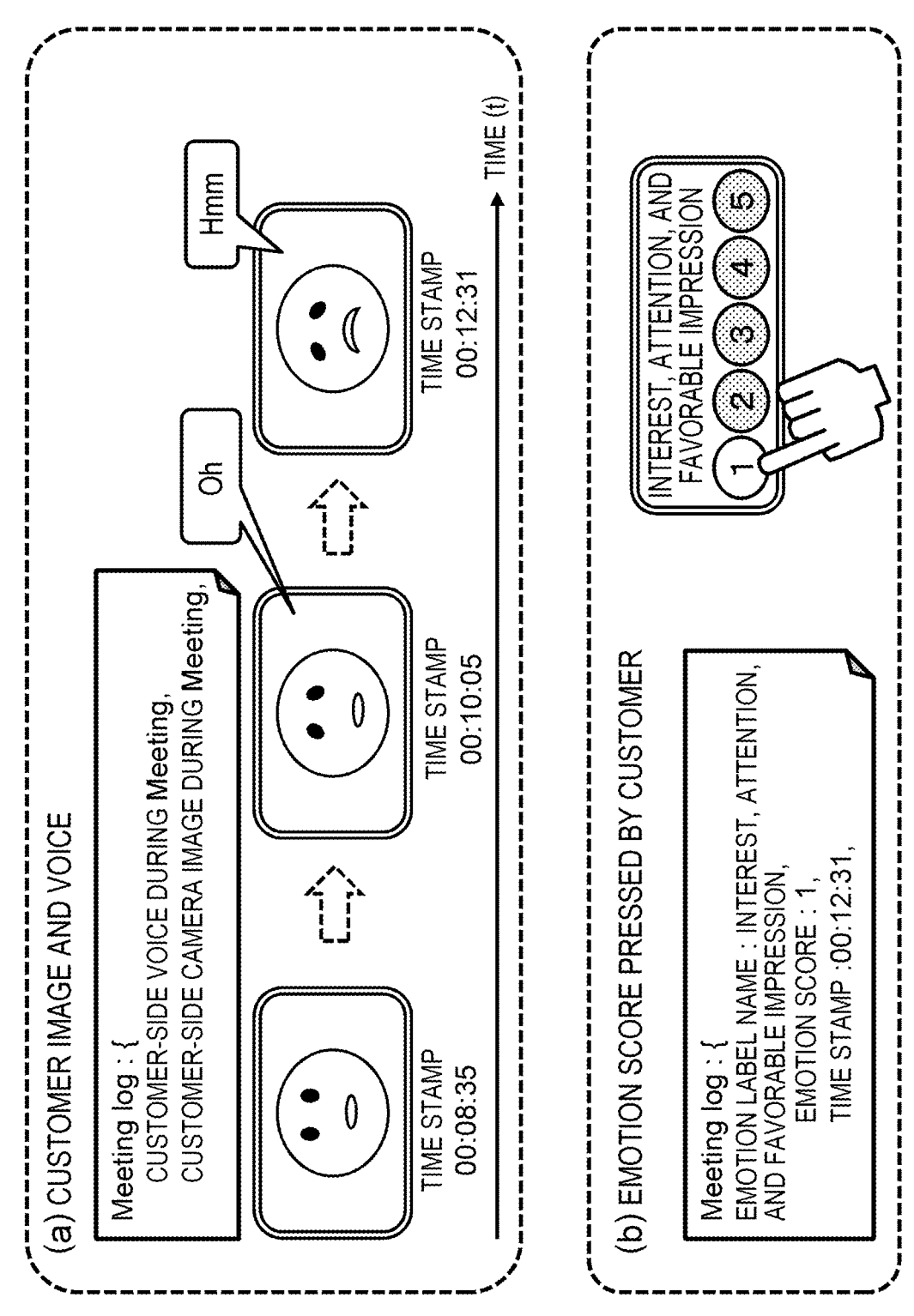
FIG. 33 is a diagram for describing an example of learning processing of generating a degree-of-interest estimation learning model.

FIG. 33 is a diagram illustrating an example of learning processing for causing the degree-of-interest estimator generation unit (degree-of-interest estimation learning model generation unit) 181 to generate the degree-of-interest estimator (degree-of-interest estimation learning model) 191.

FIG. 33 illustrates the following data used as the learning data:

(a) image and voice of the customer-side user 11 during the meeting period; and (b) interest, attention, and favorable impression score (evaluation value) input by the customer-side user 11 during the meeting period;

Note that such pieces of data are included in the log data described above with reference to FIG. 28. That is, the log data is recorded in the customer-side user terminal 21 and transmitted to the information processing device 100 during the meeting.

The degree-of-interest estimator generation unit (degree-of-interest estimation learning model generation unit) 181 first acquires one interest, attention, and favorable impression score (evaluation value) input by the customer-side user 11 during the meeting period from the interest, attention, and favorable impression score database 171 illustrated in FIG. 32. Moreover, the time stamp of the acquired interest, attention, and favorable impression score (evaluation value) is checked, and image and voice data of the customer-side user 11 from the time matching the time stamp to a predetermined time before (for example, 30 seconds before) are acquired from the image and voice database 161.

The degree-of-interest estimator generation unit (degree-of-interest estimation learning model generation unit) 181 acquires the feature of the image and voice data of the customer-side user 11 acquired from the image and voice database 161, and associates the interest, attention, and favorable impression score (evaluation value)=1 input by the customer-side user 11 illustrated in FIG. 33(b) with the feature.

That is, the learning processing is performed using a data set in which the image and voice data of the customer-side user 11 for 30 seconds immediately before the score input are associated with the interest, attention, and favorable impression score (evaluation value) input by the customer-side user 11 as training data.

The interest, attention, and favorable impression score (evaluation value) input by the customer-side user 11 is used as annotation data (ground truth metadata) for the image and voice data.

It is possible to generate, by performing such learning processing using a large number of data sets, the degree-of-interest estimator (degree-of-interest estimation learning model) 191 that estimates the interest, attention, and favorable impression score (evaluation value) of the customer-side user 11 on the basis of the image and voice data of the customer-side user 11 for a certain period (for example, 30 seconds).

In the example illustrated in FIG. 33, the image and voice of the customer-side user 11 immediately before the interest, attention, and favorable impression score (evaluation value)= 1 illustrated in FIG. 33(b) is input contain a perplexed face of the customer-side user 11 and voice data such as "Oh" and "Hmm".

For example, the degree-of-interest estimator generation unit (degree-of-interest estimation learning model generation unit) 181 can learn that, in a case where the image and voice of the customer-side user 11 contain such data, the value of the interest, attention, and favorable impression score (evaluation value) of the customer-side user 11 tends to be low.

FIG. 34 illustrates an example of different learning data.

FIG. 34(b) illustrates the interest, attention, and favorable impression score (evaluation value)=5 input by the customer-side user 11 during the meeting period from the interest, attention, and favorable impression score database 171.

FIG. 34(a) illustrates the image and voice data of the customer-side user 11 immediately before the input of the score=5.

In FIG. 34(a), a satisfied face of the customer-side user 11 and voice data such as "I see", "I understand" are contained.

The degree-of-interest estimator generation unit (degree-of-interest estimation learning model generation unit) 181 can learn that, in a case where the image and voice of the customer-side user 11 contain such data, the value of the interest, attention, and favorable impression score (evaluation value) of the customer-side user 11 tends to be high.

The example illustrated in FIG. 35 is an example of learning processing using the image and voice data of the sales-side user 12.

FIG. 35(b) illustrates the interest, attention, and favorable impression score (evaluation value)=1 input by the customer-side user 11 during the meeting period from the interest, attention, and favorable impression score database 171.

FIG. 35(a) illustrates the image and voice data of the sales-side user 12 immediately before the input of the score=1.

In FIG. 35(a), a troubled face of the sales-side user 12 and voice data such as "regarding the matter" and "I will check it" are contained.

The degree-of-interest estimator generation unit (degree-of-interest estimation learning model generation unit) 181 can learn that, in a case where the image and voice of the sales-side user 12 contain such data, the value of the interest, attention, and favorable impression score (evaluation value) of the customer-side user 11 tends to be low.

As described above, the degree-of-interest estimator generation unit (degree-of-interest estimation learning model generation unit) 181 receives the input of a large number of pieces of learning data containing the interest, attention, and favorable impression score (evaluation value) input by the customer-side user 11 during the meeting period and the image and voice data of at least one of the customer-side user 11 or the sales-side user 12, and performs the learning processing.

The degree-of-interest estimator generation unit (degree-of-interest estimation learning model generation unit) 181 generates, as a result of the learning processing, the degree-of-interest estimator (degree-of-interest estimation learning model) 191 that estimates the interest, attention, and favorable impression score of the customer-side user on the basis of at least one of the image and voice data of the customer-side user or the image and voice data of the sales-side user.

That is, as illustrated in FIG. 36, the degree-of-interest estimator generation unit (degree-of-interest estimation learning model generation unit) 181 generates the degree-of-interest estimator (degree-of-interest estimation learning model) 191 that receives the input of at least one of the image and voice data of the customer-side user or the image and voice data of the sales-side user and outputs an estimated value of the interest, attention, and favorable impression score of the customer-side user as an output.

That is, an estimator (learning model) that estimates a user state on the basis of at least one of image data or voice data of one or more users participating in a meeting via a communication network is generated.

Each of the examples described with reference to FIGS. 33 to 36 is an example of the learning processing performed by the degree-of-interest estimator generation unit (degree-of-interest estimation learning model generation unit) 181 and an example of use of the degree-of-interest estimator (degree-of-interest estimation learning model) 191 generated as a result of the learning.

The other degree-of-understanding estimator generation unit (degree-of-understanding estimation learning model generation unit) 182 and degree-of-fatigue estimator generation unit (degree-of-fatigue estimation learning model generation unit) 183 each also perform similar learning processing.

The degree-of-understanding estimator generation unit (degree-of-understanding estimation learning model generation unit) 182 generates the degree-of-understanding estimator (degree-of-understanding estimation learning model) 192 that receives the input of at least one of the image and voice data of the customer-side user or the image and voice data of the sales-side user and outputs an estimated value of the understanding, acceptance, and satisfaction score of the customer-side user as an output.

Moreover, the degree-of-fatigue estimator generation unit (degree-of-fatigue estimation learning model generation unit) 183 generates the degree-of-fatigue estimator (degree-of-fatigue estimation learning model) 193 that receives the input of at least one of the image and voice data of the customer-side user or the image and voice data of the sales-side user and outputs an estimated value of the fatigue and stress score of the customer-side user as an output.

6. Processing of Generating Learning Model and Rule-Based Model Used by User State Change Reason Estimation Unit Next, processing of generating a learning model and a rule-based model used by the user state change reason estimation unit will be described.

As described above with reference to FIG. 6, in a case where the value of the user state output score of the customer-side user 11 calculated by the user state output score calculation unit 106 largely changes, for example, the user state change reason estimation unit 108 of the information processing device 100 performs processing of estimating a reason for the change.

The user state change reason estimation unit 108 performs processing of estimating a reason for the change in the user state using at least one of the learning model or the rule-based model generated in advance.

Hereinafter, processing of generating the learning model and the rule-based model used by the user state change reason estimation unit will be described.

First, processing of generating the learning model used by the user state change reason estimation unit will be described.

FIG. 37 is a diagram illustrating a mock meeting configuration for acquiring learning data used for the processing of generating the learning model used by the user state change reason estimation unit.

FIG. 37 illustrates an execution configuration of the mock meeting for acquiring learning data in a manner similar to FIG. 26 described above. The customer-side user 11 is not a real customer but a person who plays the role of a customer.

During the meeting (business talk) period with the sales-side user 12, the customer user 11 playing the role of a customer inputs the following user state scores:

(user state 1) interest, attention, and favorable impression;
(user state 2) understanding, acceptance, and satisfaction; and
(user state 3) fatigue and stress.

Moreover, in a case where the user state score changes by the predetermined threshold or more, for example, in a case where the user state score changes by two or more levels, a reason for the change (user state change reason) is selected.

Alternatively, when the user state score becomes equal to the minimum score (score=1) or the maximum score (score=5), a reason for the change (user state change reason) is selected.

A plurality of user state change reasons is prepared in advance, and selection candidate reasons are displayed on the customer-side user terminal 21. The customer-side user 11 selects a corresponding reason from the plurality of displayed reasons.

The score change reason to be displayed on the customer-side user terminal 21 is, for example, data as illustrated in FIG. 38.

Examples of the reason why (user state 1) interest, attention, and favorable impression score has changed for the better (positively changed) include:

(1) good balance of utterance ratio;
(2) understand my intention;
(3) humor me; and
(4) got useful information, and
such reasons are registered and displayed on the customer-side user terminal 21.

Furthermore, examples of the reason why (user state 1) interest, attention, and favorable impression score has changed for the worse (negatively changed) include:

1. long-winded explanation;
2. not understand my intention;
3. not humor me; and
4. answered something that wasn't asked, and
such reasons are registered and displayed on the customer-side user terminal 21.

Examples of the reason why (user state 2) understanding, acceptance, and satisfaction has changed for the better (positively changed) include:

1. got answer I expected;
2. sufficient explanation; and
3. good balance of utterance ratio, and
such reasons are registered and displayed on the customer-side user terminal 21.

Furthermore, examples of the reason why (user state 2) understanding, acceptance, and satisfaction has changed for the worse (negatively changed) include:

1. received answer deviating from the intent of question;
2. frequent backchanneling;
3. lack of explanation; and
4. lot of silence, and
such reasons are registered and displayed on the customer-side user terminal 21.

Examples of the reason why (user state 3) fatigue and stress has changed for the better (positively change) include:

(1) state of being understood is continuing, and
such a reason is registered and displayed on the customer-side user terminal 21.

Furthermore, examples of the reason why (user state 3) fatigue and stress has changed for the worse (negatively changed) include:

(1) no break, and
such a reason is registered and displayed on the customer-side user terminal 21.

Note that the reasons are not limited to the above-described reasons, and various other reasons are registered and displayed.

The data input by the customer-side user 11 to the customer-side user terminal 21 during the mock meeting, that is, the user state score and the selection data of the score change reason are transmitted to the information processing device 100, and machine learning for generating the learning model is performed by the learning processing unit of the information processing device 100.

An example of learning model generation processing in the machine learning processing performed by the information processing device 100 will be described with reference to FIG. 39 and subsequent drawings.

As illustrated in FIG. 39, the information processing device 100 acquires, from the customer-side user terminal 21, the following data during the meeting period:

image data; and voice data.

user state score; and user state change reason.

Note that the user state score includes the following scores:

(score corresponding to user state 1)=interest, attention, and favorable impression score;

(score corresponding to user state 2)=understanding, acceptance, and satisfaction score; and (score corresponding to user state 3)=fatigue and stress score, The user state change reason also includes a reason for a change in each of the user state scores.

The user state change reason is a reason selected by the customer-side user 11 in a case where any one of the above-described user state scores changes by the predetermined threshold or more, specifically by two or more levels, or the user state score becomes equal to the minimum score (score=1) or the maximum score (score=5).

The image data and the voice data are image data containing the face image of the customer-side user 11 and the utterance voice data of the customer-side user 11 acquired by the camera and the microphone of the customer-side user terminal 21.

As described above with reference to FIG. 38, the user state score and the user state change reason correspond to the user state score (evaluation value) and the user state change reason input by the customer-side user 11 to the customer-side user terminal 21 during the meeting period.

The information processing device 100 stores these pieces of data in the storage unit (database) provided in the information processing device 100.

As illustrated in FIG. 39, the image data and the voice data are stored in the image and voice database 161.

The user state score is stored in the user state score database 170, and the user state change reason is stored in the user state change reason database 175.

Moreover, the information processing device 100 acquires, in a similar manner, the following data from the sales-side user terminal 22 during the meeting period:

image data; and voice data.

These image data and voice data are image data containing the face image of the sales-side user 12 and the utterance voice data of the sales-side user 12 acquired by the camera and the microphone of the sales-side user terminal 22.

These pieces of data are also recorded in the image and voice database 161 of the information processing device 100.

Note that the image and voice data recorded in the image and voice database 161 contain, as attribute information, recording time information such as a time stamp indicating the acquisition time of image and voice, user identification information for identifying whether the image and the voice are data of the customer-side user 11 acquired from the customer-side user terminal 21 or data of the sales-side user 12 acquired from the sales-side user terminal 22, and the like.

Note that, in the example illustrated in FIG. 39, the heart rate information regarding the heart rate of the customer-side user 11 and the like are not collected; however, for example, in a case where a learning model for performing user state change reason estimation processing using the sensor detection information such as the heart rate information regarding the heart rate of the customer-side user 11 is generated, the heart rate information regarding the heart rate of the customer-side user 11 and the like are also collected, and learning processing including the sensor detection information is performed.

FIG. 40 is a diagram illustrating a configuration and processing of the machine learning processing performed by the information processing device 100.

As illustrated in FIG. 40, the information processing device 100 includes a user state change reason estimator generation unit (user state change reason estimation learning model generation unit) 184.

The user state change reason estimator generation unit (user state change reason estimation learning model generation unit) 184 performs machine learning processing using the data stored in the user state score database 170, the data stored in the user state change reason database 175, and the data stored in the image and voice database 161 to generate a user state change reason estimator (user state change reason estimation learning model) 194.

Note that the user state score database 170 illustrated in FIG. 40 separately stores each of the following user state scores:

(score corresponding to user state 1)=interest, attention, and favorable impression score;

(score corresponding to user state 2)=understanding, acceptance, and satisfaction score; and (score corresponding to user state 3)=fatigue and stress score.

The user state change reason database 175 also separately stores a reason for a change in each of the user state scores.

The user state change reason estimator generation unit (user state change reason estimation learning model generation unit) 184 generates three user state change reason estimators (user state change reason estimation learning models) 194 corresponding to the following user states:

(user state 1) interest, attention, and favorable impression;

(user state 2) understanding, acceptance, and satisfaction; and (user state 3) fatigue and stress.

The user state change reason estimator generation unit (user state change reason estimation learning model generation unit) 184 performs the machine learning processing using the following data to generate the user state change reason estimator (user state change reason estimation learning model) 194:

(a) the image and voice of the customer-side user 11 and the image and voice of the sales-side user 12 during the meeting period;

(b) the user state score input by the customer-side user 11 during the meeting period; and (c) the user state change reason input by customer-side user 11 during the meeting period.

The learning processing unit of the information processing device 100 performs deep learning processing as the machine learning processing, for example.

For example, "supervised learning processing" using, as training data, the user state score and the user state change reason input by the customer-side user 11 during the meeting period, and the data stored in the image and voice database 161 is performed.

Through this learning processing, the user state change reason estimator (user state change reason estimation learning model) 194 that estimates the user state score and the user state change reason of the customer-side user on the basis of at least one of the image and voice data of the customer-side user or the image and voice data of the sales-side user is generated.

Note that, as described above with reference to FIG. 22, the user state change reason estimation result integration processing unit 143 may be configured to output, to the sales-side user terminal 22, not only the user state change reason but also the meeting result estimation information and the weight recommendation information regarding a weight to be applied to the user state score calculation.

In a case where such a configuration is employed, the meeting result information and the optimal weight to be applied to the score calculation are also learned in the learning processing by means of the mock meeting. With such learning processing, it is possible to acquire the meeting result information and the optimal weight to be applied to the score calculation by applying the learning model.

Next, processing of generating the rule-based model used by the user state change reason estimation unit 108 of the information processing device 100 will be described with reference to FIG. 41.

As described above with reference to FIG. 6, in a case where the value of the user state output score of the customer-side user 11 calculated by the user state output score calculation unit 106 largely changes, for example, the user state change reason estimation unit 108 of the information processing device 100 performs processing of estimating a reason for the change.

The user state change reason estimation unit 108 performs processing of estimating a reason for the change in the user state using at least one of the learning model or the rule-based model generated in advance.

Next, processing of generating the rule-based model used by the user state change reason estimation unit 108 will be described with reference to FIG. 41.

For example, as illustrated in FIG. 21 described above, the rule-based model is a model having a rule recorded therein, the rule containing various utterance texts of the customer-side user 11 and the sales-side user recorded and user state change reasons recorded in association with each other.

The rule-based model is recorded data of a user state change reason estimation rule, and the rule-based model (user state change reason estimation rule) is generated separately for each of the following user states:

(user state 1)=interest, attention, and favorable impression;

(user state 2)=understanding, acceptance, and satisfaction; and (user state 3)=fatigue and stress.

A description will be given of, with reference to FIG. 41, an example of processing of generating the rule-based model (user state change reason estimation rule) corresponding to:

(user state 1)=interest, attention, and favorable impression.

As illustrated in FIG. 41, the information processing device 100 includes a degree-of-interest change reason estimation rule generation unit 185.

The degree-of-interest change reason estimation rule generation unit 185 performs machine learning processing using the data stored in the interest, attention, and favorable impression score database 171, data stored in an interest, attention, and favorable impression score change reason database 174, and the data stored in the image and voice database 161 to generate a degree-of-interest change reason estimation rule (rule-based model) 195.

That is, the degree-of-interest change reason estimation rule generation unit 185 generates the degree-of-interest change reason estimation rule (rule-based model) 195 using the following data:

(a) the image and voice of the customer-side user 11 and the image and voice of the sales-side user 12 during the meeting period;

(b) the user state score input by the customer-side user 11 during the meeting period; and (c) the user state change reason input by customer-side user 11 during the meeting period.

The degree-of-interest change reason estimation rule generation unit 185 of the information processing device 100 acquires at least one of the image and voice data of the customer-side user 11 or the image and voice data of the sales-side user 12 at the timing when the user state score input by the customer-side user 11 during the meeting period is changed by the prescribed threshold or more, or when the user state score becomes equal to the minimum value or the maximum value, and records the image and voice data and the user state change reason input by the customer-side user 11 at the timing with the image and voice data and the user state change reason associated with each other.

The processing of acquiring and recording such pieces of data may be automatically performed in accordance with a predetermined program, or may be performed by an operator.

When the processing of acquiring and recording the pieces of data is performed, the degree-of-interest change reason estimation rule (rule-based model) 195 illustrated in the drawing is generated.

Note that, in a manner similar to the learning model described above, in a case where the user state change reason estimation result integration processing unit 143 is configured to output not only the user state change reason but also the meeting result estimation information and the weight recommendation information regarding a weight to be applied to the user state score calculation to the sales-side user terminal 22, the meeting result information and the optimal weight to be applied to the score calculation are also recorded in the rule to be generated. It is also possible to acquire, by generating such a rule, the meeting result information and the optimal weight to be applied to the score calculation from the generated rule.

FIG. 42 is a block diagram illustrating a configuration example of the information processing device 100 that performs the learning model generation processing and the rule-based model generation processing described above.

Note that the information processing device that performs the learning model generation processing and the rule-based model generation processing may be the same as or different from the information processing device 100 described above with reference to FIG. 6, that is, the information processing device 100 that performs the user state estimation processing and the like using the generated learning model.

Here, an example will be described where a device that performs learning processing to generate a learning model and a device that performs user state estimation processing using the generated learning model are the same information processing device 100.

In this case, the information processing device 100 is a device including both the configuration described above with reference to FIG. 6 and a configuration illustrated in FIG. 42 to be described below.

The configuration illustrated in FIG. 42 is a part of the configuration of the information processing device 100, and indicates a configuration for performing the processing of generating a learning model and processing of generating a rule-based model.

As illustrated in FIG. 42, the information processing device 100 includes a communication unit 201, a storage unit 202, a first learning processing unit (user state estimation learning model generation unit) 203, a second learning processing unit (user state change reason estimation learning model generation unit) 204, and a user state change reason estimation rule generation unit 205.

Note that the storage unit 202 includes an image and voice database 211, an interest, attention, and favorable impression score database 212, an understanding, acceptance, and satisfaction score database 213, a fatigue and stress score database 214, an interest, attention, and favorable impression score change reason database 215, an understanding, acceptance, and satisfaction score change reason database 216, and a fatigue and stress score change reason database 217.

The communication unit 201 communicates with the customer-side user terminal 21 and the sales-side user terminal 22. Image and voice data are input from each terminal.

In a case where processing of generating a user state estimation learning model is performed, the user state score (evaluation value) input by the customer-side user is input from the customer-side user terminal 21.

In a case where processing of generating a user state change reason estimation learning model is performed, the user state change reason input by the customer-side user is input from the customer-side user terminal 21.

The image and voice database 211 of the storage unit 202 stores the image and voice data transmitted from the customer-side user terminal 21 and the sales-side user terminal 22.

Each of the interest, attention, and favorable impression score database 212, the understanding, acceptance, and satisfaction score database 213, and the fatigue and stress score database 214 stores the user state score (evaluation value) input from the customer-side user terminal 21 at the time of performing the processing of generating the user state estimator (learning model). As described above, a time stamp is added, as attribute data, to each user state score.

In the interest, attention, and favorable impression score change reason database 215, the understanding, acceptance, and satisfaction score change reason database 216, and the fatigue and stress score change reason database 217, the user state change reason data input from the customer-side user terminal 21 at the time of the processing of generating the user state change reason estimation learning model is stored. A time stamp is added, as attribute data, to each user state change reason data in a similar manner.

The first learning processing unit (user state estimation learning model generation unit) 203 performs learning processing using the data stored in each database of the storage unit 202 to generate a user state estimation learning model. Specifically, the following three types of user state estimation learning models are generated:

(a) interest, attention, and favorable impression score estimation learning model;

(b) understanding, acceptance, and satisfaction score estimation learning model; and (c) fatigue and stress score estimation learning model.

Note that, for example, in a case where new learning data has been stored in the storage unit 202, the first learning processing unit (user state estimation learning model generation unit) 203 also performs processing of updating the generated learning models one by one by performing learning processing using the new learning data.

The second learning processing unit (user state change reason estimation learning model generation unit) 204 performs learning processing using the data stored in each database of the storage unit 202 to generate a user state change reason estimation learning model. Specifically, the following three types of user state change reason estimation learning models are generated:

(a) interest, attention, and favorable impression score change reason estimation learning model;

(b) understanding, acceptance, and satisfaction score change reason estimation learning model; and (c) fatigue and stress score change reason estimation learning model.

Note that, for example, in a case where new learning data has been stored in the storage unit 202, the second learning processing unit (user state change reason estimation learning model generation unit) 204 also performs processing of updating the generated learning models one by one by performing learning processing using the new learning data.

The user state change reason estimation rule generation unit 205 performs rule generation processing using the data stored in each database of the storage unit 202 to generate a user state change reason estimation rule (rule-based model). Specifically, the following three types of user state change reason estimation rules (rule-based models) are generated:

(a) interest, attention, and favorable impression score change reason estimation rule (rule-based model);

(b) understanding, acceptance, and satisfaction score change reason estimation rule (rule-based model); and (c) fatigue and stress score change reason estimation learning rule (rule-based model).

Note that, for example, in a case where new data is stored has been the storage unit 202, the user state change reason estimation rule generation unit 205 also performs processing of updating the generated user state change reason estimation rules (rule-based models) one by one by performing rule generation processing using the new data.

7. Configuration Examples of Information Processing Device and User Terminal Next, configuration examples of the information processing device and the user terminal will be described.

Configuration examples of three devices constituting the information processing system of the present disclosure, that is, the information processing device 100, the customer-side user terminal 21, and the sales-side user terminal 22 will be described with reference to FIG. 43.

The information processing device 100 illustrated in FIG. 43 is an information processing device 100 having both the configuration of the information processing device 100 described above with reference to FIG. 6 and the configuration of the information processing device 100 described with reference to FIG. 42.

This configuration is as described with reference to FIGS. 6 and 42, so that no description will be given below of the configuration.

The customer-side user terminal 21 includes an input unit 310, an output unit 320, and a communication unit 330.

The input unit 310 includes a voice input unit (microphone) 311, an image input unit (camera) 312, and a user input unit (UI) 313.

The output unit 320 includes a voice output unit (speaker) 321 and an image output unit (display unit) 322.

The voice input unit (microphone) 311 of the input unit 310 acquires voice data such as the voice of the customer-side user. The acquired voice data is transmitted to the sales-side user terminal 22 and the information processing device 100 via the communication unit 330.

The image input unit (camera) 312 acquires image data such as the face image of the customer-side user. The acquired image data is transmitted to the sales-side user terminal 22 and the information processing device 100 via the communication unit 330.

The user input unit (UI) 313 is an input interface for the user state score (evaluation value), the user state change reason, and the like input by the customer-side user 11, for example, when the user state estimator (learning model) generation processing is performed by the information processing device 100. For example, a touch-panel type display unit is used.

The input data such as the user state score (evaluation value) and the user state change reason input by the customer-side user 11 is transmitted to the information processing device 100 and used for the learning model generation processing and the like.

A sensor detection value input unit 314 acquires a detection value of a biometric information acquisition sensor, such as a heart rate sensor, attached to the customer-side user. The acquired data is transmitted to the sales-side user terminal 22 and the information processing device 100 via the communication unit 330.

Next, the configuration of the sales-side user terminal 22 will be described.

The sales-side user terminal 22 includes an input unit 410, an output unit 420, and a communication unit 430.

The input unit 410 includes a voice input unit (microphone) 411 and an image input unit (camera) 412.

The output unit 420 includes a voice output unit (speaker) 421 and an image output unit (display unit) 422.

The voice input unit (microphone) 411 of the input unit 410 acquires voice data such as the voice of the sales-side user. The acquired voice data is transmitted to the customer-side user terminal 21 and the information processing device 100 via the communication unit 430.

The image input unit (camera) 412 acquires image data such as the face image of the sales-side user. The acquired image data is transmitted to the customer-side user terminal 21 and the information processing device 100 via the communication unit 430.

The user input unit (UI) 413 is an input interface for, for example, setting or changing a weight parameter applied to the user state score calculation in the information processing device 100, for example. For example, a touch-panel type display unit is used.

8. Hardware Configuration Examples of Information Processing Device and User Terminal Next, hardware configuration examples of the information processing device and the user terminal will be described.

FIG. 44 is a diagram illustrating hardware configuration examples of the information processing device 100 of the present disclosure, and the customer-side user terminal 21 and the sales-side user terminal 22 that are user terminals.

Hereinafter, the hardware configuration illustrated in FIG. 44 will be described.

A central processing unit (CPU) 501 functions as a control unit or a data processing unit that executes various kinds of processing according to a program stored in a read only memory (ROM) 502 or a storage unit 508. For example, the CPU 501 executes the processing according to the sequence described in the above embodiment. A random access memory (RAN) 503 stores a program executed by the CPU 501, data, and the like. The CPU 501, the ROM 502, and the RAM 503 are mutually connected by a bus 504.

The CPU 501 is connected to an input/output interface 505 via the bus 504, and to the input/output interface 505, an input unit 506 that includes various switches, a keyboard, a mouse, a microphone, a sensor, or the like, and an output unit 507 that includes a display, a speaker, and the like are connected. The CPU 501 executes various kinds of processing in response to a command input from the input unit 506, and outputs a processing result to, for example, the output unit 507.

The storage unit 508 connected to the input/output interface 505 includes, for example, a hard disk, and the like and stores programs executed by the CPU 501 and various data. A communication unit 509 functions as a transmission-reception unit for Wi-Fi communication, Bluetooth (registered trademark) (BT) communication, and other data communication via a network such as the Internet or a local area network, and communicates with an external device.

A drive 510 connected to the input/output interface 505 drives a removable medium 511 such as a magnetic disk, an optical disc, a magneto-optical disk, or a semiconductor memory such as a memory card to record or read data.

9. Summary of Configuration of Present Disclosure

The embodiments of the present disclosure have been described above in detail with reference to specific embodiments. However, it is obvious that those skilled in the art can modify or substitute the embodiments without departing from the gist of the present disclosure. That is, the present invention has been disclosed in the form of exemplification, and should not be interpreted in a limited manner. In order to determine the gist of the present disclosure, the claims should be considered.

Note that the technology disclosed herein may have the following configurations.

(1)

An information processing device including:

a user state estimation unit configured to estimate a user state score indicating a user state on the basis of at least one of image data or voice data of a user; and a user state output score calculation unit configured to calculate a user state output score to be output to a user terminal on the basis of the user state score estimated by the user state estimation unit, in which the user terminal is enabled to display a graph indicating changes over time in the user state output score calculated by the user state output score calculation unit.

(2)

The information processing device according to (1), in which a user whose user state is estimated by the user state estimation unit, and a user of the user terminal on which the graph is displayed are different from each other, and the graph enables the user of the user terminal on which the graph is displayed to check a user state of another user.

(3)

The information processing device according to (2), in which the user whose user state is estimated by the user state estimation unit, and the user of the user terminal on which the graph is displayed are both users participating in a meeting via a communication network.

(4)

The information processing device according to any one of (1) to (3), in which the user state estimation unit estimates a user state score of at least one of a degree-of-interest score indicating a degree-of-interest level of the user, a degree-of-understanding score indicating a degree-of-understanding level of the user, or a degree-of-fatigue score indicating a degree-of-fatigue level of the user.

(5)

The information processing device according to (4), in which the user state output score calculation unit performs user state output score calculation processing of at least one of:

processing of calculating a degree-of-interest output score to be output to the user terminal on the basis of the degree-of-interest score estimated by the user state estimation unit;

processing of calculating a degree-of-understanding output score to be output to the user terminal on the basis of the degree-of-understanding score estimated by the user state estimation unit; or processing of calculating a degree-of-fatigue output score to be output to the user terminal on the basis of the degree-of-fatigue score estimated by the user state estimation unit.

(6)

The information processing device according to any one of (1) to (5), in which the user state estimation unit includes:

a voice-based user state estimation unit configured to estimate the user state score on the basis of a voice of the user;

an image-based user state estimation unit configured to estimate the user state score on the basis of an image of the user; and a vocabulary-based user state estimation unit configured to estimate the user state score on the basis of utterance content of the user.

(7)

The information processing device according to (6), in which the user state output score calculation unit calculates the user state output score to be output to the user terminal by performing weighted addition processing of multiplying each of the following user state scores (a) to (c):

(a) the user state score estimated by the voice-based user state estimation unit;

(b) the user state score estimated by the image-based user state estimation unit; and (c) the user state score estimated by the vocabulary-based user state estimation unit, by a unique weight parameter and adding up resultant values.

(8)

The information processing device according to (7), in which the user state output score calculation unit changes, as needed, the weight parameter to be applied to the weighted addition processing and calculates the user state output score.

(9)

The information processing device according to (7) or (8), in which the user state output score calculation unit performs weighted addition processing using a weight parameter set by the user of the user terminal on which the graph is displayed to calculate the user state output score to be output to the user terminal.

(10)

The information processing device according to (9), in which a weight adjustment UI is displayed on the user terminal, the weight adjustment UI allowing a separate adjustment to the weight parameter corresponding to each of the following user state scores:

(a) the user state score estimated by the voice-based user state estimation unit;

(b) the user state score estimated by the image-based user state estimation unit; and (c) the user state score estimated by the vocabulary-based user state estimation unit, and the user state output score calculation unit performs weighted addition processing using a weight parameter set by the user of the user terminal using the weight adjustment UI to calculate the user state output score to be output to the user terminal.

(11)

The information processing device according to any one of (1) to (10), in which the user state estimation unit estimates the user state score indicating the user state using a learning model generated in advance.

(12)

The information processing device according to (11), in which the learning model corresponds to a learning model including a multilayer neural network.

(13)

The information processing device according to any one of (1) to (12), in which the user state estimation unit estimates the user state score using a detection value of a biometric sensor of the user.

(14)

The information processing device according to any one of (1) to (13), further including a user state change reason estimation unit configured to estimate a user state change reason of the user, in which the user terminal is enabled to display the user state change reason estimated by the user state change reason estimation unit.

(15)

The information processing device according to (14), in which the user state change reason estimation unit performs processing of estimating the user state change reason, in a case where an amount of change in the score calculated by the user state output score calculation unit is greater than or equal to a predetermined threshold, or in a case where the score calculated by the user state output score calculation unit is equal to a predetermined value.

(16)

The information processing device according to (14) or (15), in which the user state change reason estimation unit estimates the user state change reason using at least one of a learning model generated in advance or a rule generated in advance.

(17)

The information processing device according to any one of (14) to (16), in which the user state change reason estimation unit further generates at least one of meeting result estimation information regarding a meeting in which the user participates or weight parameter recommendation information regarding a weight to be applied to user state score calculation and enables the user terminal to display the generated information.

(18)

An information processing method performed by an information processing device, the information processing method including:

by a user state estimation unit performing a user state estimation step of estimating a user state score indicating a user state on the basis of at least one of image data or voice data of a user; and by a user state output score calculation unit performing a user state output score calculation step of calculating a user state output score to be output to a user terminal on the basis of the user state score estimated in the user state estimation step, in which the user terminal is enabled to display a graph indicating changes over time in the user state output score calculated by the user state output score calculation unit.

(19)

A program for causing an information processing device to perform information processing, the information processing including:

causing a user state estimation unit to perform a user state estimation step of estimating a user state score indicating a user state on the basis of at least one of image data or voice data of a user; and causing a user state output score calculation unit to perform a user state output score calculation step of calculating a user state output score to be output to a user terminal on the basis of the user state score estimated in the user state estimation step, in which the user terminal is enabled to display a graph indicating changes over time in the user state output score calculated by the user state output score calculation unit.

Furthermore, a series of processes described herein can be executed by hardware, software, or a configuration obtained by combining hardware and software. In a case of processing by software is executed, a program in which a processing sequence is recorded can be installed and performed in a memory in a computer incorporated in dedicated hardware, or the program can be installed and performed in a general-purpose computer capable of executing various types of processing. For example, the program can be recorded in advance in a recording medium. In addition to being installed in a computer from the recording medium, a program can be received via a network such as a local area network (LAN) or the Internet and installed in a recording medium such as an internal hard disk or the like.

Note that the various processes described herein may be executed not only in a chronological order in accordance with the description, but may also be executed in parallel or individually depending on processing capability of a device that executes the processing or depending on the necessity. Furthermore, a system herein described is a logical set configuration of a plurality of devices, and is not limited to a system in which devices of respective configurations are in the same housing.

INDUSTRIAL APPLICABILITY

As described above, according to a configuration of an embodiment of the present disclosure, a configuration is enabled where a graph showing changes over time in score indicating a user state of a user participating in a meeting and a user state change reason are estimated and displayed on a terminal of another user participating the meeting.

Specifically, for example, a user state score indicating a user state of any one of a degree of interest, a degree of understanding, or a degree of fatigue of a user participating in a meeting via a communication network is estimated on the basis of at least one of image data or voice data of the user, a user state output score to be output to a user terminal of the user participating in the meeting is calculated on the basis of the estimated user state score, and a graph indicating changes over time in the calculated user state output score and a user state change reason are displayed on a user terminal of another user participating in the meeting.

According to this configuration, a configuration is enabled where a graph showing changes over time in score indicating a user state of a user participating in a meeting and a user state change reason are estimated and displayed on a terminal of another user participating the meeting.

REFERENCE SIGNS LIST

11 Customer-side user
12 Sales-side user
21 Customer-side user terminal
22 Sales-side user terminal
100 Information processing device
101 Communication unit
102 User state estimation unit
103 Customer information acquisition unit
104 Meeting information acquisition unit
105 Meeting execution environment information acquisition unit
106 User state output score calculation unit
107 Score calculation algorithm control unit
108 User state change reason estimation unit
111 Customer information database
112 Meeting (MTG) information database
121 Voice-based user state estimation unit
122 Image-based user state estimation unit
123 Vocabulary-based user state estimation unit
124 Heart rate-based user state estimation unit
131 Interest, attention, and favorable impression output score calculation unit
132 Understanding, acceptance, and satisfaction output score calculation unit
133 Fatigue and stress output score calculation unit
141 Rule-based user state change reason estimation unit
142 Learning model-based user state change reason estimation unit 143 User state change reason estimation result integration processing unit 151 Voice analysis unit 152 Rule-based model 153 Rule-based user state change reason determination unit 161 Image and voice database 171 Interest, attention, and favorable impression score database 172 Understanding, acceptance, and satisfaction score database 173 Fatigue and stress score database 181 Degree-of-interest estimator generation unit (degree-of-interest estimation learning model generation unit)

182 Degree-of-understanding estimator generation unit (degree-of-understanding estimation learning model generation unit)

183 Degree-of-fatigue estimator generation unit (degree-of-fatigue estimation learning model generation unit)

184 User state change reason estimator generation unit (user state change reason estimation learning model generation unit)

185 Degree-of-interest change reason estimation rule generation unit

191 Degree-of-interest estimator (degree-of-interest estimation learning model)

192 Degree-of-understanding estimator (degree-of-understanding estimation learning model)

193 Degree-of-fatigue estimator (degree-of-fatigue estimation learning model)

194 User state change reason estimator (user state change reason estimation learning model)

195 Degree-of-interest change reason estimation rule (rule-based model)

201 Communication unit

202 Storage unit

203 First learning processing unit (user state estimation learning model generation unit)

204 Second learning processing unit (user state change reason estimation learning model generation unit)

205 User state change reason estimation rule generation unit

211 Image and voice database

212 Interest, attention, and favorable impression score database

213 Understanding, acceptance, and satisfaction score database

214 Fatigue and stress score database

215 Interest, attention, and favorable impression score change reason database

216 Understanding, acceptance, and satisfaction score change reason database

217 Fatigue and stress score change reason database

310 Input unit

311 Voice input unit (microphone)

312 Image input unit (camera)

313 User input unit (UI)

314 Sensor detection value input unit

320 Output unit

321 Voice output unit (speaker)

322 Image output unit (display unit)

330 Communication unit

410 Input unit

411 Voice input unit (microphone)

412 Image input unit (camera)

420 Output unit

421 Voice output unit (speaker)

422 Image output unit (display unit)

430 Communication unit

501 CPU

502 ROM

503 RAM

504 Bus

505 Input/output interface

506 Input unit

507 Output unit

508 Storage unit

509 Communication unit

510 Drive

511 Removable medium

The invention claimed is:

1. An information processing device, comprising:
processing circuitry configured to
estimate a user state score indicating a user state based on at least one of image data or voice data of a user;
calculate a user state output score to be output to a user terminal based on the estimated user state score, wherein
the user terminal is enabled to display a graph indicating changes over time in the calculated user state output score; and
estimate a user state change reason of the user, wherein the user terminal is enabled to display the user state change reason.

2. The information processing device according to claim 1, wherein
a user whose user state is estimated and a user of the user terminal on which the graph is displayed are different from each other, and
the graph enables the user of the user terminal on which the graph is displayed to check a user state of another user.

3. The information processing device according to claim 2, wherein
the user whose user state is estimated and the user of the user terminal on which the graph is displayed are both users participating in a meeting via a communication network.

4. The information processing device according to claim 1, wherein the processing circuitry is further configured to estimate a user state score of at least one of a degree-of-interest score indicating a degree-of-interest level of the user, a degree-of-understanding score indicating a degree-of-understanding level of the user, or a degree-of-fatigue score indicating a degree-of-fatigue level of the user.

5. The information processing device according to claim 4, wherein the processing circuitry is further configured to perform user state output score calculation processing of at least one of:
processing of calculating a degree-of-interest output score to be output to the user terminal based on of the degree-of-interest score;
processing of calculating a degree-of-understanding output score to be output to the user terminal based on the degree-of-understanding score; or
processing of calculating a degree-of-fatigue output score to be output to the user terminal based on the degree-of-fatigue score.

6. The information processing device according to claim 1, wherein the processing circuitry is further configured to
estimate the user state score based on a voice of the user;
estimate the user state score based on an image of the user; and estimate the user state score based on utterance content of the user.

7. The information processing device according to claim 6, wherein the processing circuitry is further configured to calculate the user state output score to be output to the user terminal by performing weighted addition processing of multiplying each of the following user state scores (a) to (c):

(a) the voice-based user state score;

(b) the image-based user state score; and (c) the vocabulary-based user state score, by a unique weight parameter and adding up resultant values.

8. The information processing device according to claim 7, wherein the processing circuitry is further configured to change, as needed, the weight parameter to be applied to the weighted addition processing and calculate the user state output score.

9. The information processing device according to claim 7, wherein the processing circuitry is further configured to perform weighted addition processing using a weight parameter set by the user of the user terminal on which the graph is displayed to calculate the user state output score to be output to the user terminal.

10. The information processing device according to claim 9, wherein a weight adjustment UI is displayed on the user terminal, the weight adjustment UI allowing a separate adjustment to the weight parameter corresponding to each of the following user state scores:

(a) the voice-based user state score;

(b) the image-based user state score; and (c) the vocabulary-based user state score, and perform weighted addition processing using a weight parameter set by the user of the user terminal using the weight adjustment UI to calculate the user state output score to be output to the user terminal.

11. The information processing device according to claim 1, wherein the processing circuitry is further configured to estimate the user state score indicating the user state using a learning model generated in advance.

12. The information processing device according to claim 11, wherein the learning model corresponds to a learning model including a multilayer neural network.

13. The information processing device according to claim 1, wherein the processing circuitry is further configured to estimate the user state score using a detection value of a biometric sensor of the user.

14. The information processing device according to claim 1, wherein the processing circuitry is further configured to perform processing of estimating the user state change reason, in a case where an amount of change in the calculated score is greater than or equal to a predetermined threshold, or in a case where the calculated score is equal to a predetermined value.

15. The information processing device according to claim 1, wherein the processing circuitry is further configured to estimate the user state change reason using at least one of a learning model generated in advance or a rule generated in advance.

16. The information processing device according to claim 1, wherein the processing circuitry is further configured to further generate at least one of meeting result estimation information regarding a meeting in which the user participates or weight parameter recommendation information regarding a weight to be applied to user state score calculation and enables the user terminal to display the generated information.

17. An information processing method performed by an information processing device, the information processing method comprising:

estimating a user state score indicating a user state on a basis of at least one of image data or voice data of a user;

calculating a user state output score to be output to a user terminal on a basis of the user state score estimated in the user state estimation step, wherein the user terminal is enabled to display a graph indicating changes over time in the calculated user state output score; and estimating a user state change reason of the user, wherein the user terminal is enabled to display the user state change reason.

18. A non-transitory computer-readable storage medium storing computer-readable instructions thereon which, when executed by a computer, cause the computer to perform a method, the method comprising:

estimating a user state score indicating a user state on a basis of at least one of image data or voice data of a user;

calculating a user state output score to be output to a user terminal on a basis of the user state score estimated in the user state estimation step, wherein the user terminal is enabled to display a graph indicating changes over time in the calculated user state output score; and estimating a user state change reason of the user, wherein the user terminal is enabled to display the user state change reason.

* * * * *